(12) United States Patent
Bryon et al.

(10) Patent No.: US 12,504,596 B2
(45) Date of Patent: Dec. 23, 2025

(54) SPLICE CLOSURE

(71) Applicant: CommScope Technologies LLC, Hickory, NC (US)

(72) Inventors: Roel Modest Willy Bryon, Aarschot (BE); Johan Geens, Bunsbeek (BE); Kristof Vastmans, Boutersem (BE); Samory De Zitter, Mechelen (BE); Bart Mattie Claessens, Hasselt (BE); Philippe Coenegracht, Hasselt (BE); Jiri Zavrel, Leuven (BE); Barry Wayne Allen, Siler City, NC (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 329 days.

(21) Appl. No.: 18/248,314

(22) PCT Filed: Oct. 7, 2021

(86) PCT No.: PCT/US2021/054022
§ 371 (c)(1),
(2) Date: Apr. 7, 2023

(87) PCT Pub. No.: WO2022/076722
PCT Pub. Date: Apr. 14, 2022

(65) Prior Publication Data
US 2023/0384550 A1 Nov. 30, 2023

Related U.S. Application Data

(60) Provisional application No. 63/252,971, filed on Oct. 6, 2021, provisional application No. 63/238,587, filed on (Continued)

(51) Int. Cl.
G02B 6/44 (2006.01)

(52) U.S. Cl.
CPC ....... *G02B 6/4477* (2013.01); *G02B 6/44775* (2023.05)

(58) Field of Classification Search
CPC .................. G02B 6/4477; G02B 6/44775
(Continued)

(56) References Cited

U.S. PATENT DOCUMENTS 6,533,472 B1  3/2003  Dinh et al.
7,264,402 B2  9/2007  Theuerkorn et al.
(Continued)

FOREIGN PATENT DOCUMENTS

EP    3 133 428 A1    2/2017
FR    3 018 617 A1    9/2015
(Continued)

OTHER PUBLICATIONS

International Search Report and Written Opinion for Application No. PCT/US2021/054022 mailed Jan. 28, 2022.
(Continued)

*Primary Examiner* — Sung H Pak
(74) *Attorney, Agent, or Firm* — Merchant & Gould P.C.

(57) ABSTRACT

An enclosure for accommodating splicing between cables is disclosed. The enclosure can include a housing containing a frame (e.g., a tray) to which the cables can be affixed. The housing can have an elongate in-line configuration, a triangular configuration, or other configurations. Cable reversing configurations and moveable adapter configurations are also disclosed.

14 Claims, 66 Drawing Sheets

Related U.S. Application Data on Aug. 30, 2021, provisional application No. 63/225,309, filed on Jul. 23, 2021, provisional application No. 63/208,174, filed on Jun. 8, 2021, provisional application No. 63/185,780, filed on May 7, 2021, provisional application No. 63/089,158, filed on Oct. 8, 2020.

(58) Field of Classification Search
USPC .......................................................... 385/135
See application file for complete search history.

(56) References Cited

U.S. PATENT DOCUMENTS

| | | |
|---|---|---|
| 7,424,189 B2 | 9/2008 | Lu et al. |
| 7,744,286 B2 | 6/2010 | Lu et al. |
| 7,744,288 B2 | 6/2010 | Lu et al. |
| 7,762,726 B2 | 7/2010 | Lu et al. |
| 7,942,590 B2 | 5/2011 | Lu et al. |
| 7,959,361 B2 | 6/2011 | Lu et al. |
| 8,915,659 B2 | 12/2014 | Marcouiller et al. |
| 10,061,091 B2 | 8/2018 | Kempeneers et al. |
| 10,761,287 B2 | 9/2020 | Lu et al. |
| 11,360,264 B2 | 6/2022 | Trnka et al. |
| 2009/0058018 A1 | 3/2009 | Mullaney et al. |
| 2011/0135247 A1 | 6/2011 | Achara et al. |
| 2015/0086166 A1 | 3/2015 | Coate |
| 2018/0039037 A1 | 2/2018 | Aznag et al. |
| 2020/0073071 A1 | 3/2020 | Allen et al. |
| 2021/0191057 A1* | 6/2021 | Liefsoens .............. G02B 6/445 |

FOREIGN PATENT DOCUMENTS

| | | |
|---|---|---|
| WO | 2019/197665 A2 | 10/2019 |
| WO | 2019/241502 A1 | 12/2019 |
| WO | 2020/046681 A1 | 3/2020 |
| WO | 2020/081942 A1 | 4/2020 |
| WO | 2020/154418 A1 | 7/2020 |
| WO | 2020/172153 A1 | 8/2020 |
| WO | 2020/219571 A1 | 10/2020 |
| WO | 2021/011386 A1 | 1/2021 |
| WO | 2021/055282 A1 | 3/2021 |
| WO | 2021/055356 A1 | 3/2021 |
| WO | 2021/163340 A1 | 8/2021 |

OTHER PUBLICATIONS

Extended European Search Report for Application No. 21878554.1 mailed Sep. 24, 2024.

* cited by examiner

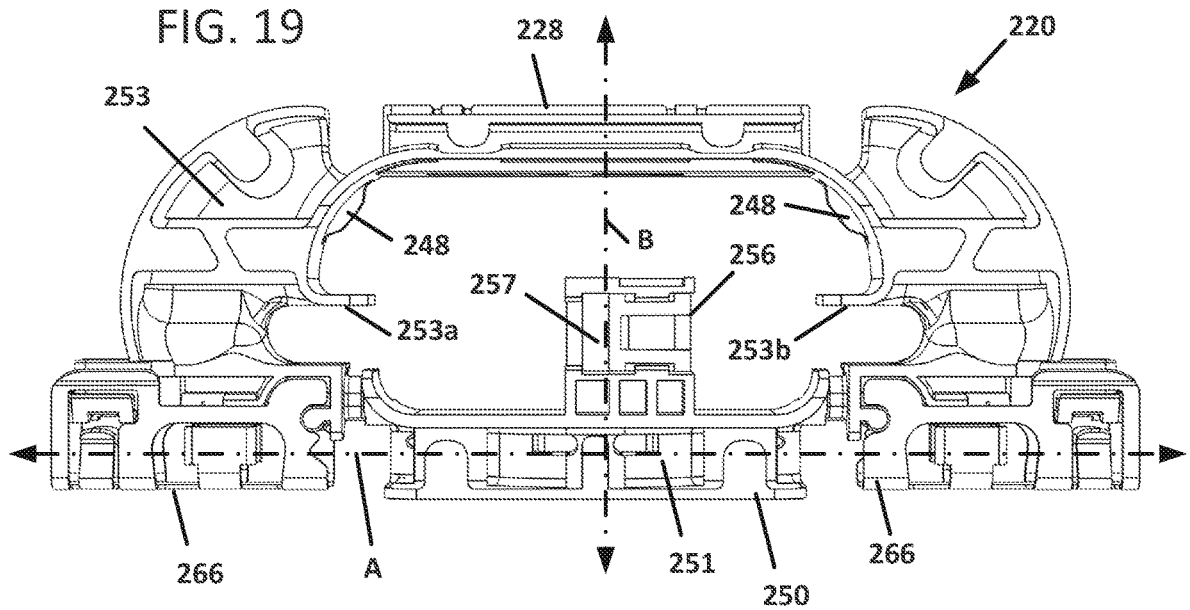
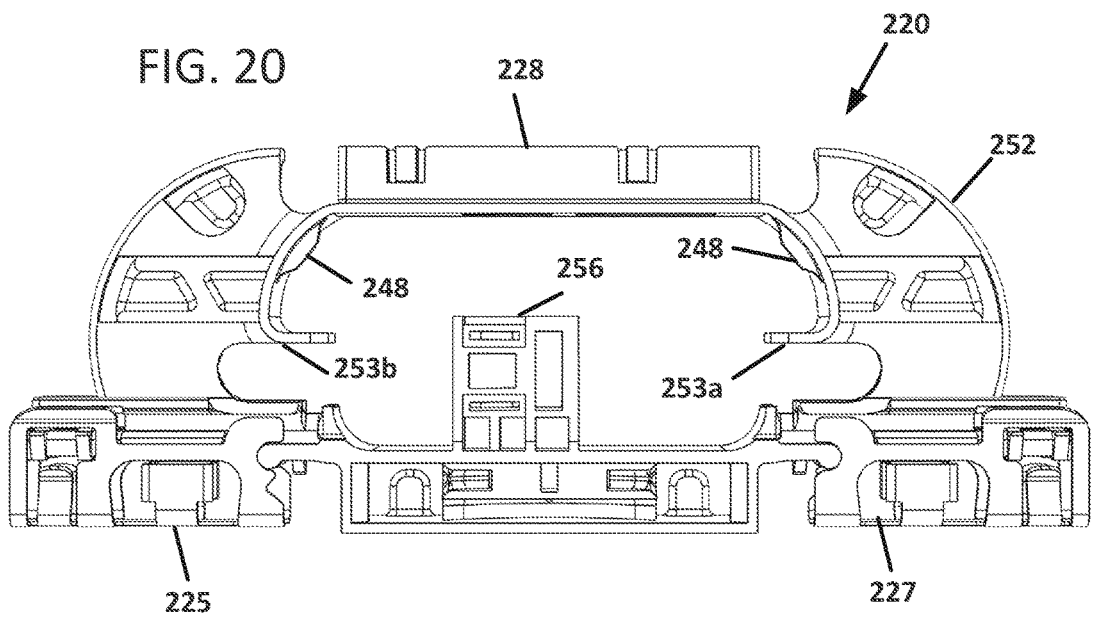

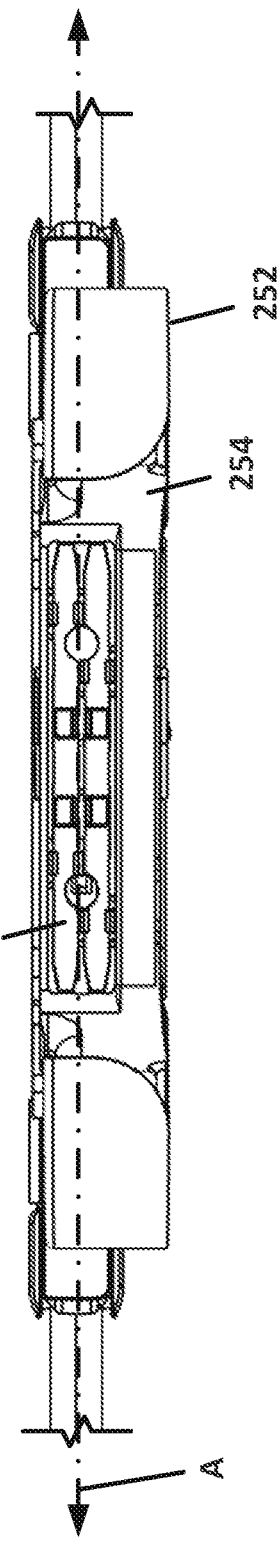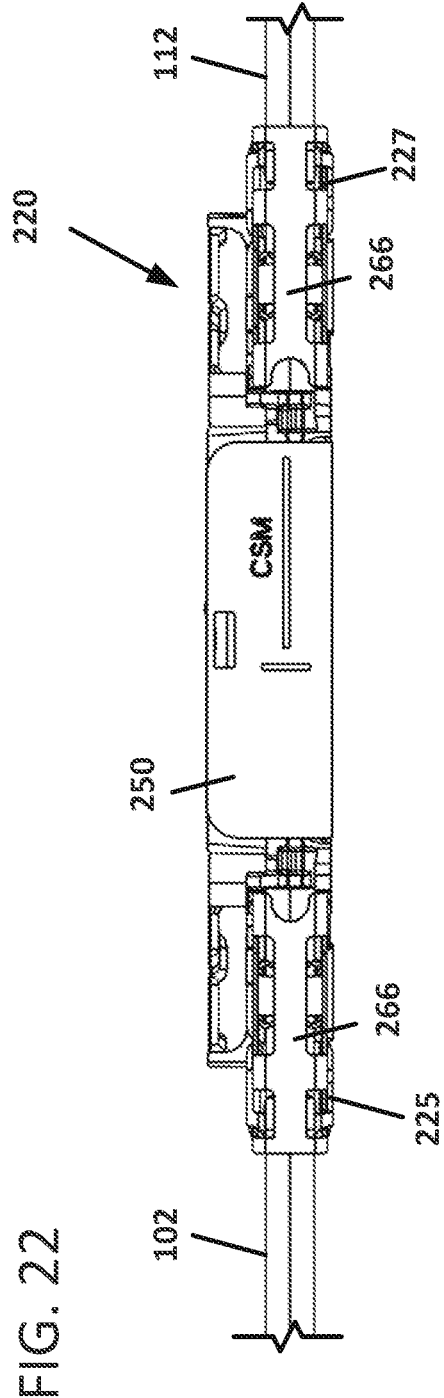
FIG. 21
FIG. 22

SPLICE CLOSURE

CROSS-REFERENCE TO RELATED APPLICATIONS

This application is a National Stage Application of PCT/US2021/054022, filed on Oct. 7, 2021, which claims the benefit of U.S. Patent Application Ser. No. 63/089,158, filed on Oct. 8, 2020, and claims the benefit of U.S. Patent Application Ser. No. 63/185,780, filed on May 7, 2021, and claims the benefit of U.S. Patent Application Ser. No. 63/208,174, filed on Jun. 8, 2021, and claims the benefit of U.S. Patent Application Ser. No. 63/225,309, filed on Jul. 23, 2021, and claims the benefit of U.S. Patent Application Ser. No. 63/238,587, filed on Aug. 30, 2021, and claims the benefit of U.S. Patent Application Ser. No. 63/252,971, filed on Oct. 6, 2021 the disclosures of which are incorporated herein by reference in their entireties. To the extent appropriate, a claim of priority is made to each of the above disclosed applications.

BACKGROUND

Optical fiber communications systems are widely used in the telecommunication industry to transmit large volumes of data and voice signals over relatively long distances. Splice points and drop points for the fiber optic cables are required for most such systems. At a splice point, for example, all of the fibers at one end of a cable are spliced to corresponding fibers of a tandem cable. At a drop point or express splice point, some of the fibers may be spliced to a drop cable while others of the fibers are passed through the drop point unaltered. For both splice points and drop points, the optical fibers are exposed from the protective cable jacket to be spliced and secured within a splice closure. Improvements are desired.

SUMMARY

Some aspects of the disclosure are directed to a splice closure that encloses an optical splice between first and second optical cables. In some examples, each optical cable includes a single optical fiber spliced at a splice location. In other examples, each optical cable includes a plurality of fibers that are spliced at separate splices. In still other examples, each optical cable includes a plurality of fibers that are spliced using one or more mass fusion splices.

In certain implementations, all of the fibers of the first cable are optically spliced to all of the fibers of the second cable. In certain implementations, the first cable aligns with the second cable along a central longitudinal axis of the splice closure. In certain implementations, the interior of the splice closure is accessible only through the axial ends. In certain implementations, the splice closure is not reenterable—the protective arrangement is not removable from the framework without breaking the protective arrangement. In certain implementations, the first cable, splice closure, and second cable cooperate to define a spliced cable that can be wound on a spool.

The splice closure includes an inner framework surrounded by an outer protective arrangement. The inner framework includes one or more splice holders. In certain implementations, the splice holder is stationary relative to the framework (e.g., to cable fixation regions of the framework). In certain implementations, the cables and optical splice(s) can be anchored to the framework outside of the protective arrangement and the protective arrangement can be subsequently added around the framework.

In certain implementations, the outer protective arrangement includes a sheath that surrounds the inner framework. The sheath defines a through-passage in which the inner framework is disposed. In certain examples, the sheath is more flexible than the framework. In certain examples, the sheath is less flexible than the first and second cables.

In certain implementations, first and second sealing arrangements are disposed at opposite axial ends of the sheath to seal the through-passage. In certain examples, the first and second sealing arrangements include end caps that mechanically mount to the sheath. In some examples, the first and second sealing arrangements include gel. In other examples, the first and second sealing arrangements include o-rings or other gaskets, foam blocks, or other types of sealing mechanisms.

In accordance with certain aspects of the disclosure, the framework anchors to each of the first and second optical cables. In some implementations, the framework anchors to outer jackets of the optical cables. In other implementations, the framework anchors to strength members (e.g., glass rods, aramid yarns, etc.) of the optical cables. In still other implementations, the framework anchors to both the jackets and the strength members of the optical cables.

In certain implementations, the sheath does not contact the optical cables. In certain implementations, the sheath does not anchor directly to the optical cables, but rather is retained through engagement of the inner framework and the first and second sealing arrangements.

In some implementations, the inner framework includes a fiber storage region at which excess length of the one or more fibers of the optical cables is guided around the splice holder in one or more loops.

The inner framework defines first and second cable fixation regions at opposite axial ends of the inner framework. The splice holder is disposed between the cable fixation regions. In certain examples, the cable jackets do not extend beyond the respective cable fixation regions. In certain examples, the strength members do not extend beyond the respective cable fixation regions. In certain examples, only fibers of the cable extend beyond the cable fixation regions towards the splice holder.

In some implementations, the framework defines cable tie apertures at the cable fixation regions. In other implementations, fixation arrangements can be mounted (e.g., snap-fit) to the framework at the cable fixation regions.

Certain aspects of the disclosure are directed to a splice closure having a hardened stub cable extending outwardly therefrom.

Certain aspects of the disclosure are directed to a closure having coaxial input and output cable ports and a loop storage that extends away from the axis extending between the input and output cable ports. In certain examples, a splice holder is mounted to an opposite side of the loop storage from the input and output cable ports.

Certain aspects of the disclosure are directed to a cable extender including a hardened stub cable extending outwardly from a re-enterable closure. The stub cable being fixed to the closure at a first cable fixation region. A second cable can be routed into the closure and secured to a second cable fixation region that aligns with the first cable fixation region.

In certain examples, the cable extender is sufficiently small and light to be carried with the cable instead of separately mounted to a surface. In some examples, the cable extender is attached to the second cable to lengthen the second cable. In other examples, the cable extender is attached to the second cable to terminate the second cable. In certain examples, the cable extender is attached to the second cable to terminate the second cable with a hardened connector.

In certain implementations, the closure of the cable extender includes coaxial cable fixation regions for the stub cable and the second cable. In certain examples, the closure includes a protective casing around an internal framework to which the cables are fixed. In certain examples, the internal framework includes a storage loop extending away from the axis extending through both cable fixation regions. In certain examples, a splice holder is mounted along the storage loop. In certain examples, a splice holder and an adapter are aligned along an axis perpendicular to the cable fixation region axis.

Another aspect of the present disclosure relates to a fiber-optic assembly including a splice closure having a first closure and an opposite second closure end. The splice closure defines a first cable port at the first closure end and a second cable port at the second cable end. The fiber optic assembly also includes a cable guide for changing a direction of a cable routed out of the second closure end. The cable guide is adapted to be coupled to the second closure end at an exterior of the splice closure. The cable guide includes a first guide end and a second guide end. The cable guide defines a guide channel that extends from the first guide end to the second guide end. The guide channel has an open side that extends from the first guide end to the second guide end. The cable guide has a curved portion between the first and second guide ends that curves at least 160°. The guide channel is configured such that a direction in which the open side of the guide channel faces changes as the guide channel extends along the curved portion.

Another aspect of the present disclosure relates to an enclosure having major perimeter sides arranged in a triangular configuration. One of the major perimeter sides is defined between first and second cable pass-through regions of the enclosure. The first and second cable pass through locations defined cable pass-through axes that intersect within a boundary defined by the major perimeter of the enclosure and are oriented relative to one another at an angle in the range of 60-120 degrees, or 70-110 degrees, or 80-100 degrees or 85-95 degrees. The enclosure can accommodate taught sheath in-line cable routing configurations, coiled in-line cable routing configurations, and butt-style cable routing configurations. In certain coiled configurations, the enclosure can be located within coiled portions of the cable. In certain examples, coiled portions of the cables can be attached to at least a portion of the major perimeter the enclosure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 19 and 20 are opposite side elevational views of the internal framework of FIG. 17;

FIGS. 21 and 22 are opposite plan views of the internal framework of FIG. 17;

DETAILED DESCRIPTION

Figure 1:
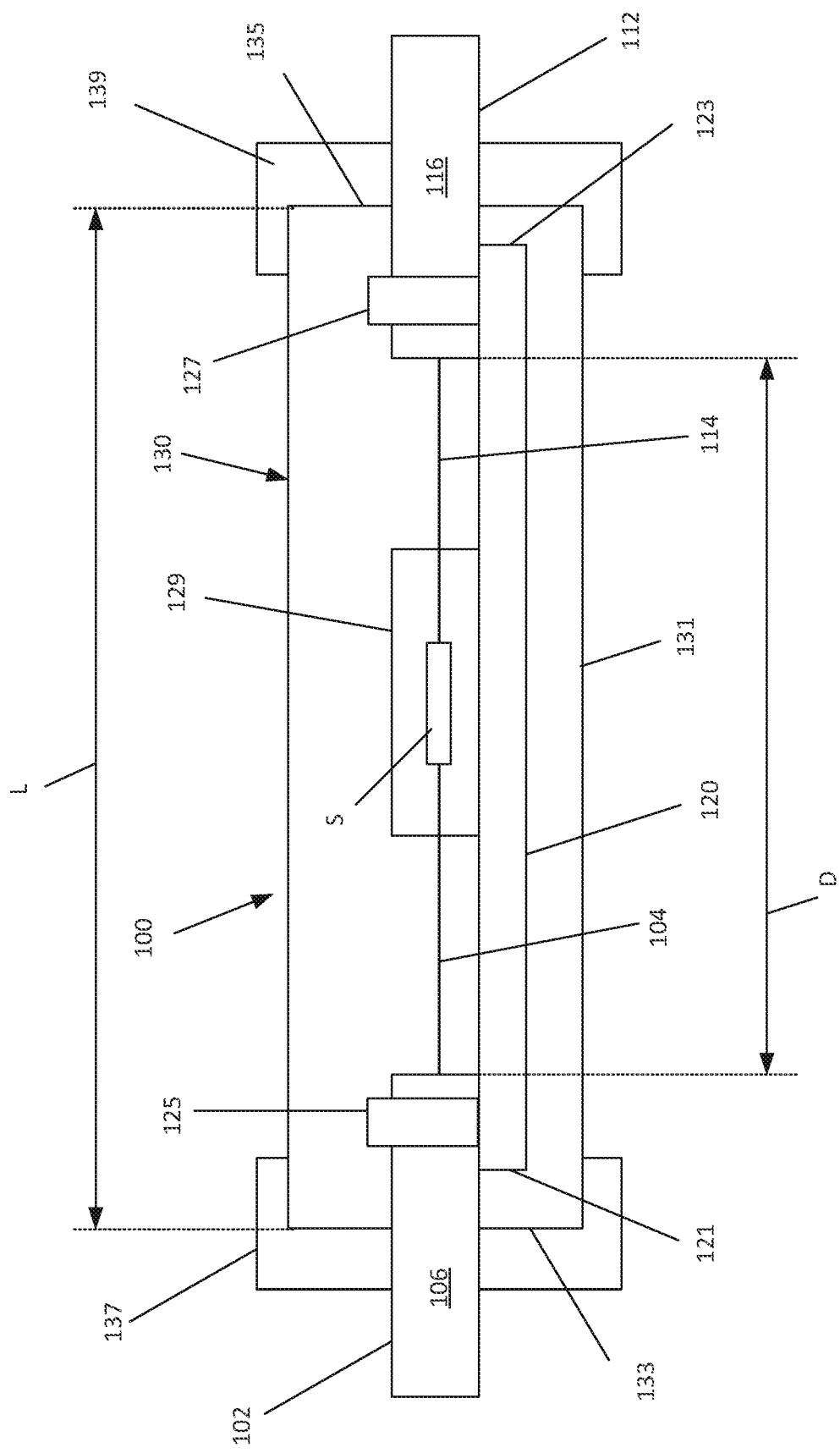
FIG. 1 is a schematic diagram of an example splice closure including an internal framework disposed within a protective arrangement, the internal framework retaining one or more optical splices and anchoring the cables being spliced.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a splice closure 100, 200 that surrounds and protects one or more optical splices S that are coupling the fibers 104, 114 of first and second optical cables 102, 112. The optical cables 102, 112 each have one or more optical fibers 104, 114 surrounded by a jacket 106, 116, respectively. In certain examples, one or both of the optical cables 102, 112 have strength members 108, 118 (e.g., aramid yarn, glass reinforced epoxy rods, etc.). The optical fibers 104, 114 extend outwardly past terminated ends of the cable jackets 106, 116 to a splice location. The splice closure 100, 200 spans at least a distance D between the terminated ends of the cable jackets 106, 116. In certain examples, at least the terminated end of each cable jacket 106, 116 is disposed within the splice closure 100, 200.

The splice closure 100, 200 includes an inner framework 120, 220 to which the optical cables 102, 112 are anchored. In some implementations, the jackets 106, 116 of the cables 102, 112 are anchored to the framework 120, 220. In other implementations, the strength members 108, 118 of the cables 102, 112 are anchored to the framework 120, 220. In other implementations, some combination of the jackets 106, 116 and strength members 108, 118 are anchored to the framework 120, 220. In some implementations, the optical cables 102, 112 (e.g., the jackets, the strength members, etc.) are anchored directly to the framework 120, 220. In other implementations, the optical cables 102, 112 (e.g., the jackets, the strength members, etc.) are anchored to separate cable fixation arrangements 155, that mount to the framework 120, 220 (e.g. see FIGS. 8 and 9).

Figure 17:
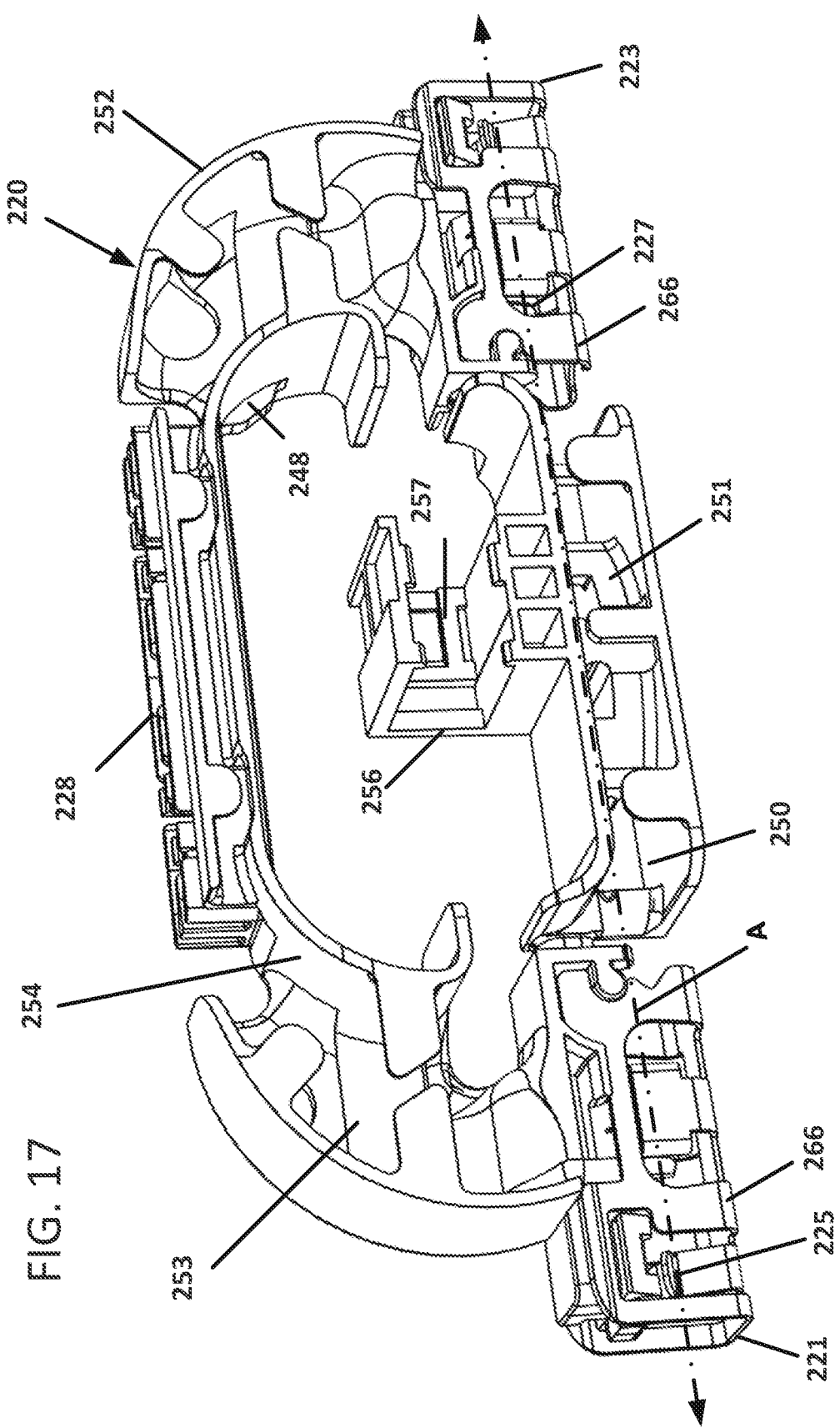
FIG. 17 is a perspective view of the internal framework of FIG. 15.
Figure 18:
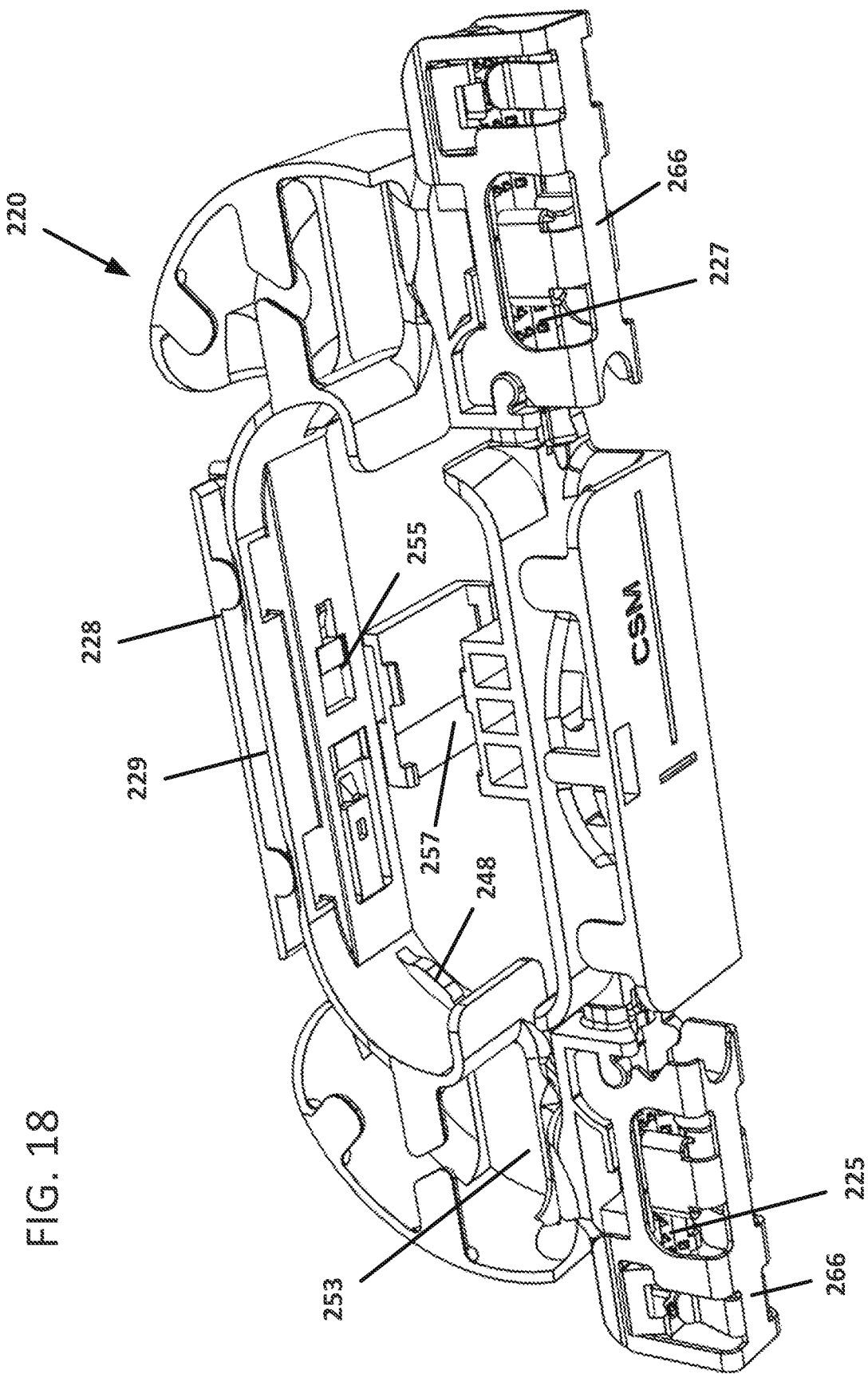
FIG. 18 is another perspective view of the internal framework of FIG. 17.

In certain implementations, the first optical cable 102 is anchored to the framework 120, 220 at a first cable fixation region 125, 225 disposed at a first end 121, 221 of the framework 120, 220. The second optical cable 112 is anchored to the framework 120, 220 at a second cable fixation region 127, 227 disposed at a second end 123, 223 of the framework 120, 220. In certain implementations, the first and second cable fixation regions 125, 225, 127, 227 are coaxially aligned with each other along an axis A (see FIG. 17).

The framework 120, 220 defines a splice management region 129, 229 disposed between the first and second cable fixation regions 125, 225, 127, 227. One or more splice holders 128, 228 are disposed at the splice management region 129, 229 and configured to retain the optical splice(s) S (e.g., to hold a protector sleeve, such as a SMOUV protector sleeve, disposed about each optical splice S). Accordingly, the framework 120, 220 inhibits axial pull on the cables 102, 112 from transferring to the optical splice(s) S and inhibits movement of the optical splice(s) S relative to the terminated ends of the cable jackets 106, 116 and relative to the splice closure 100, 200. The splice holder 128, 228 alleviates the fibers 104, 114 from carrying the weight of the splice(s) S and any corresponding protector sleeves, thereby reducing the chance of fiber breakage. In some implementations, the splice holder 128, 228 is aligned with the first and second cable fixation regions 125, 225, 127, 227 along an axis. In other implementations, the splice holder 128, 228 is offset from a common axis of the first and second cable fixation regions 125, 225, 127, 227.

The splice closure 100, 200 also includes a protective arrangement 130, 230 in which the framework 120, 220 is disposed. The protective arrangement 130, 230 includes a sheath 131, 231 or casing 131, 231 defining a through-passage that extends along a length L between opposite first and second axial ends 133, 233, 135, 235. In certain implementations, the first and second axial ends 133, 233, 135, 235 are coaxially aligned along the axis A (see FIG. 14). The inner framework 120, 220 is positioned within the through-passage of the sheath 131, 231.

In certain implementations, a first sealing arrangement 137, 237 is disposed at the first axial end 133, 233 of the sheath 131, 231 and a second sealing arrangement 139, 239 is disposed at the second axial end 135, 235 of the sheath 131, 231 to close the through-passage. The sealing arrangements 137, 237, 139, 239 each define a passage through which a respective one of the cables 102, 112 extends into the sheath 131, 231. Each of the sealing arrangements 137, 237, 139, 239 seals against the respective cable 102, 112 and to the respective end 133, 233, 135, 235 of the sheath 131, 231 to environmentally seal the through-passage. Accordingly, the protective arrangement 130, 230 provides an environmental seal around the splices S.

Figure 2:
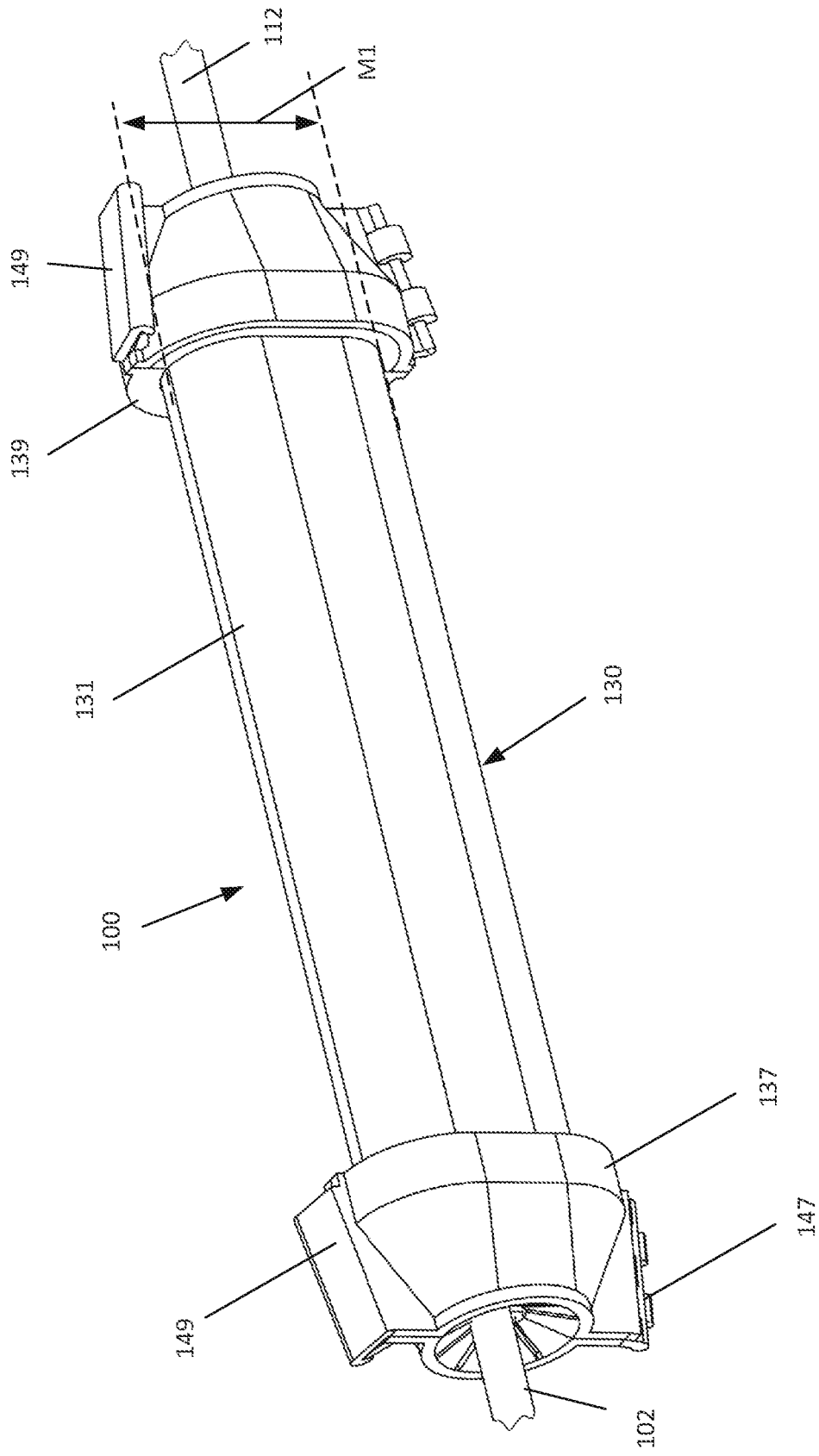
FIG. 2 is a first perspective view of an example splice closure showing an exterior of the protective arrangement, which includes end caps sealing opposite ends of a sheath and is configured in accordance with the principles of the present disclosure.
Figure 3:
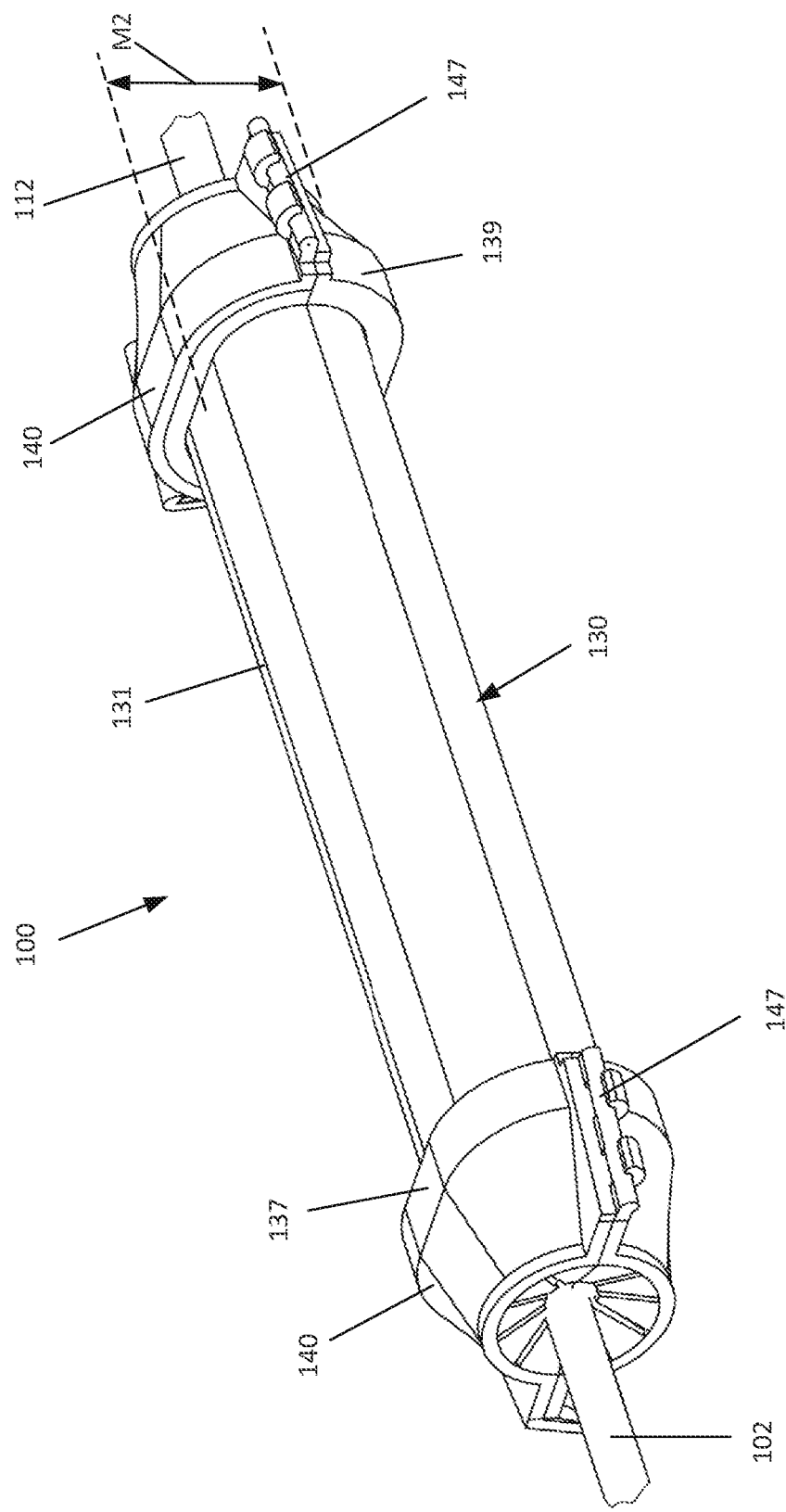
FIG. 3 is a second perspective view of the splice closure of FIG. 2.

FIGS. 2 and 3 illustrate an example splice closure 100 in which the protective arrangement 130 is visible. The protective arrangement 130 is suitable for use with any of the internal frameworks 120 shown and discussed herein. In certain implementations, the sheath 131 has a first major transverse cross-dimension M1 and a second major transverse cross-dimension M2 that extend across a transverse cross-sectional profile of the sheath 131. The second cross-dimension M2 is perpendicular to the cross-dimension M1. Both cross-dimensions M1, M2 are perpendicular to the length L of the sheath 131. In the example shown, the sheath 131 has an oblong transverse cross-sectional profile (e.g. the first and second cross-dimensions M1, M2 are different lengths). In other examples, however, the sheath 131 can have a circular transverse cross-sectional profile (e.g., the first and second cross-dimensions M1, M2 are different lengths).

In some implementations, the sheath 131 includes a single-piece conduit. In some examples, the single-piece sheath 131 is closed along the length L of the sheath 131 and open only at the axial ends 133, 135. In such examples, the sheath 131 may be threaded onto one of the cables 102, 112 before the optical splice S is formed. Alternatively, the sheath 131 may be threaded over a terminated end of one of the cables 102, 112 after the splice S is formed. In other examples, the single piece sheath 131 may define an axial slit that allows the splice(s) S of the cables 102, 112 to be laterally inserted into the sheath 131 through the slit (e.g., by flexing the sheath 131 to widen the slit). In other implementations, the sheath 131 can be formed from multiple pieces (e.g., from two half shells each extending along the length L of the sheath 131). Accordingly, the sheath 131 may be assembled around the splice location or the splice location. The sheath 131 is formed of a suitable material so that the sheath 131 is less flexible than the optical cables 102, 112.

In the example shown, each of the sealing arrangements 137, 139 includes an end cap 140 that mounts over a respective axial end 133, 135 of the sheath 131. Each cable 102, 112 enters the sheath 131 through one of the end caps 140. Each end cap 140 carries a gasket, gel seal, foam block, or other sealing mechanism 141 through which the respective cable 102, 112 passes when extending through the end cap 140 (e.g., see FIG. 4). In certain implementations, the axial ends 133, 135 of the sheath 131 are mechanically coupled to the respective end caps 140. For example, a shoulder of the sheath 131 may abut an opposing shoulder of the end cap 140 (e.g., see FIG. 5).

Figure 4:
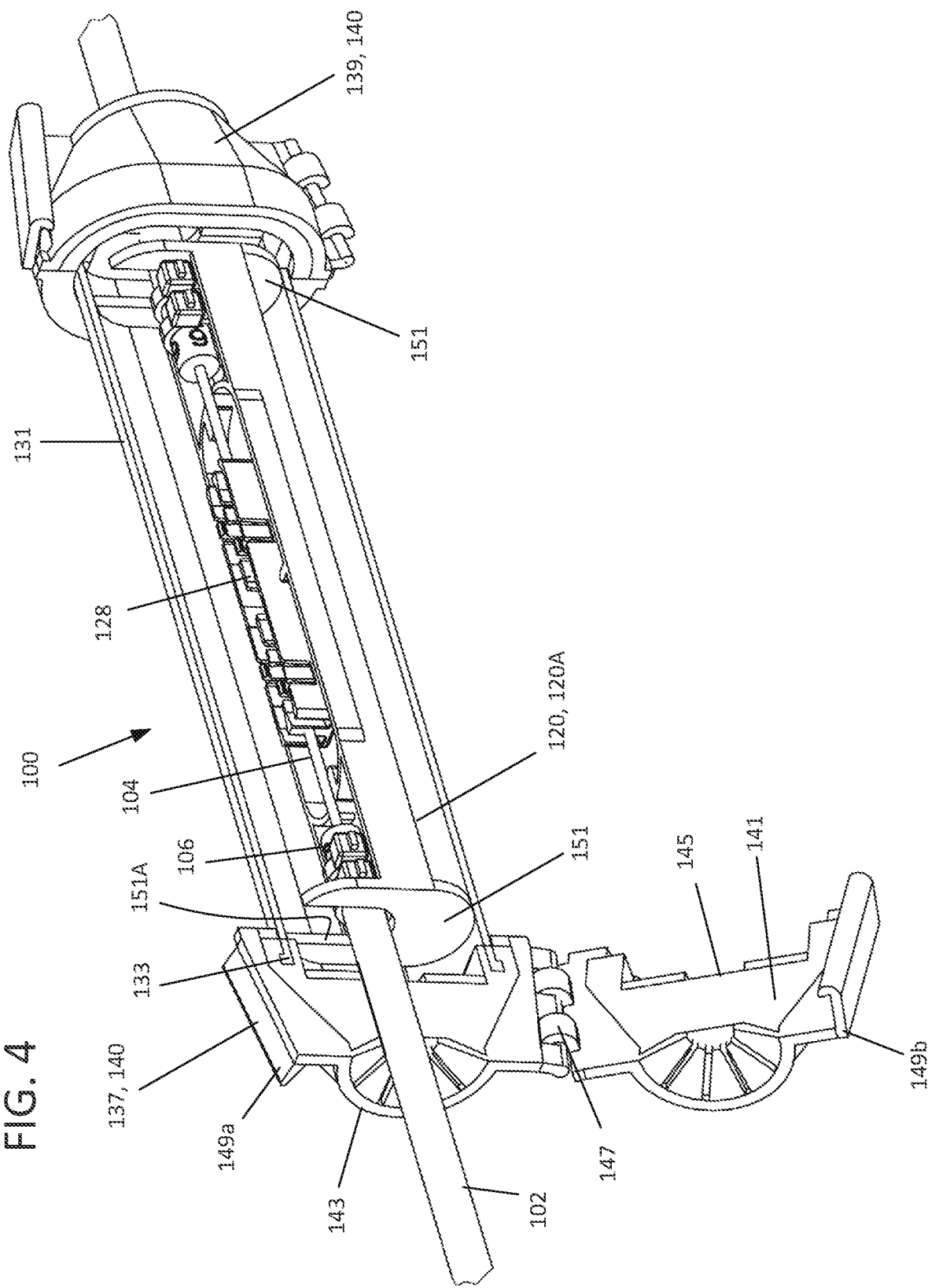
FIG. 4 is a perspective view of the splice closure of FIG. 3 with one of the end caps of the protective arrangement shown in an open position and half of the sheath of the protective arrangement removed so that a first example internal framework is visible.

In some implementations, the end caps 140 are configured for axial insertion of the cables 102, 112 therethrough. In other implementations, however, the end caps 140 are configured to wrap-around the cables 102, 112 to facilitate assembly of the splice closure 100. For example, as shown in FIG. 4, each end cap 140 includes a first part 143 and a second part 145 that cooperate to surround the respective cable 102, 112. In certain examples, each part 143, 145 carries a portion of the sealing mechanism 141. In the example shown, the first and second parts 143, 145 are pivotally coupled together at a hinge 147 at one end and secure together with a latching arrangement 149 at the opposite end. For example, the First part 143 may carry a catch surface 149a and the second part 145 may carry a latch arm 149b that snaps over the catch surface 149a. In other implementations, the first and second parts 143, 145 can be otherwise closed over the cables 102, 112.

Figure 5:
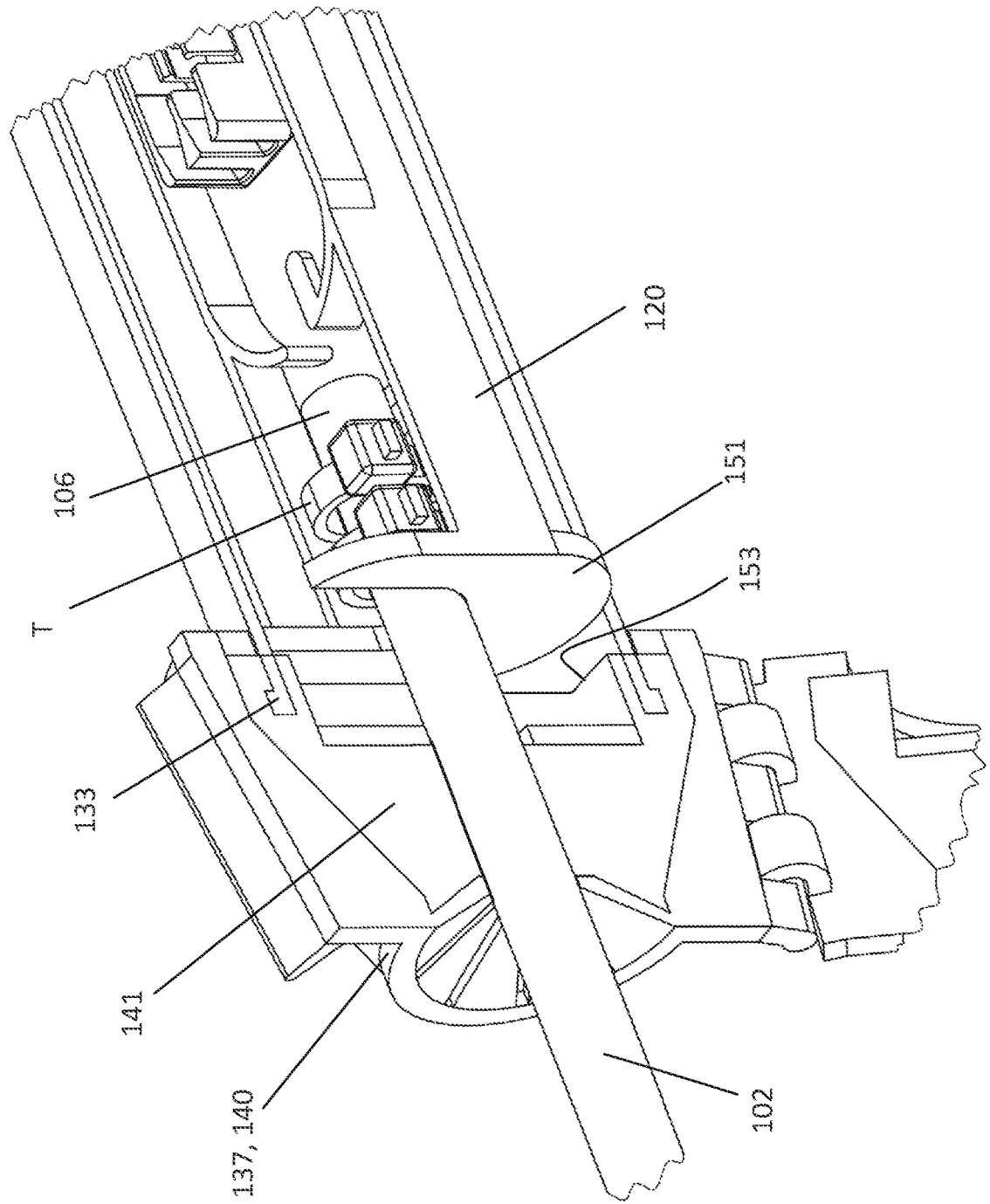
FIG. 5 is an enlarged view of a portion of FIG. 4.
Figure 6:
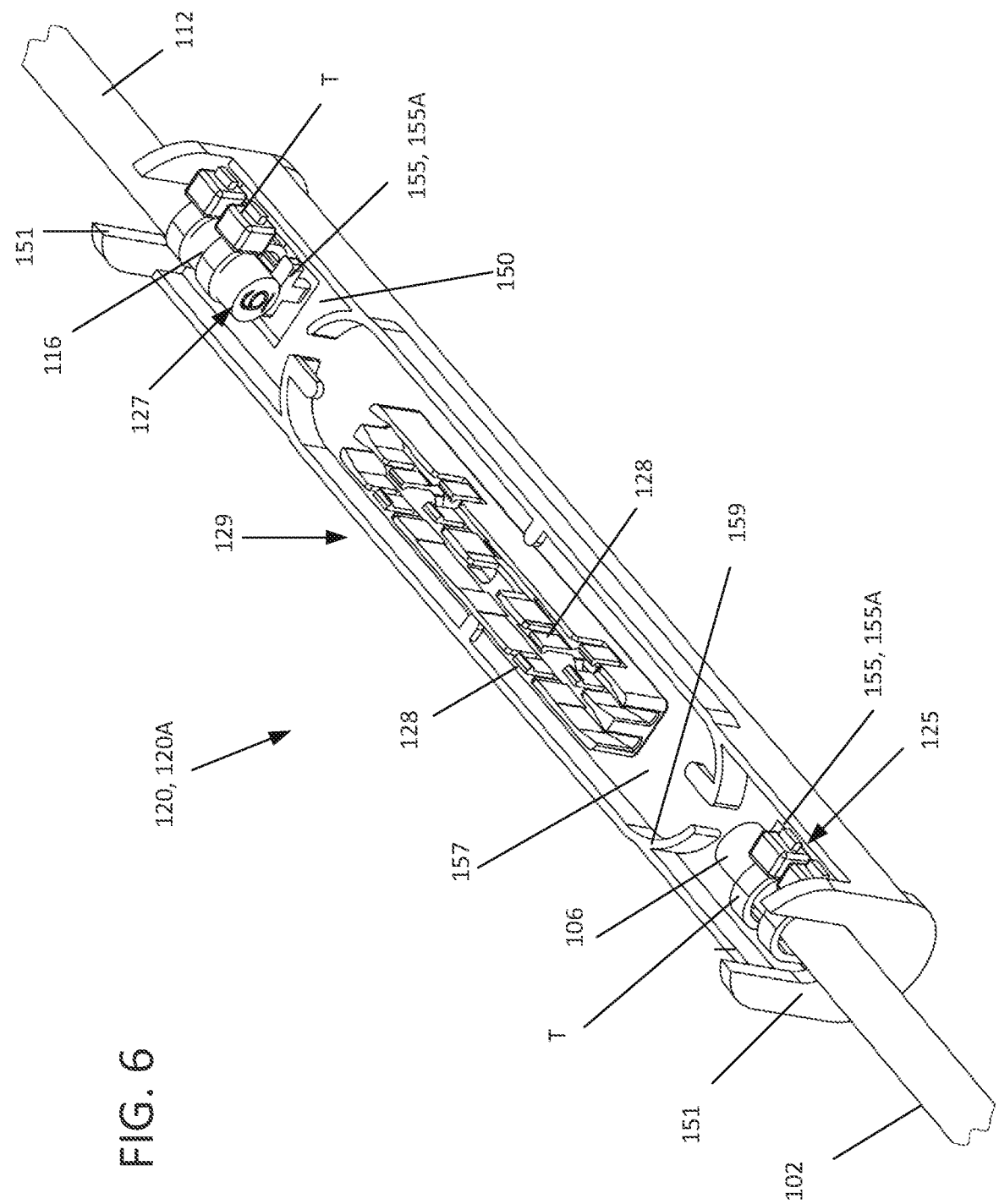
FIG. 6 is a perspective view of the first example framework of FIG. 4 removed from the protective arrangement.
Figure 7:
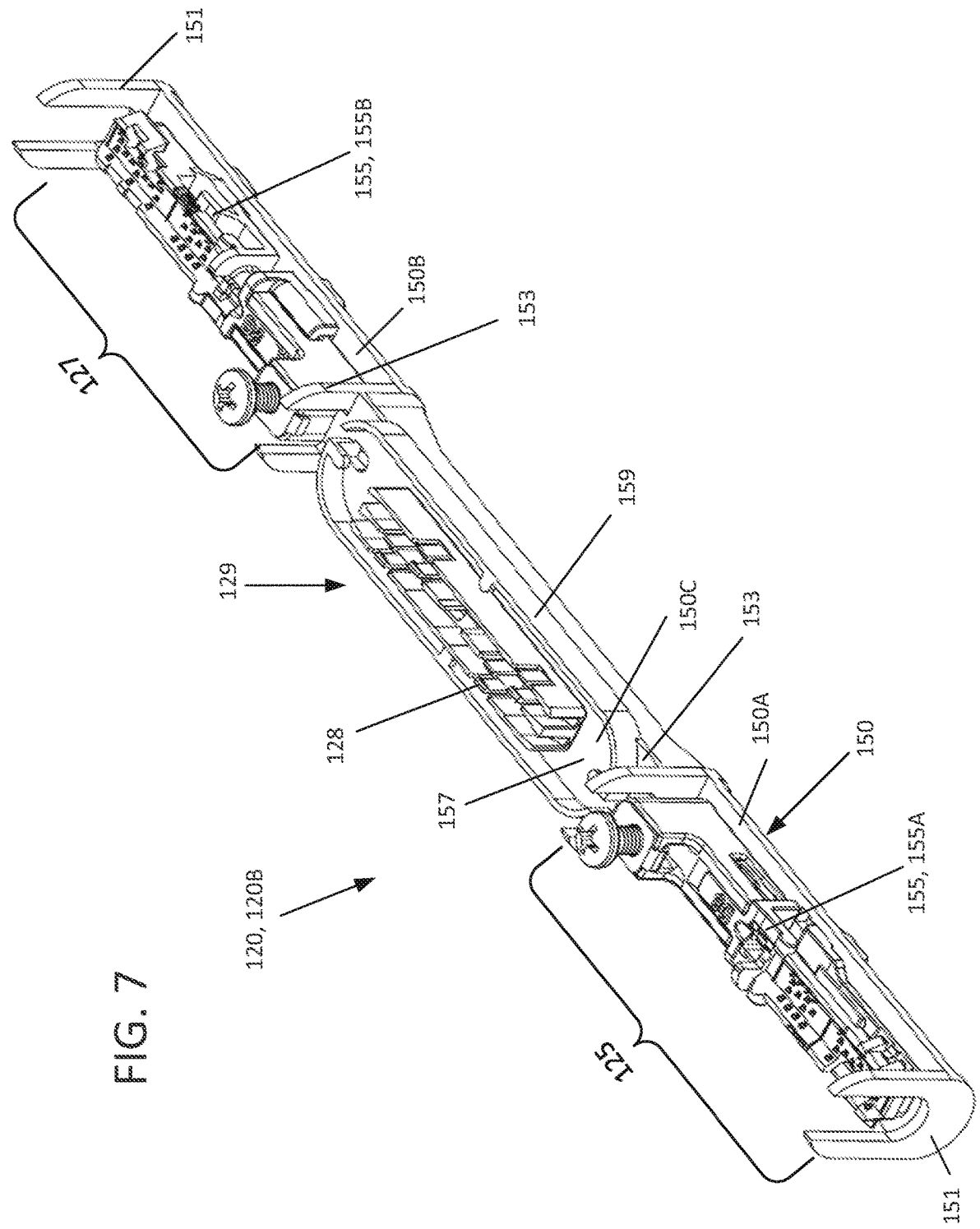
FIG. 7 is a perspective view of a second example framework suitable for use with the protective arrangement of FIGS. 2 and 3.
Figure 11:
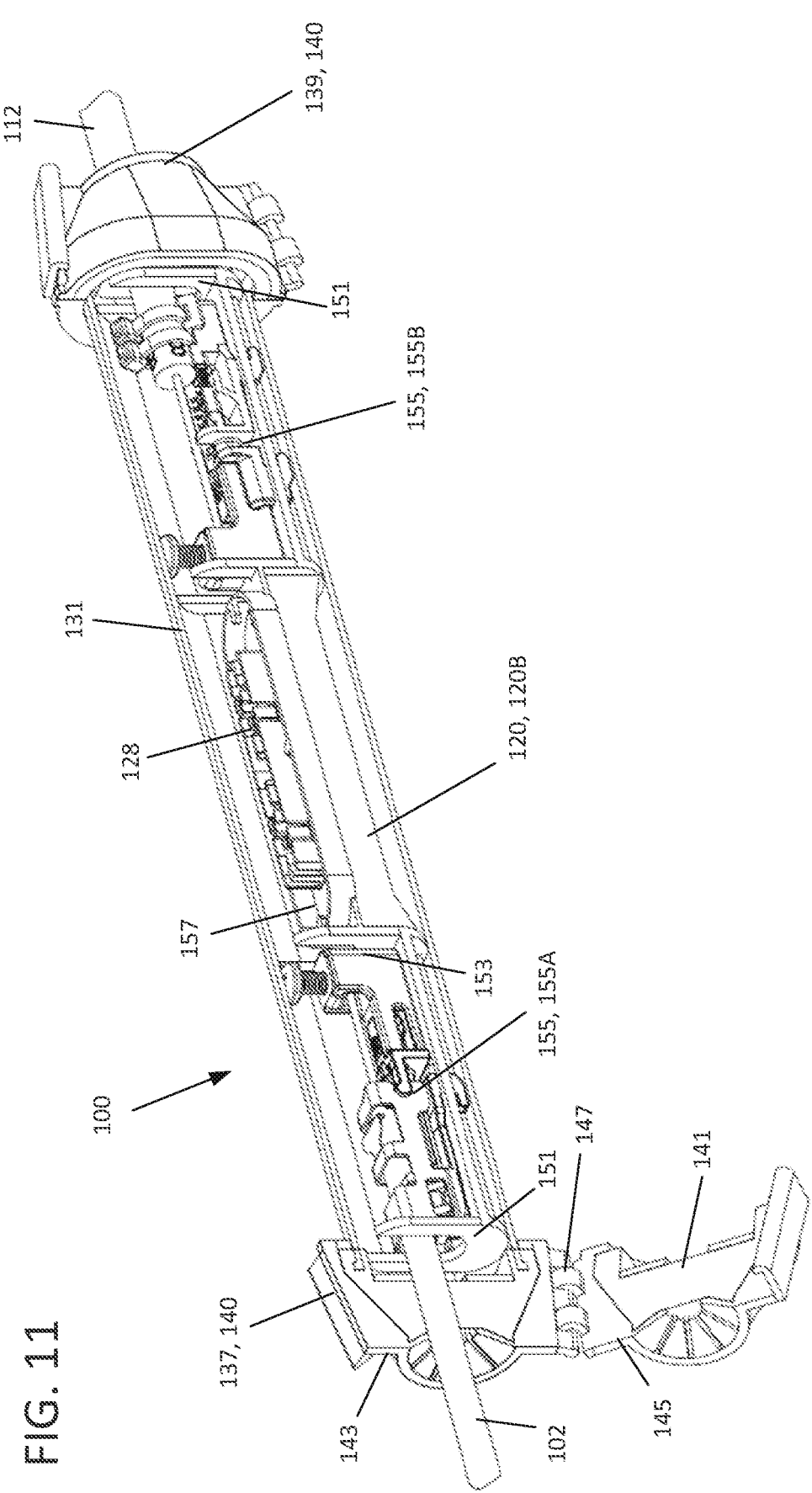
FIG. 11 shows the second example framework of FIG. 7 disposed within the protective arrangement of FIGS. 2 and 3 with one of the end caps of the protective arrangement shown in an open position and half of the sheath of the protective arrangement removed so that the second example internal framework is visible.
Figure 12:
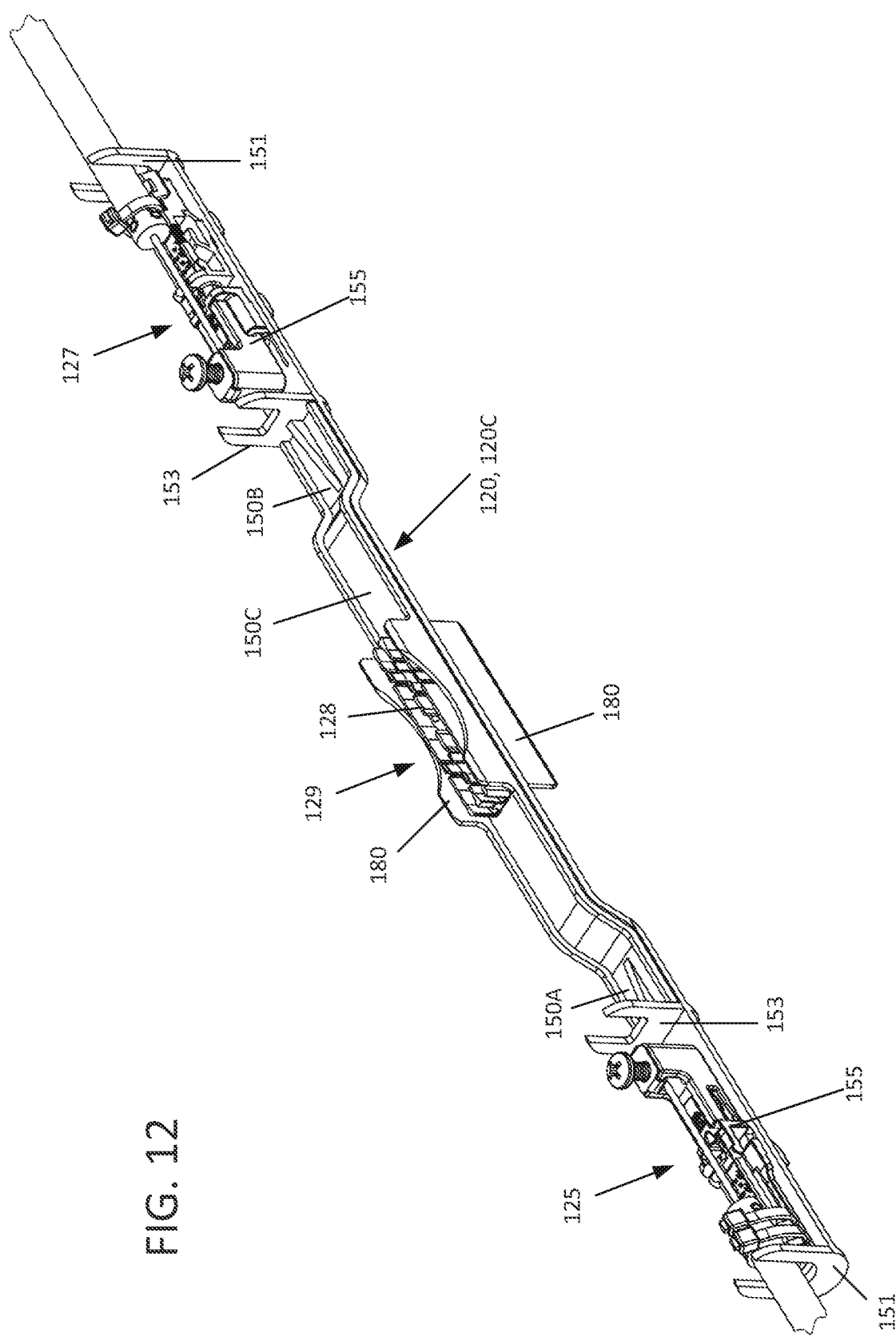
FIG. 12 is a perspective view of a third example framework suitable for use with the protective arrangement of FIGS. 2 and 3.
Figure 13:
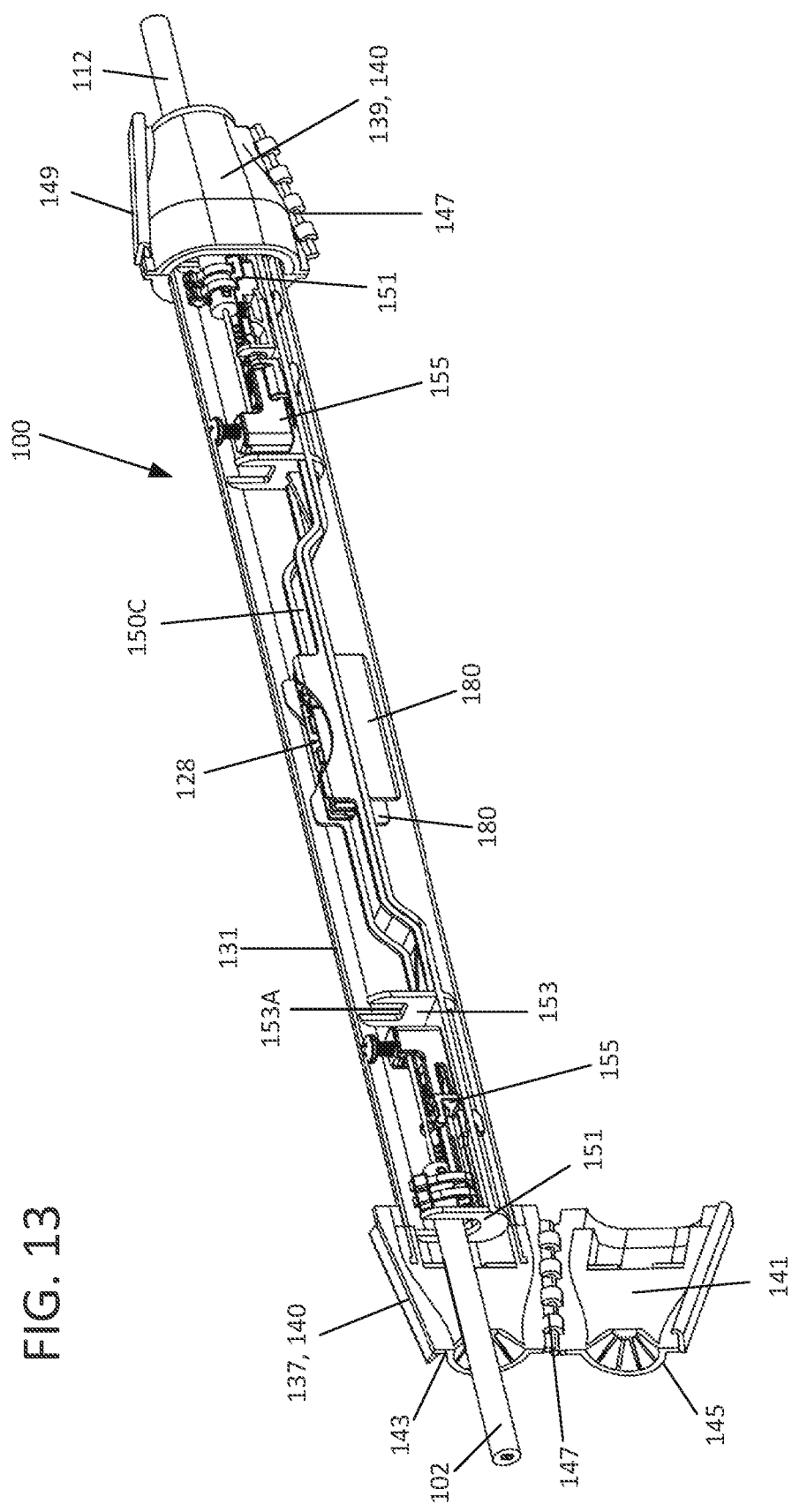
FIG. 13 shows the third example framework of FIG. 12 disposed within the protective arrangement of FIGS. 2 and 3 with one of the end caps of the protective arrangement shown in an open position and half of the sheath of the protective arrangement removed so that the third example internal framework is visible.

FIGS. 4-13 illustrates example internal frameworks 120A, 120B, 120C suitable for use with the protective arrangement 130 shown in FIGS. 2 and 3. FIGS. 4-6 illustrate a first example framework 120A, disposed within the protective arrangement 130; FIGS. 7-10 illustrate a second example framework 120B; and FIGS. 11-13 illustrate a third example framework 120B. The framework 120A, 120B, 120C includes a base 150 extending between sheath supports 151 disposed at opposite axial ends 121, 123 of the framework 120A, 120B, 120C.

In certain implementations, the framework 120, 120A, 120B, 120C is sized to fit fully within the sheath 131. In certain examples, a distance between the axial ends 121, 123 of the framework 120, 120A, 120B, 120C is shorter than the length L of the sheath 131. In certain examples, each of the sheath supports 151 extends across a majority of the first cross-dimension M1 of the sheath 131 and across a majority of the second cross-dimension M2 of the sheath 131. Accordingly, in certain examples, the sheath supports 151 aid in positioning the framework 120, 120A, 120B, 120C within the through-passage of the sheath 131. In certain examples, the sheath supports 151 may inhibit crushing of the sheath 131. Each sheath support 151 defines a notch 151A or aperture through which the cable 102, 112 passes through the sheath support 151 (e.g. see FIG. 4).

The base 150 of the framework 120, 120A, 120B, 120C carries a splice holder 128 at an intermediate region between the sheath supports 151. In certain examples, the splice holder 128 includes a plurality of opposing latch arms between which the splice S (e.g. or a protective sleeve such as a SMOUV protective sleeve about the splice S) snap fits. In certain examples, the splice holder 128 includes multiple pairs of latch arms (e.g., to hold multiple splices S between the cables 102, 112 or to provide a variety of positions at which the splice S can be held).

The base 150 of the framework 120, 120A also carries a cable fixation structure 155 at the first and second cable fixation regions 125, 127. In the example shown in FIG. 6, the same cable fixation structure 155 is mounted at both cable fixation regions 125, 127. In other examples, however, each cable fixation region 125, 127 can receive a different cable fixation structure 155. In some examples, the cable fixation structure 155 is integral with the base 150 (e.g., see FIG. 6). In other examples, the cable fixation structure 155 is a separate piece that mounts to the base 150 (e.g., see FIGS. 8 and 9).

In certain implementations, the base 150 is configured to align fibers 104, 114 of the fixed cables 102, 112 with the splice holder 128 at the splice holder region 129 to inhibit lateral strain on the fibers 104, 114. In some examples, the base 150 includes a planar surface extending between the two sheath supports 151. In the example shown in FIG. 6, the cable fixation structure 155 holds the cable jackets 106, 116 directly to the base 150 so that the optical fibers 104, 114 are aligned with the splice holder 128. In other examples, however, the cable fixation structure 155 may elevate the cable jackets 106, 116 off the base 150. In such examples, the base 150 may include an elevated surface 150C at the splice management region 129 compared to the surfaces 150A, 150B at the cable fixation regions 125, 127 as will be described in further detail herein (e.g., see FIGS. 7 and 12).

FIGS. 4-6 illustrate a first example framework 120A defining an integral cable fixation structure 155. The cable fixation structure 155 disposed at the cable fixation regions 125, 127 of the framework 120A includes a support surface 155A about which a cable tie T can be wrapped to secure the respective cable 102, 112 to the support surface 155A. In the example shown, the support surface 155A is cantilevered within an aperture. In other examples, the support surface 155A can be disposed between opposing apertures for receiving the cable tie T.

In certain implementations, the framework 120A includes a fiber storage region 157 at which excess fiber length of the optical fibers 104, 114 of the cables 102, 112 are stored. In certain examples, the fiber storage region 157 is disposed at an intermediate region of the framework 120A between the sheath supports 151. In certain examples, the fiber storage region 157 is disposed around the splice management region 129. For example, the fiber storage region 157 may include a guide wall 159 extending upwardly from the base 150 to form a guide path around the splice holder 128. In the example shown, the guide wall 159 defines a respective storage region entrance (e.g., gap in the wall 159) aligned with each cable fixation region 125, 127.

In use, the cable fibers 104, 114 are spliced together (e.g., at an optical fusion splicing machine). The optical splice S is positioned at the splice holder 128 at the splice management region 129 of the framework 120A. The fibers 104, 114 are routed through the storage region entrances towards the cable fixation regions 125, 127, respectively. The cables 102, 112 (e.g., the cable jackets 106, 116 and/or the cable strength members 108, 118) are fixed directly to the framework 120 at the cable fixation regions 125, 127. If needed, excess length of the fibers 104, 114 may be wrapped around the fiber storage region 157. The cable sheath 131 is positioned around the framework 120A and the end caps 140 are fastened to the cable sheath 131 to seal the framework 120A within the sheath 131.

FIGS. 7-11 illustrate a second example framework 120B carrying cable fixation structures 155 that are separate from the base 150. The framework 120B includes inner sheath supports 153 that cooperate with the outer sheath supports 151 to define the cable fixation regions 125, 127 (e.g., see FIG. 7). The base 150 includes a first mounting surface 150A extending between one of the outer sheaths 151 and one of the inner sheaths 153 and a second mounting structure 150B extending between the other outer sheath 151 and another of the inner sheaths 153. The mounting surfaces 150A, 150B are each configured to receive a respective cable fixation structure 155A, 155B (e.g., by a snap-fit connection).

In certain implementations, the cable fixation structures 155A, 155B are each configured to elevate the cable 102, 112 off the base surface 150A, 150B, respectively. Accordingly, the base 150 defines an elevated surface 150C that offsets the splice holder 128 from the fixation mounting surfaces 150A, 150B. Accordingly, the fibers 104, 114 transition from the cable fixation regions 125, 127 to the elevated surface 150C without adding lateral strain to the fibers 104, 114.

Figure 8:
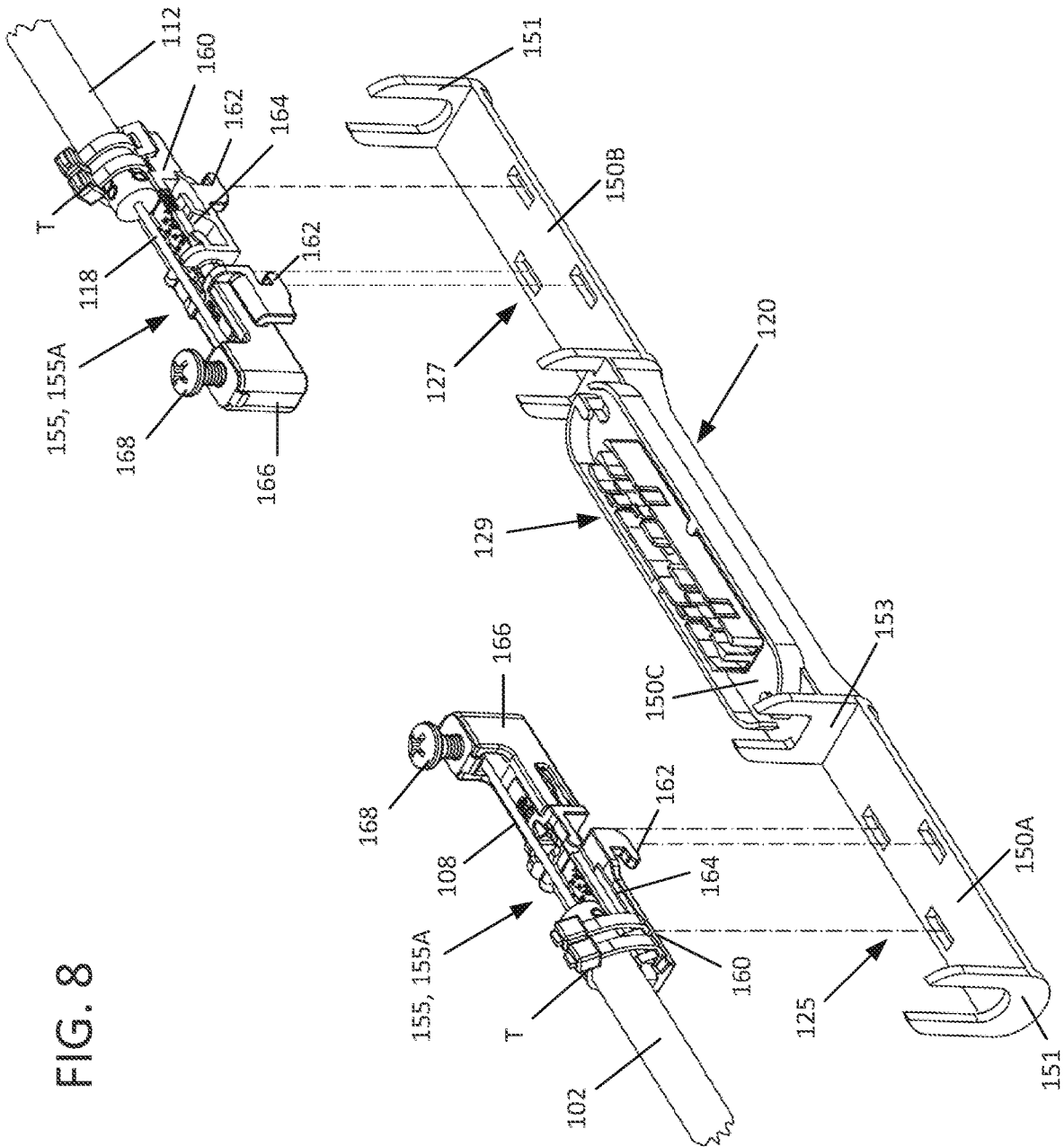
FIG. 8 shows the cable fixation arrangements of FIG. 7 exploded from the base of the second framework.
Figure 9:
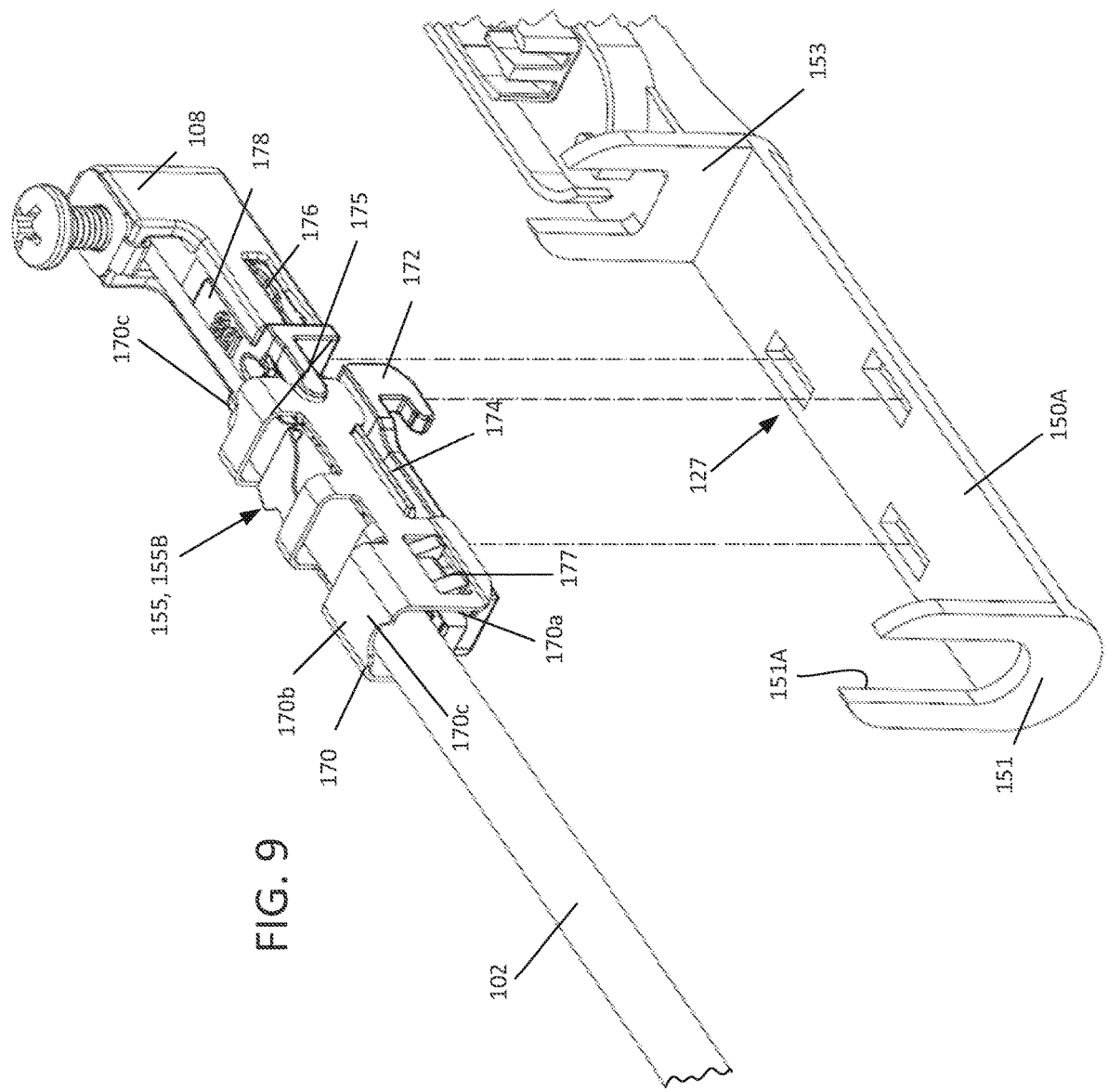
FIG. 9 is an enlarged view of a first cable fixation region of the second framework of FIG. 7 showing an alternative example of a cable fixation arrangement exploded from the second framework.
Figure 10:
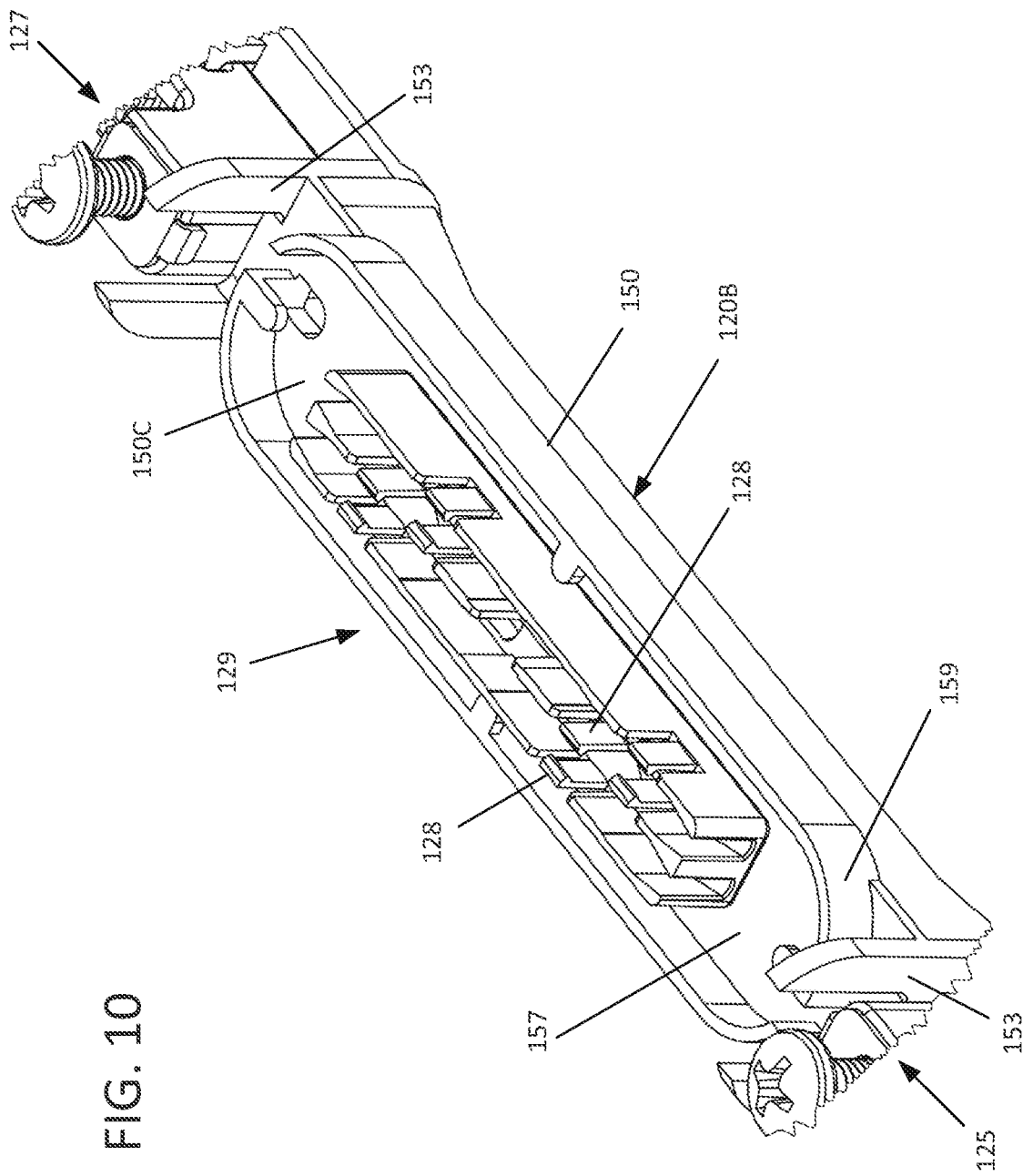
FIG. 10 is an enlarged view of the splice management region and a fiber storage region of the second example framework of FIG. 7.

FIGS. 8 and 9 each illustrate first and second example cable fixation structures 155A, 155B suitable for use with the framework 120B. In the example shown in FIG. 8, the first cable fixation structure 155A is disposed at both the first cable fixation region 125 and the second cable fixation region 127. In other examples, however, the second cable fixation structure 155B can be disposed at both cable fixation regions 125, 127 or the first cable fixation structure 155A can be disposed at one of the cable fixation regions 125, 127 while the second cable fixation structure 155B is disposed at the other cable fixation region 125, 127. Other cable fixation structures are possible.

In certain examples, the cable fixation structures 155A, 155B are configured to accommodate cables having various types of strength members (e.g., rigid strength rods, flexible yarn, etc.). For example, the cable fixation assembly 155A, 155B may include a cable support body having a first type of strength member anchor and being adaptable to anchor a second type of strength member by coupling a strength member anchor adapter to the cable support body.

As shown in FIGS. 8 and 9, each of the cable fixation structures 155A, 155B includes a cable support body 160, 170 that defines a seat for mounting the cable 102, 112 and mounting structure (e.g., one or more hooks) 162, 172 that enables the cable support body 160, 170 to attach to the mounting surface 150A, 150B of the base 150. The cable support body 160, 170 also defines a first anchoring arrangement for retaining the cable 102, 112. In certain implementations, an anchor adapter 166, 176 couples to the cable support body 160, 170. The anchor adapter 166, 176 provides a separate anchor point for the cable 102, 112.

In the example shown in FIG. 8, the cable support body 160 defines tie wrap passages to support cable ties T wrapped around the jacket 106, 116 of the cable 102, 112 received at the seat. The cable support body 160 also includes a strength member anchoring arrangement 164 adapted to anchor a strength member 108, 118 of a first type to the cable support body 160. In the example shown, the strength member anchoring arrangement 164 includes one or more channels within which a yarn type strength member extends before wrapping around the tie wraps T. The anchor adapter 166 is adapted to anchor a cable strength member of a second type, the second type being different from the first type. In the example shown, the anchor adapter 166 includes a press screw 168 for mounting a rigid rod type strength member.

In the example shown in FIG. 9, the cable support body 170 includes a base 170a and a cover 170b that cooperate to clamp the cable 102, 112 therebetween. For example, the cover 170b may pivot relative to the base 170a about a pivot hinge 175 to clamp onto the cable 102, 112 (e.g., at a compression member 173). The base 170a may define latching teeth or catch surfaces 177 that engage catch surfaces or latching arms on the cover 170b. The mounting structure 172 is disposed at the base 170a. In certain examples, the base 170a and cover 170b may clamp strength yarns therebetween to anchor the cable. For example, the strength yarns can be looped longitudinally along the length of the cover 170b (see notches 170c) before the cover 170b is clamped over the cable 102, 112. Alternatively, an anchor adapter 176 with press screw 178 can be mounted to the base 170b to mount a rigid rod type strength member.

In certain implementations, the framework 120B also includes a fiber storage region 157 at which excess fiber length of the optical fibers 104, 114 of the cables 102, 112 are stored. In certain examples, the fiber storage region 157 is disposed at an intermediate region of the framework 120B between the sheath supports 151. In certain examples, the fiber storage region 157 is disposed around the splice management region 129. For example, the fiber storage region 157 may include a guide wall 159 extending upwardly from the base surface 150C to form a guide path around the splice holder 128. In the example shown, the guide wall 159 defines a respective storage region entrance (e.g., gap in the wall 159) aligned with each cable fixation region 125, 127.

In use, the terminated ends of the cable jackets 106, 116 are fixed to the respective fixation structures 155 prior to the fixation structures 155 being mounted to the framework 120B. In certain examples, the cable strength members 108, 118 also are fixed to the fixation structures 155. The optical fibers 104, 114 are optically coupled together at one or more optical splices S. The fixation structures 155 may facilitate handling of the cables 102, 112 during the splicing operation. The fixation structures 155 are then mounted to the base 150 at the cable fixation regions 125, 127 and the splice(s) S are mounted to the splice holder 128. Excess length of the fibers is wrapped around the guide path at the fiber storage region 157. The sheath 131 is positioned around the framework 120B and the end caps 140 are fastened to the cable sheath 131 to seal the framework 120B within the sheath 131 (e.g., see FIG. 11).

FIGS. 12 and 13 illustrate a third example framework 120C carrying cable fixation structures 155 that are separate from the base 150. The framework 120C includes inner sheath supports 153 that cooperate with the outer sheath supports 151 to define the cable fixation regions 125, 127 (e.g., see FIG. 12).

The base 150 of the framework 120C includes a first mounting surface 150A extending between one of the outer sheaths 151 and one of the inner sheaths 153 and a second mounting structure 150B extending between the other outer sheath 151 and another of the inner sheaths 153. The mounting surfaces 150A, 150B are each configured to receive a respective cable fixation structure 155, 155 (e.g., by a snap-fit connection). As with the second framework 120B, the cable fixation structures 155 are each configured to elevate the cable 102, 112 off the base surface 150A, 150B, respectively. Accordingly, the base 150 defines an elevated surface 150C that offsets the splice holder 128 from the fixation mounting surfaces 150A, 150B. Accordingly, the fibers 104, 114 transition from the cable fixation regions 125, 127 to the elevated surface 150C without adding lateral strain to the fibers 104, 114.

In some implementations, the cable fixation structures 155 are the same as shown with the second framework 120B. In other implementations, other types of cable fixation structures can be utilized. Further examples of cable fixation structures 155 suitable for use with the frameworks 120B, 120C disclosed herein are provided in US 2020/0073071 WO 2019/241502, WO 2020/154418, WO 2020/172153, PCT Appl. No. PCT/US2020/041632, PCT Appl. No. PCT/US2020/029356 filed Apr. 22, 2020, PCT Appl. No. PCT/US2020/050715 filed Sep. 14, 2020, PCT App No. PCT/US2020/050876 filed Sep. 15, 2020, U.S. Appl. No. 62/959,355 filed Jan. 10, 2020, and U.S. Appl. No. 62/972,864 filed Feb. 11, 2020 the disclosures of which are hereby incorporate herein by reference in their entirety.

In certain implementations, spacer walls 180 are disposed at the splice management region 129. The spacer walls 180 extend upwardly and downwardly from opposite sides of the base surface 150C. In certain examples, as shown in FIG. 13, the spacer walls 180 extend along a majority of the first cross-dimension M1 of the sheath 131. The spacer walls 180 may aid in positioning the third framework 120C—including the splice management region 129—within the sheath 131. The spacer walls 180 may reinforce the sheath 131 at the splice management region 129 to inhibit crushing or other damage to the splices S retained at the splice holder 128.

In certain implementations, the framework 120C does not includes a fiber storage region at which excess fiber length of the optical fibers 104, 114 of the cables 102, 112 is stored. In certain implementations, the cable fixation regions 125, 127 are spaced further from the splice management region 129 on the third framework 120C than on the first and second frameworks 120A, 120B. For example, the splice management region 129 may be spaced from each cable fixation region 125, 127 by at least a length of the splice management region 129. This extra spacing may held accommodate excess length. However, extra spacing requires a longer overall splice closure 100.

In use, the terminated ends of the cable jackets 106, 116 are fixed to the respective fixation structures 155 prior to the fixation structures 155 being mounted to the framework 120C. In certain examples, the cable strength members 108, 118 also are fixed to the fixation structures 155. The optical fibers 104, 114 are optically coupled together at one or more optical splices S. The fixation structures 155 may facilitate handling of the cables 102, 112 during the splicing operation. The fixation structures 155 are then mounted to the base 150 at the cable fixation regions 125, 127 and the splice(s) S are mounted to the splice holder 128. The sheath 131 is positioned around the framework 120C and the end caps 140 are fastened to the cable sheath 131 to seal the framework 120C within the sheath 131 (e.g., see FIG. 13).

FIGS. 14-28 illustrate an example splice closure 200 in which the splice region 229 is offset from the axis A. The first end 233 of the casing 231 defines an aperture for the cable 102 and the second end 235 of the casing 231 defines an aperture for the cable 112. In certain implementations, the casing 231 is formed from multiple pieces 240, 241 (e.g., from two half shells each extending along the axis A). Accordingly, the casing 231 may be assembled around the splice location and the framework 220. The sheath 231 is formed of a suitable material so that the sheath 231 is less flexible than the optical cables 102, 112.

In certain implementations, the sheath 231 has a longest section aligned with the axis A. In certain examples, the sheath 231 has a height extending along an axis B (FIG. 19) perpendicular to axis A and a depth extending perpendicular to both axes A and B. The height and depth are both shorter than the length. The depth is shorter than the height. In certain examples, each cable port 290 extends across at least a quarter of the depth of the closure 200. In certain examples, each cable port 290 extends across at least a third of the depth of the closure 200.

Each piece 240, 241 of the sheath 231 defines a groove 242, 243 at the first and second ends 233, 235. The grooves 242, 243 cooperate with each other to define the apertures 290 (FIG. 14) for the cables 102, 112. In the example shown, the grooves 242 are deeper than the grooves 243. In other examples, the grooves 242, 243 may be the same. In certain implementations, each sheath piece 240, 241 defines a pocket 244 adjacent each groove 242, 243. A sealing member 237, 239 (e.g., a block of gel (e.g., thixotropic gel), foam, rubber, or other seal) is disposed in the pockets 244 of at least one of the sheath pieces 240, 241 to seal against the cables 102, 112 entering the sheath 231. In certain implementations, one of the sheath pieces 240, 241 defines a peripheral groove in which a gasket (e.g., an H-seal gasket) is disposed, and the other sheath piece includes a structure such as a peripheral sealing rib that is adapted to engage the gasket when the sheath is closed to provide sealing. The gasket seals an interior of the sheath 231 when the sheath pieces 240, 241 are assembled by sealing a perimeter of the sheath 231.

Figure 31:
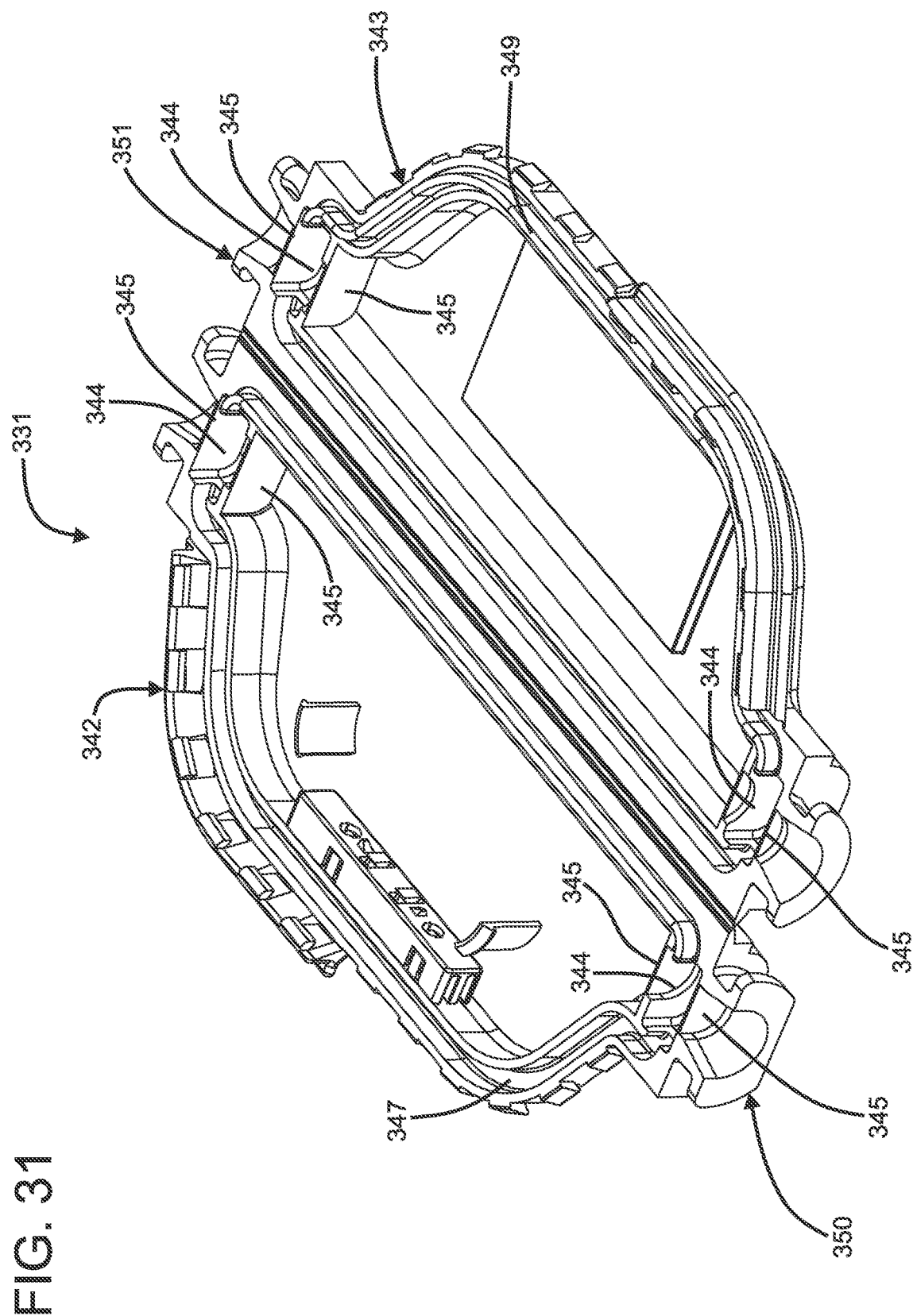
FIG. 31 is a perspective view of another closure in accordance with the principles of the present disclosure shown in an open configuration.
Figure 32:
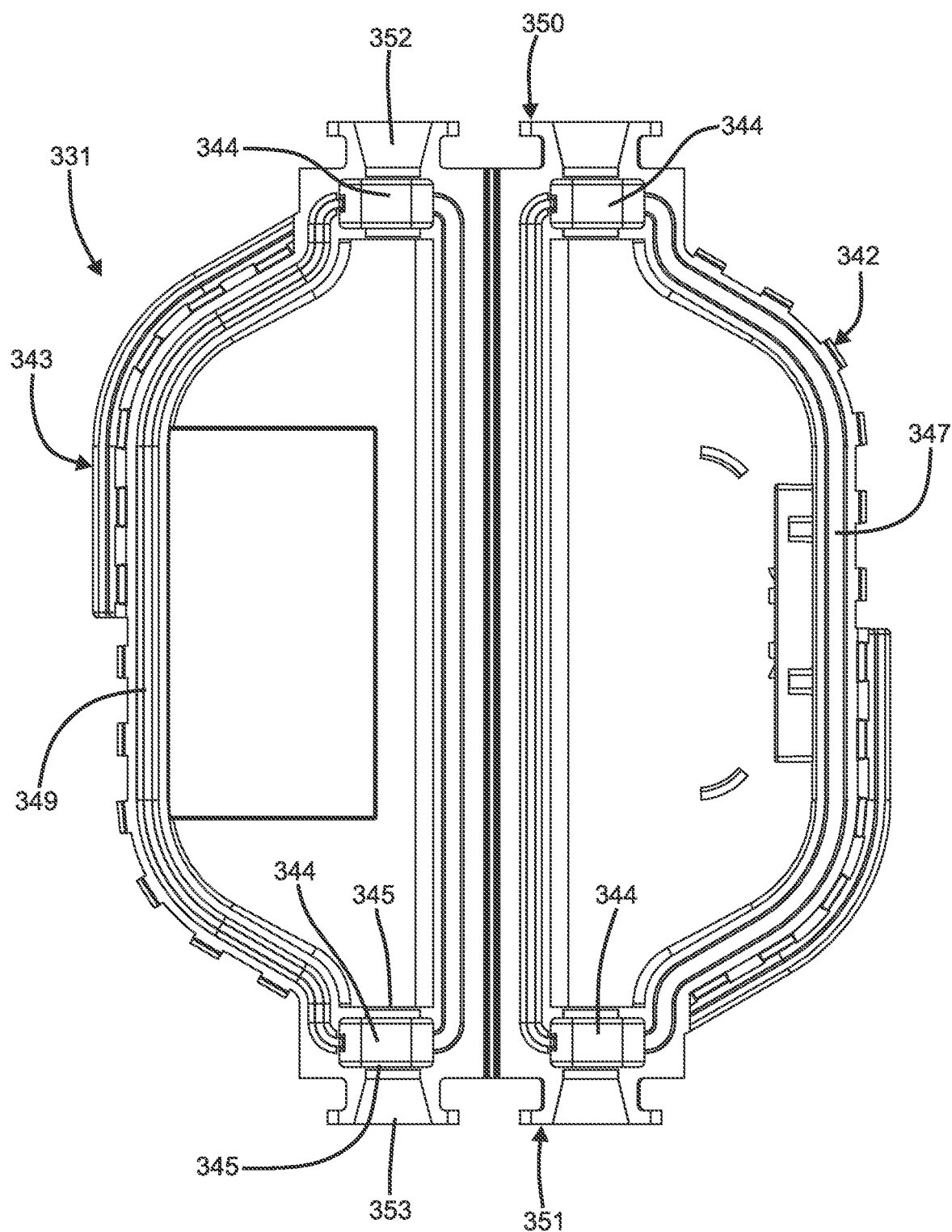
FIG. 32 is a plan view of the closure of FIG. 31.

FIGS. 31 and 32 show another sheath 331 having an alternative perimeter sealing configuration. The sheath 331 can be used as a splice closure such as an in-line splice closure. The sheath 331 includes sheath pieces 342, 343 that mate together in a sealed manner to enclose the sheath 331. In one example, the sheath pieces 342, 343 define pairs of cable sealing pockets 344 at opposite ends of the sheath 331. The cable sealing pockets 344 are defined between relatively thin, deformable walls 345 configured to deform to accommodate a cable routed into or out of the closure. Sheath piece 342 defines a perimeter groove 347 and sheath piece 343 defines a corresponding perimeter sealing rib 349. Sealant for sealing the cable entries and perimeter of the sheath can be applied as a liquid into the groove 347 and pockets 344 and allowed to cure. The walls 345 assist in retaining the liquid sealant in the pockets 344 until it cures. The sheath 331 includes first and second opposite ends 350, 351 (i.e., first and second sheath/closure ends) respectively defining first and second cable ports 352, 353 each configured for routing a cable into/out of the sheath 331 through a corresponding one of the pairs of cable sealing pockets 344. In the depicted example, only a single cable port 352, 353 is defined at each end 350, 351. In the depicted example, the sheath 351 has an in-line configuration and the ports 352, 353 are co-axially aligned. Optical fibers of cables routed through the first and second ports 352, 353 can be optically spliced together at a splice location protected within the sheath 331.

Figure 14:
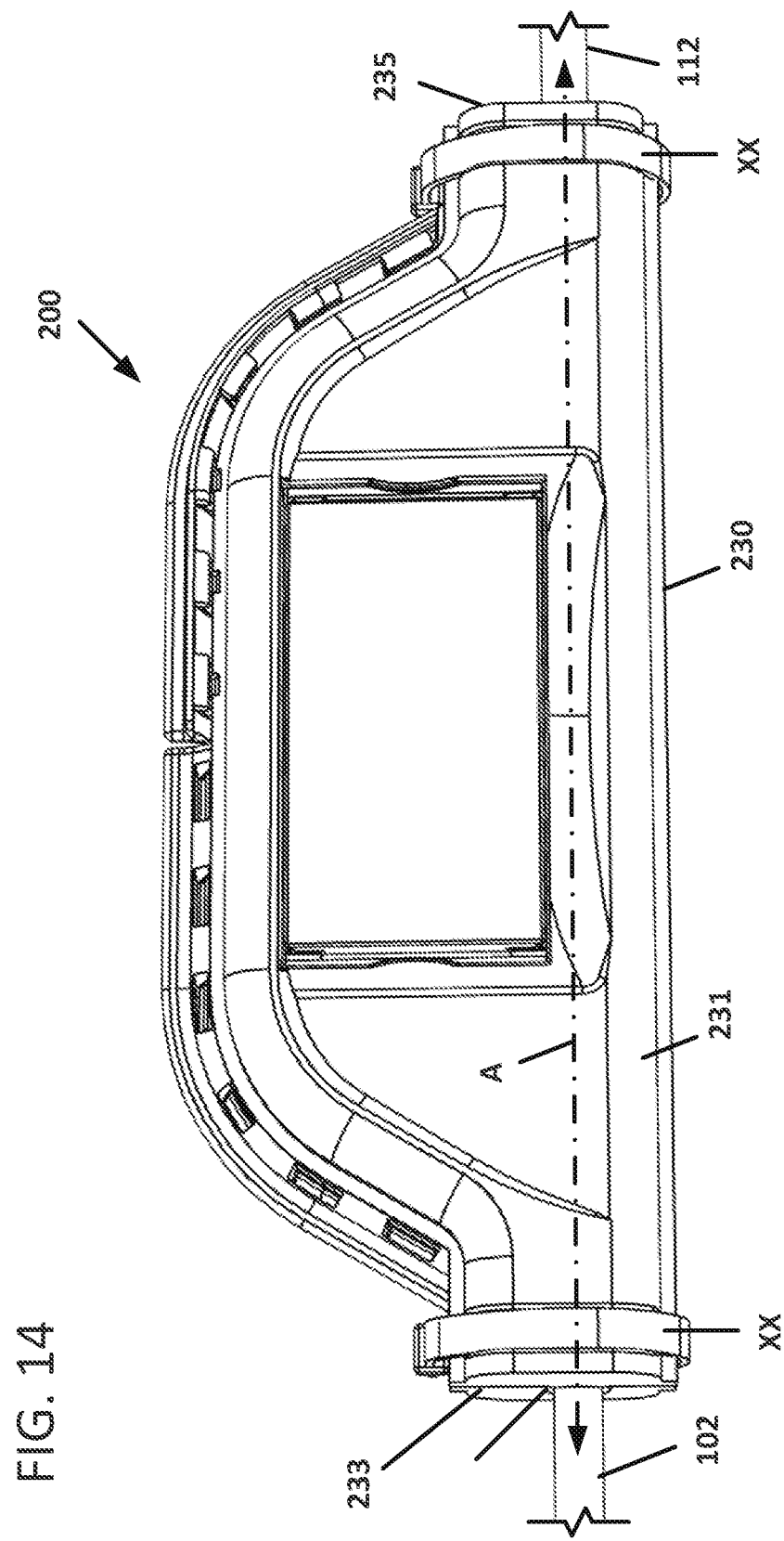
FIG. 14 is a side elevational view of another example closure configured in accordance with the principles of the present disclosure.
Figure 15:
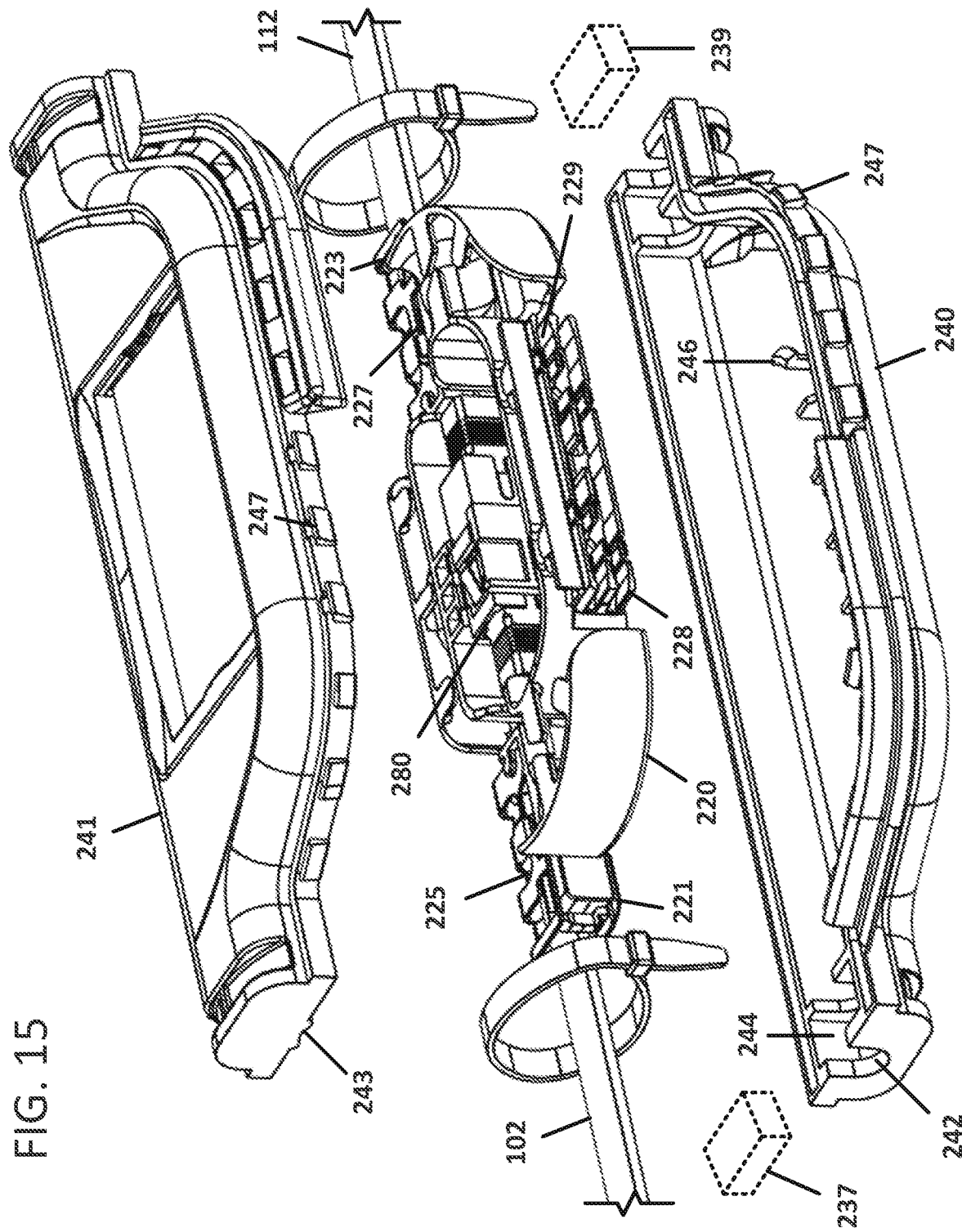
FIG. 15 is a perspective view of the closure of FIG. 14 with the sheath pieces exploded outwardly from an internal framework.
Figure 16:
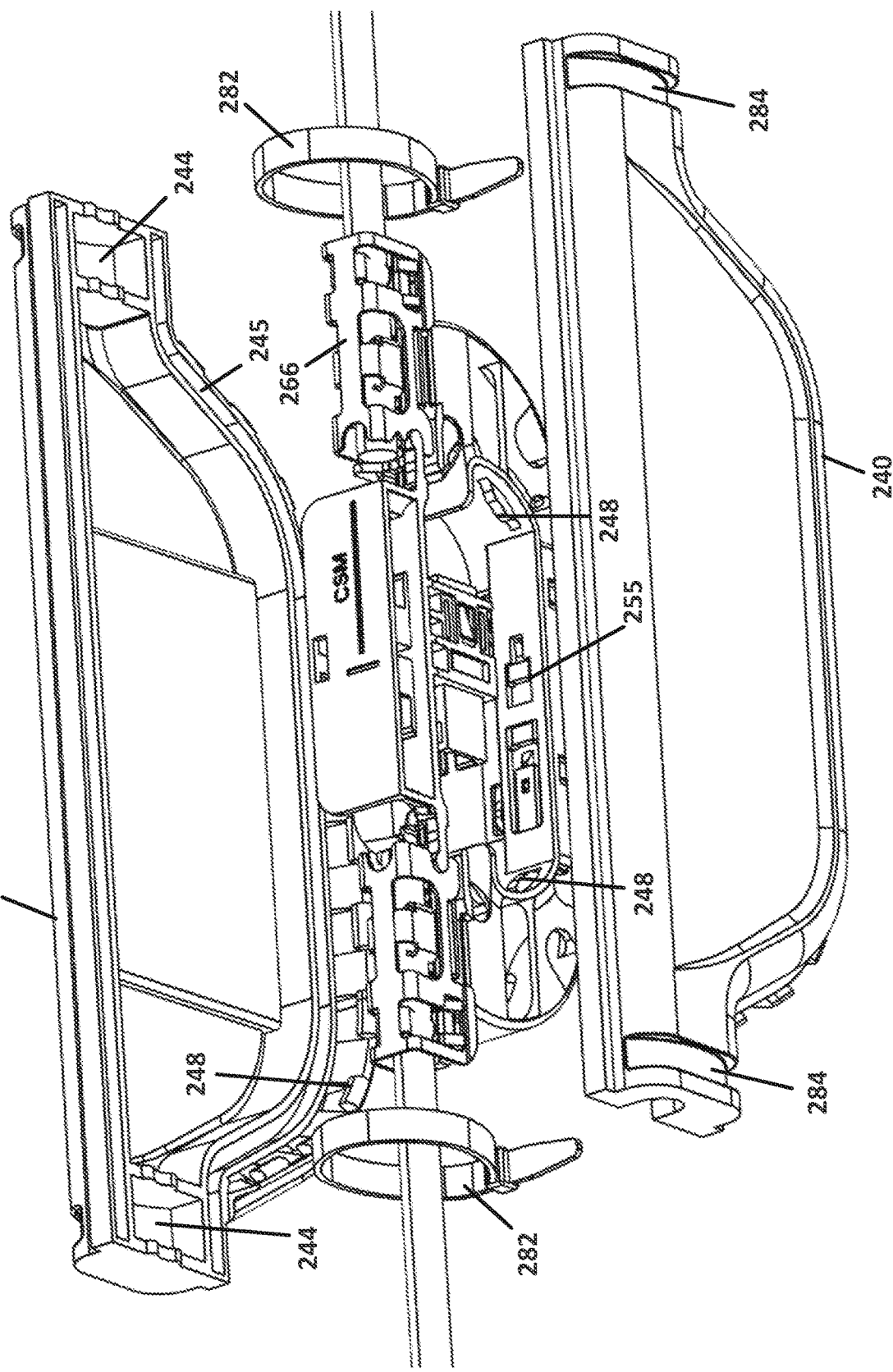
FIG. 16 is another perspective view of the closure of FIG. 15.

FIGS. 17-22 illustrates an example internal framework 220 suitable for use with the protective arrangement 230 shown in FIGS. 14-16. The internal framework 220 is sized to fit fully within the sheath 231. In certain examples, a distance between the axial ends 221, 223 of the framework 220 is shorter than a length L of the sheath 231 along the axis A. The framework 220 includes a first cable fixation region 225 at the first end 221, a second cable fixation region 227 at the second end 223, and a routing section 250 disposed between the cable fixation regions 225, 227. The first and second cable fixation regions 225, 227 ate coaxially aligned along the axis A. At least portions of the routing section 250 are aligned along the axis A. In certain implementations, the routing section 250 includes a curved surface 251 extending between the first and second cable fixation regions 225, 227. In one example, the curved surface 250 includes a convex curvature that extends along the axis A.

The internal framework 220 includes a loop storage section 252 that holds excess length of fibers of the cables 102, 112 routed into the closure 200. The loop storage section 252 defines a loop passage 253 through which excess length of fibers of the cables 102, 112 may extend. The loop storage section 252 include bend radius limiters 254 to inhibits excessive bending along the loop passage 253. In certain implementations, the routing section 250 forms part of the loop storage section 252. The loop storage section 252 has an oblong shape defined by a major axis parallel to the axis A and a minor axis B that is perpendicular to the major axis. The minor axis B passes through the routing section 250 (FIG. 19).

In certain implementations, the splice region 229 is disposed along the loop storage section 252. In certain examples, the splice region 229 is disposed in at least partial alignment with the routing section 250 along the axis B (FIG. 19). The splice region 229 and the splice holder 228 define attachment structure 255 that holds the splice holder 228 to the splice region 229 (see FIG. 18). In the example shown, the attachment structure 255 has a dovetail-like configuration. In other examples, the attachment structure 255 can be latches and catch surfaces, fasteners and fastener openings, etc.

In certain examples, the splice holder 228 includes a plurality of opposing latch arms between which the splice S (e.g., or a protective sleeve such as a SMOUV protective sleeve about the splice S) snap fits. In certain examples, the splice holder 228 includes multiple pairs of latch arms (e.g., to hold multiple splices S between the cables 102, 112 or to provide a variety of positions at which the splice S can be held).

In certain implementations, the framework 220 is configured to hold one or more optical adapters 280 for connecting together two connectorized ends of optical fibers. In certain examples, the framework 220 includes a sub-frame 256 defining a pocket or cavity 257 in which one or more optical adapters 280 can be disposed. The sub-frame 256 is disposed within a center of the loop storage section 252 so that the loop storage passage 253 extends around the sub-frame 256. The sub-frame 256 and pocket 257 are positioned to align with entrances/exits 253a, 253b to the loop storage passage 253 (e.g., see FIG. 19). In some examples, the sub-frame 256 is configured to hold a single SC optical adapter. In other examples, the sub-frame 256 is configured to hold a duplex LC optical adapter.

In certain implementations, the sub-frame 56 is disposed to position the optical adapter 280 offset from the minor axis B of the loop storage section 252 (e.g. see FIG. 19). Various types of optical adapters 280 may be mounted at the sub-frame 256 including standard adapters, field installable adapters, etc. The optical adapters 280 each define a first port facing in a first direction along the first axis A and a second port facing in an opposite second direction along the first axis A. In some examples, the optical adapter 280 is configured to receive plug connectors of a common size and type at each port. In other examples, the optical adapter 280 is configured to receive a first plug connector P1 at the first port and a second plug connector P2 at the second port where the second plug connector P2 has a different size or shape than the first plug connector P1 (e.g., see FIG. 42). For example, a standard plug connector P1 (e.g., an LC connector, an SC connector, etc.) may be received at the first port while a longer splice-on connector P2 (e.g., a splice-on LC connector, a splice-on SC connector, etc.) may be received at the second port. Offsetting the optical adapter 280 may facilitate accommodating the optical fibers routed away from the different types of plug connectors P1, P2 (e.g., the longer plug connector may be disposed at the port having the most room).

Figure 42:
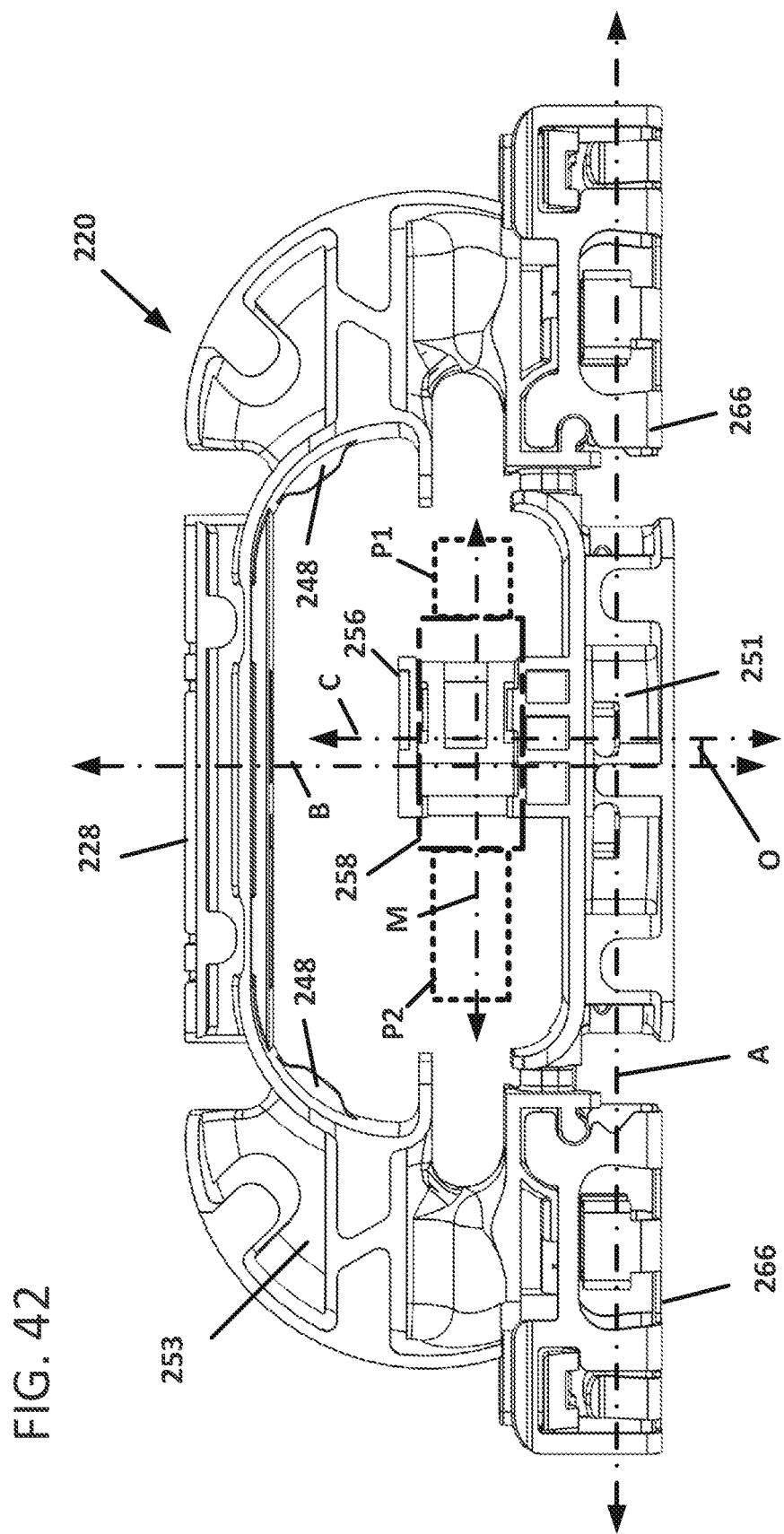
FIG. 42 is side elevational views of the internal framework of FIG. 17 with the sub-frame shown offsetting the optical adapter along an axis M.

The sub-frame 256 is disposed at a position so that a central lateral axis C of the optical adapter 280 is offset from the second axis B by a distance O (see FIG. 42). In certain examples, the sub-frame 256 is configured to offset the optical adapter 280 by a distance of between 0.25 cm and 5 cm. In certain examples, the sub-frame 256 is configured to offset the optical adapter 280 by a distance of between 0.5 cm and 4 cm. In an example, the sub-frame 256 is configured to offset the optical adapter 280 by a distance of about 1 cm. In an example, the sub-frame 256 is configured to offset the optical adapter 280 by a distance of about 2 cm. In an example, the sub-frame 256 is configured to offset the optical adapter 280 by a distance of about 3 cm. In an example, the sub-frame 256 is configured to offset the optical adapter 280 by a distance of about 0.5 cm. In an example, the sub-frame 256 is configured to offset the optical adapter 280 by a distance of about 1.5 cm. In an example, the sub-frame 256 is configured to offset the optical adapter 280 by a distance of about 2.5 cm.

In certain implementations, the sub-frame 256 is configured to be disposed relative to the framework 220 at one of a plurality of selectable positions relative to the second axis B. The positions being disposed along an axis M (FIG. 42) that is parallel with the first axis A. In some implementations, the sub-frame 256 is translatable (e.g., slidable) relative to the framework 220 along the axis M. In other implementations, the framework 220 defines a plurality of mounting positions for the sub-frame 256. The mounting positions are spaced from each other along the axis M. In certain examples, the sub-frame 256 may latch to (e.g., snap into) a selected one of the mounting positions. In other examples, the sub-frame 256 may otherwise mount (e.g., via fasteners, friction fit, threads, etc.) to the framework 220 at one of the mounting positions.

Figure 23:
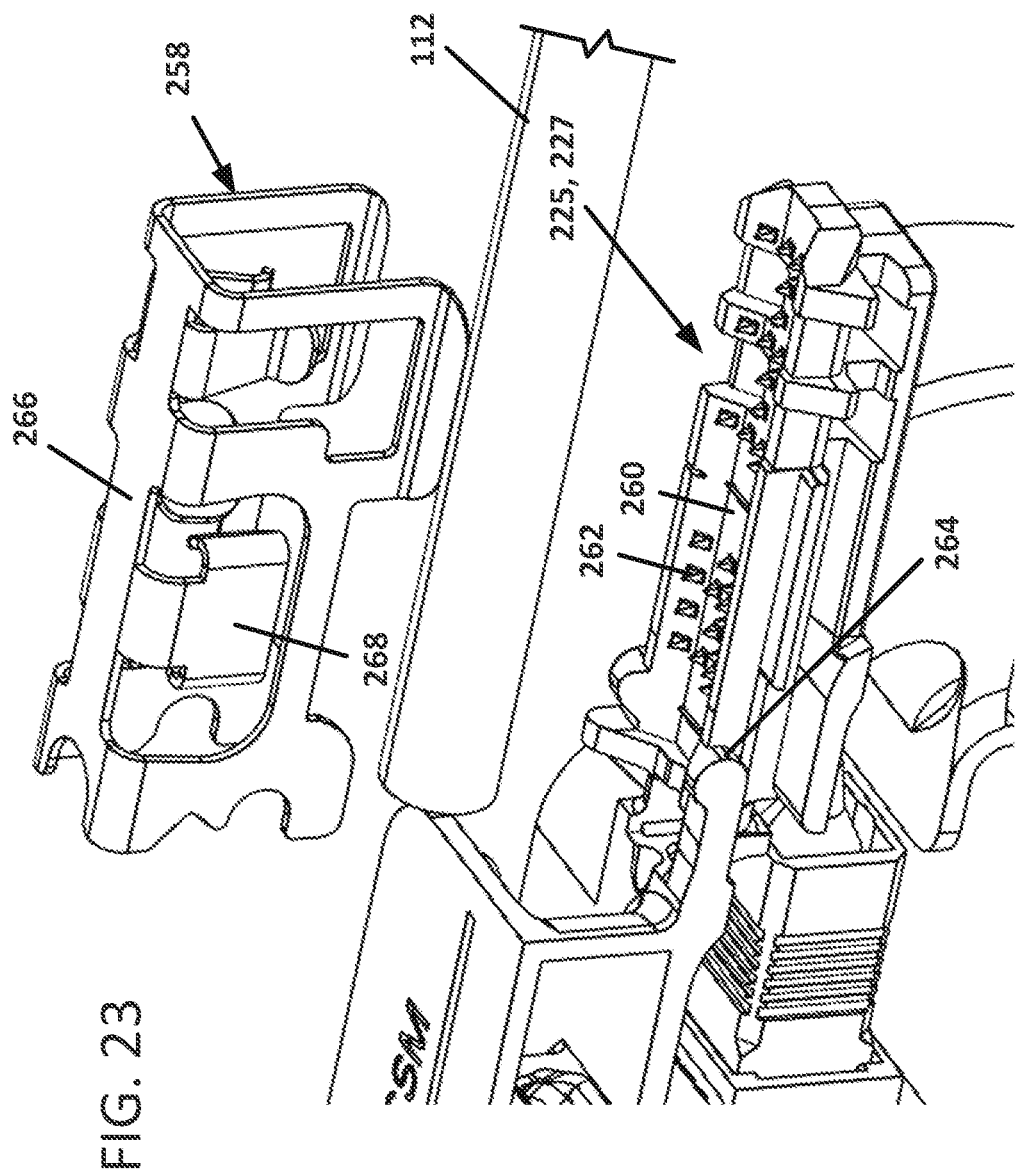
FIG. 23 is a perspective view of an example cable fixation region of the internal framework of FIG. 17 with a cable and a spring clip exploded outwardly therefrom.
Figure 24:
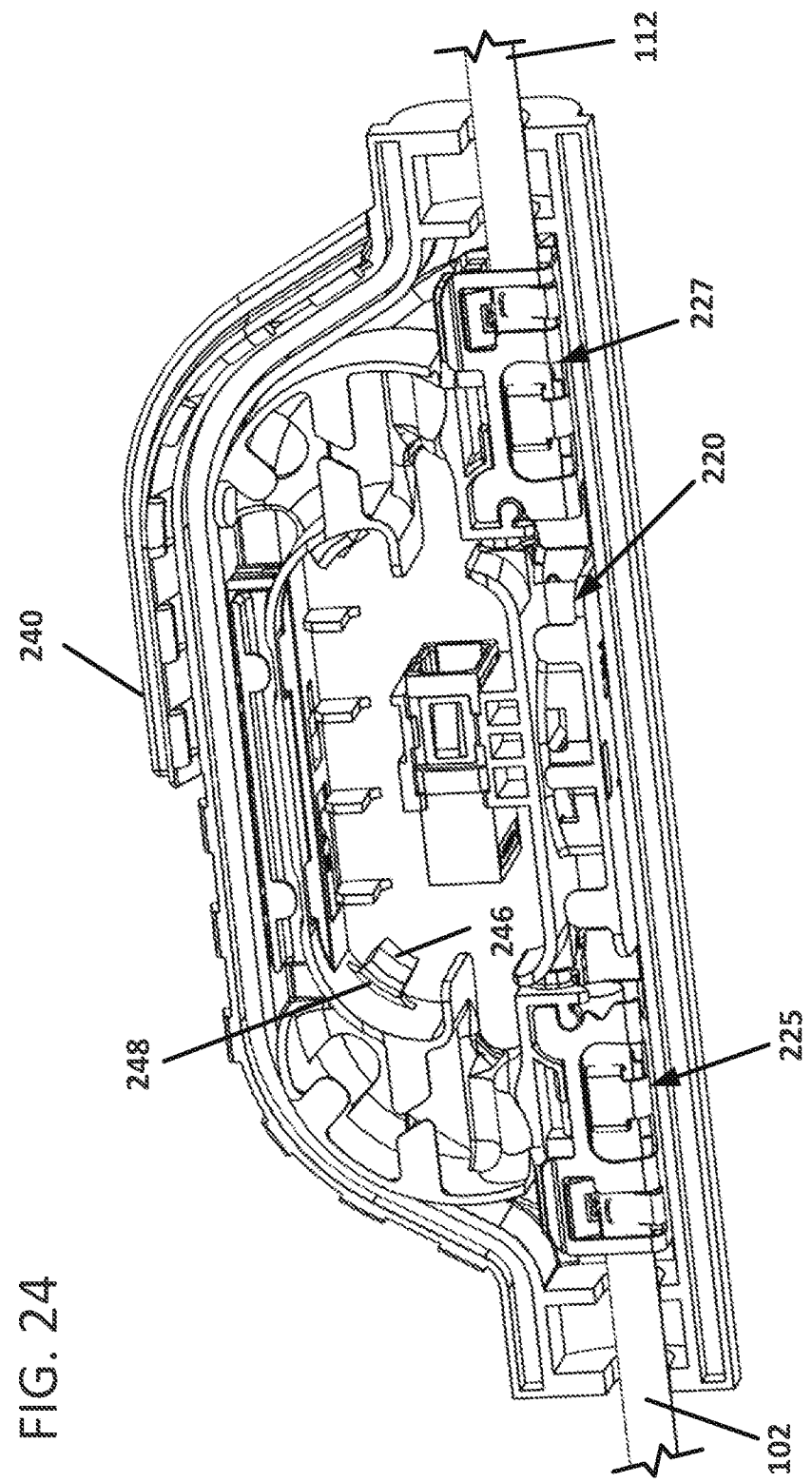
FIG. 24 is a perspective view of a first sheath piece mounted to the internal framework of FIG. 17.
Figure 25:
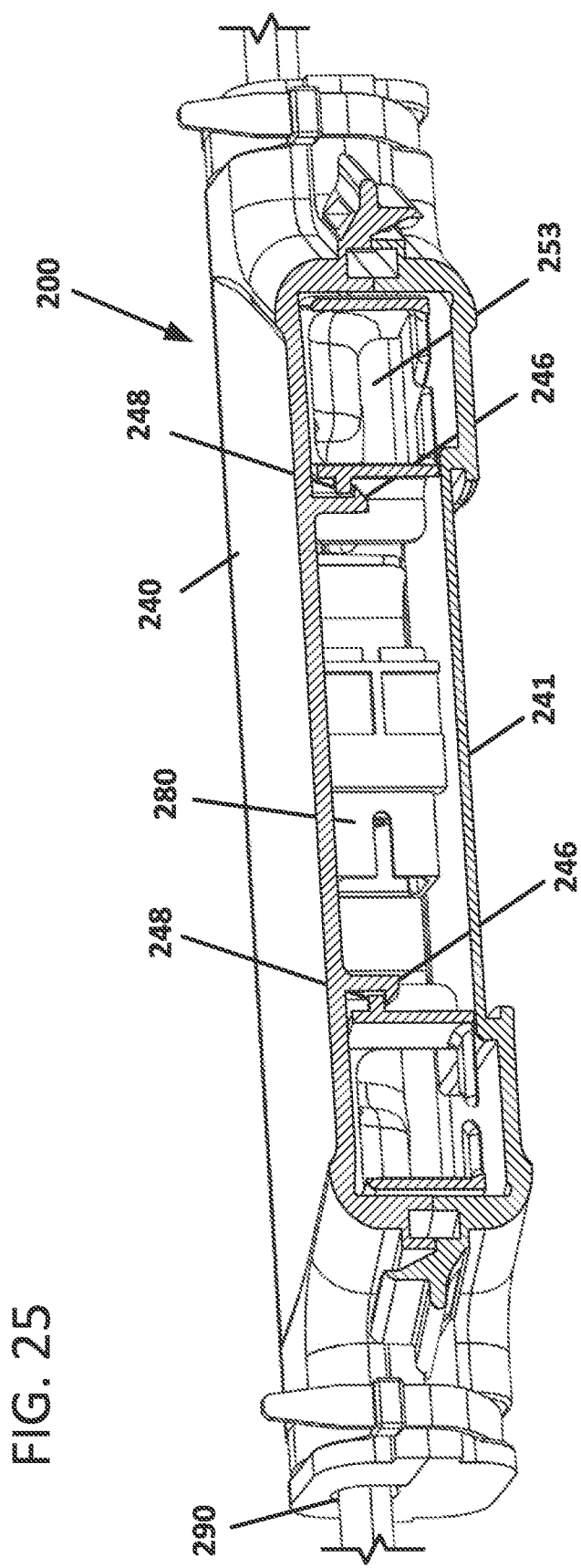
FIG. 25 is a cross-sectional view of the closure of FIG. 14 showing how the first sheath piece latches to the internal framework.
Figure 26:
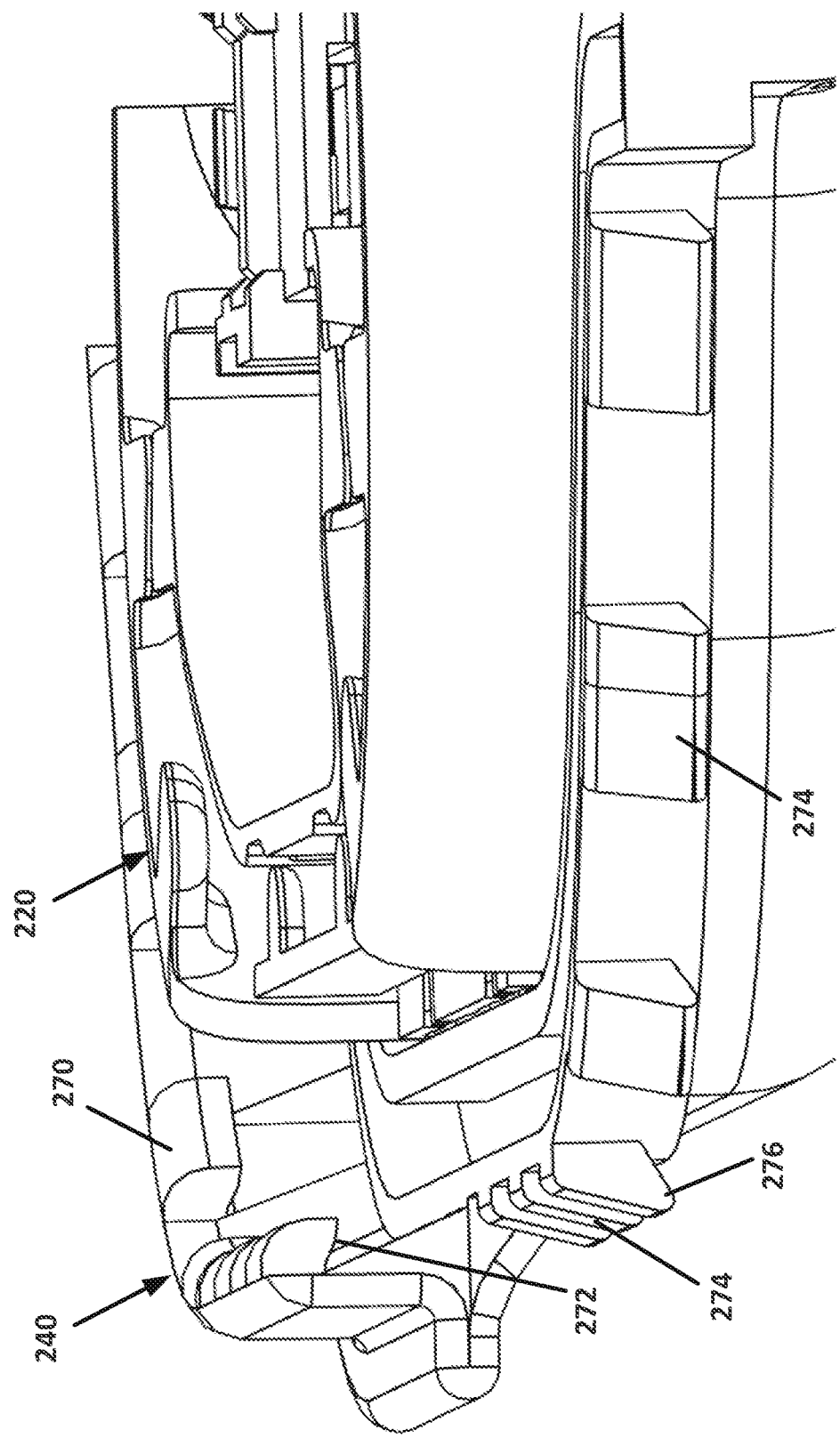
FIG. 26 is a perspective view of a portion of the first sheath piece and internal framework of FIG. 24.
Figure 27:
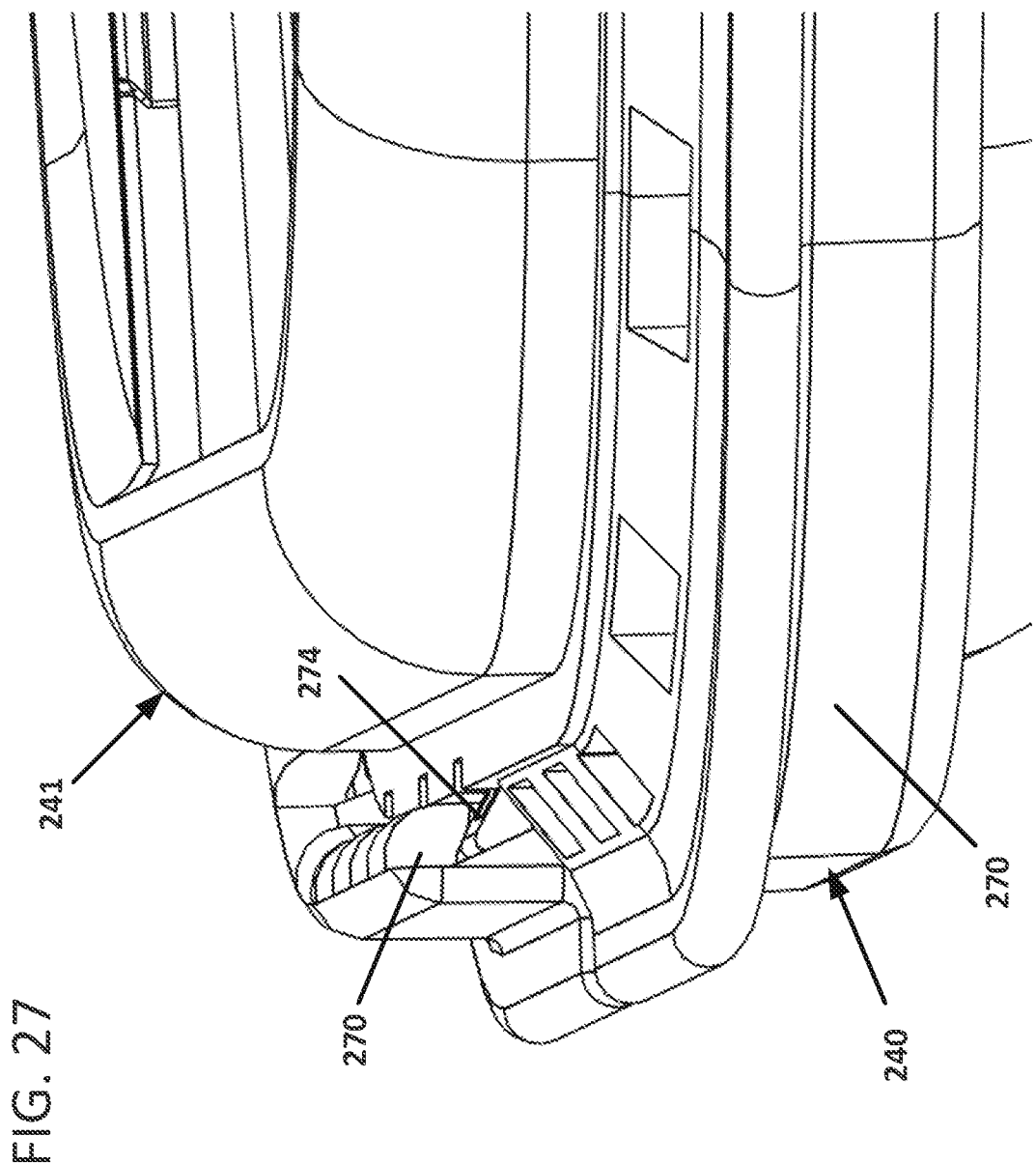
FIG. 27 shows the second sheath piece latched to the first sheath piece of FIG. 26

Referring to FIG. 23, the framework 220 also carries a cable fixation structure 258 at the first and second cable fixation regions 225, 227. In the example shown, the same cable fixation structure 258 is disposed at both cable fixation regions 225, 227. In other examples, however, each cable fixation region 225, 227 can include a different cable fixation structure 258. In some examples, the cable fixation structure 258 is integral with the framework 220. In other examples, the cable fixation structure 258 is a separate piece that mounts to the framework 220 (e.g. see FIG. 23).

In certain implementations, each of the first and second cable fixation regions 225, 227 includes a cable support body 260 shaped to receive a cable 102, 112. In certain examples, each cable support body 260 include teeth 262, bumps, or other catch surfaces to enhance friction between the cable 102, 112 and the cable support body 260. In certain examples, the cable fixation structure includes a cover 266 that cooperates with the cable support body 260 to clamp the cable 102, 112 therebetween. For example, the cover 266 may pivot relative to the support body 260 about a pivot hinge 264 to clamp onto the cable 102, 112 (e.g., at a compression member 268). The cover 266 may latch, friction fit, or otherwise secure to the cable support body 260. In certain examples, the cover 266 is a spring clip.

The sheath pieces 231 can be assembled around the framework 220 after the cables 102, 112 are secured to the framework 220. In certain examples, the splices S can be secured at the splice holder 228 and/or terminated ends of the fibers can be secured at the adapter 280 while the sheath pieces 231 are disassembled. In certain implementations, the sheath pieces 231 are configured to assemble around the framework 220 without tools. In some implementations, the sheath pieces 231 assemble together mechanically (e.g., snap-fit connection, latches, fasteners, or the like) so as to be reopenable. In other implementations, the sheath pieces 231 can be ultrasonically welded, adhesively fixed, or otherwise secured together so as to not be reopenable without breaking the pieces 231.

In certain implementations, a first piece 240 of the sheath pieces 231 is configured to attach to the framework 220 and the second piece 241 of the sheath pieces 231 is configured to attach to the first sheath piece 240. For example, the first sheath piece 240 includes latch arms 246 (see FIG. 15) that engage catch surfaces 248 defined by the framework 220 (see FIG. 25). For example, the catch surfaces 248 may protrude inwardly from the loop storage section 252. In certain examples, the and second sheath pieces 240, 241 are configured to latch or otherwise snap-fit to each other.

For example, each sheath piece 240, 241 may include latches 270 defining latch hooks 272 and also include a plurality of catch members 274 defining catch surfaces 276. In the example shown, the latches 270 are disposed along a first portion of the periphery of each sheath piece 240 and the catch members 274 are disposed along another portion of the periphery. In other examples, however, the latches 270 and catch members 274 can be interspersed along the periphery. In certain examples, the latch surfaces 272 of the second sheath piece 241 engage the catch surfaces 276 of the first sheath piece 240 and the latch surfaces 272 of the first sheath piece 240 engage the catch surfaces 276 of the second sheath piece 241 (e.g., see FIG. 27).

Figure 28:
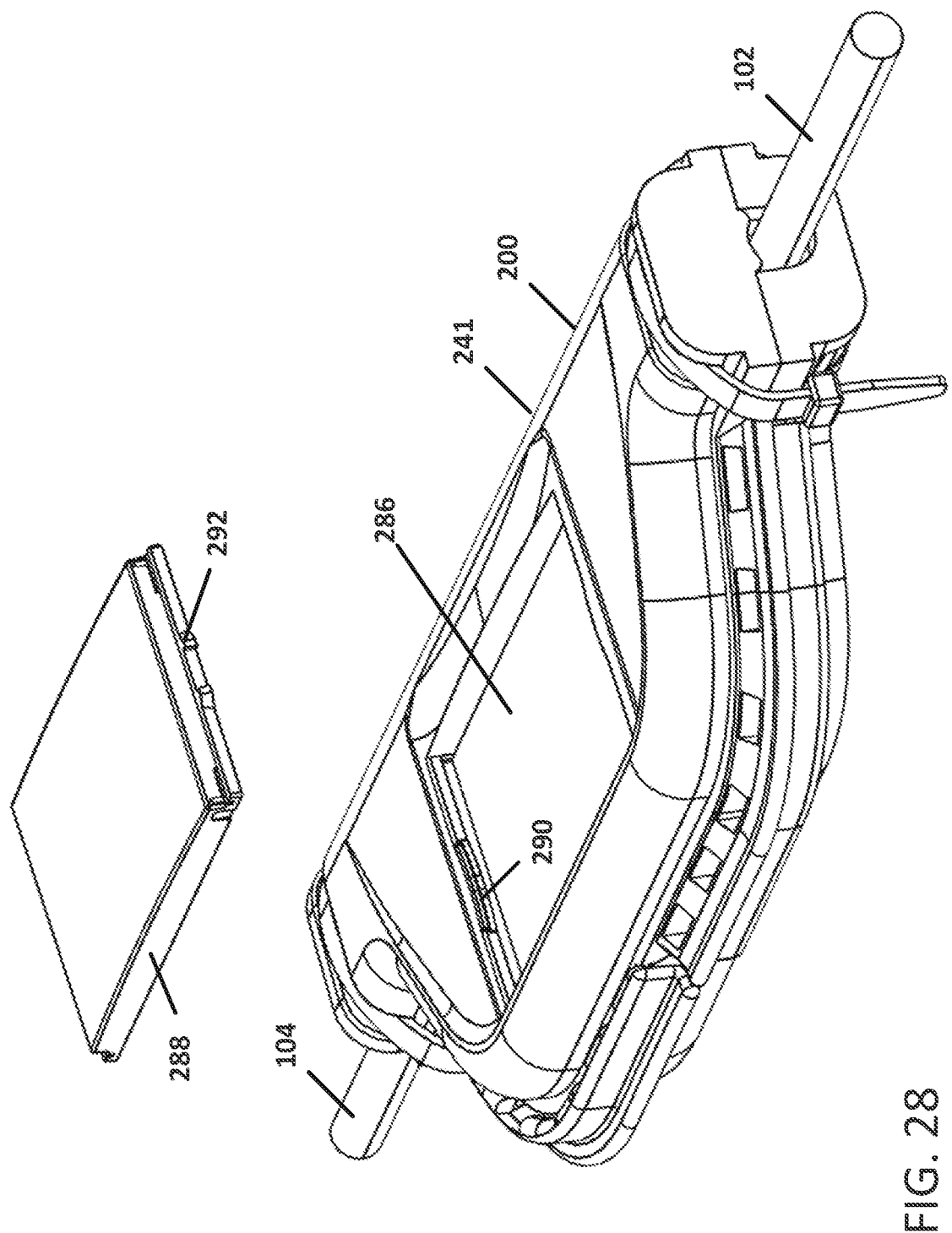
FIG. 28 is a perspective view of the closure showing a label exploded outwardly therefrom.

In certain implementations, the first and second sheath pieces 240, 241 can be further secured together using straps 282 (FIG. 16) such as cable ties or book-and-loop strips (e.g., see FIGS. 14 and 28). In certain examples, each of the first and second sheath pieces 240, 241 defines grooves 284 in which the straps 282 may seat. The grooves 284 facilitate retaining the straps 282 around the sheath pieces 241, 242 (i.e., inhibit the straps 282 from sliding off the closure 200 and onto the cables 102, 112). In certain examples, the straps 282 can be utilized in addition to or in place of the latches 270 and catch members 274.

In certain implementations, a label or other identifier 288 can be mounted to the closure 200. In certain examples, the closure 200 defines a pocket 286 or recess in which the label 288 can seat. In the example shown in FIG. 28, the pocket 286 is defined in the second housing piece 241. In other examples, the pocket 286 can be defined in either housing piece 240, 241. In certain examples, the identifier 288 is configured to secure to the closure 200 without tools. In certain examples, the identifier 288 is configured to removably secure to the closure 200. In the example shown, the identifier 288 includes tabs or other protrusions 292 that fit into recess 290 defined within the pocket 290. In other examples, however, the identifier 288 can be latched, friction-fit, fastened, or otherwise removably secured in the pocket 286. In still other examples, the identifier 288 can be adhesively affixed, ultrasonically welded, or otherwise coupled to the closure 200.

Figure 29:
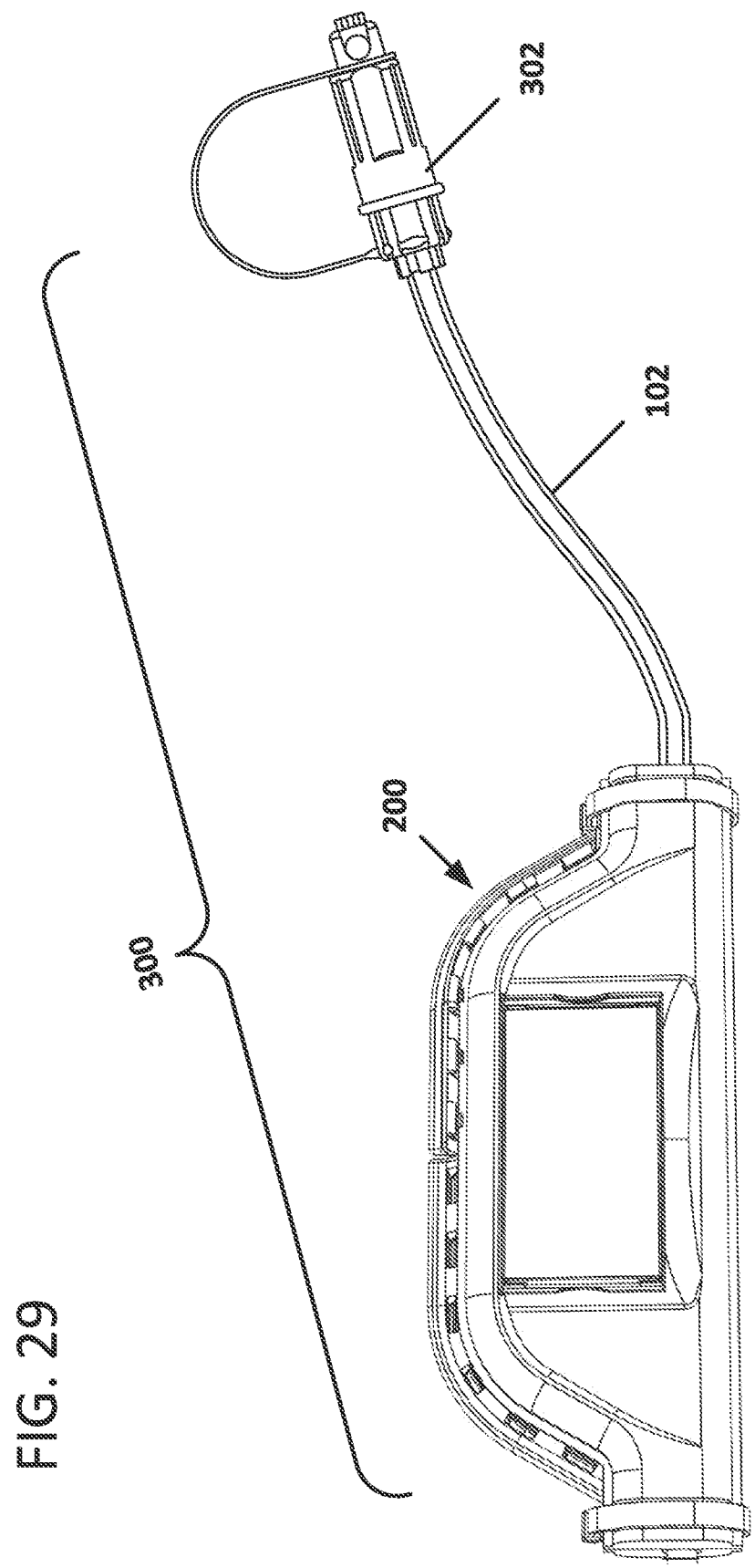
FIG. 29 depicts a closure with a hardened cable extender in accordance with the principles of the present disclosure.

The closure 200 is used to splice together two optical cables 102, 112. Referring to FIG. 29, in certain implementations, one of the cables 102 is pre-installed within the closure 200 to form a cable extender 300. For example, the cable 102 may be mounted at the respective cable fixation region 225 and one or more optical fibers within the cable 102 may be routed through the loop storage passage 253. If the fiber(s) is unterminated, the fiber(s) can be routed to the splice holder 228. If the fiber(s) is terminated, the connectorized end may be routed to a port of the adapter 280. The cable 102 extends from the closure 200 through the cable port 290 so that the opposite end of the cable 102 is disposed external of the closure 200. In certain implementations, the external end of the cable 102 is terminated by a hardened connector 302.

As the terms are used herein, "hardened" optical connectors and "hardened" optical adapters are configured to mate together to form an environmental seal. Some non-limiting example hardened optical connector interfaces suitable for use with the closure 200 are disclosed in U.S. Pat. Nos. 7,744,288, 7,762,726, 7,744,286, 7,942,590, and 7,959,361, the disclosures of which are hereby incorporated herein by reference. In certain examples, hardened connectors can include environmental seals for sealing the connectors in outside environments. Hardened connectors can include fasteners such as threaded or bayonet-style fasteners for providing robust connector-to connector mechanical connections. Hardened connectors can include male connectors on cables, female connectors on cables, ports/adapters on housings and other structures. Hardened connectors can include single-fiber ferrules or multi-fiber ferrules. Hardened, multi-fiber ferrule connectors may include fiber receiving arrangements defining a plurality of fiber receiving positions. In certain examples, the fiber receiving positions can be arranged in one or more rows of fiber receiving positions.

Figure 30:
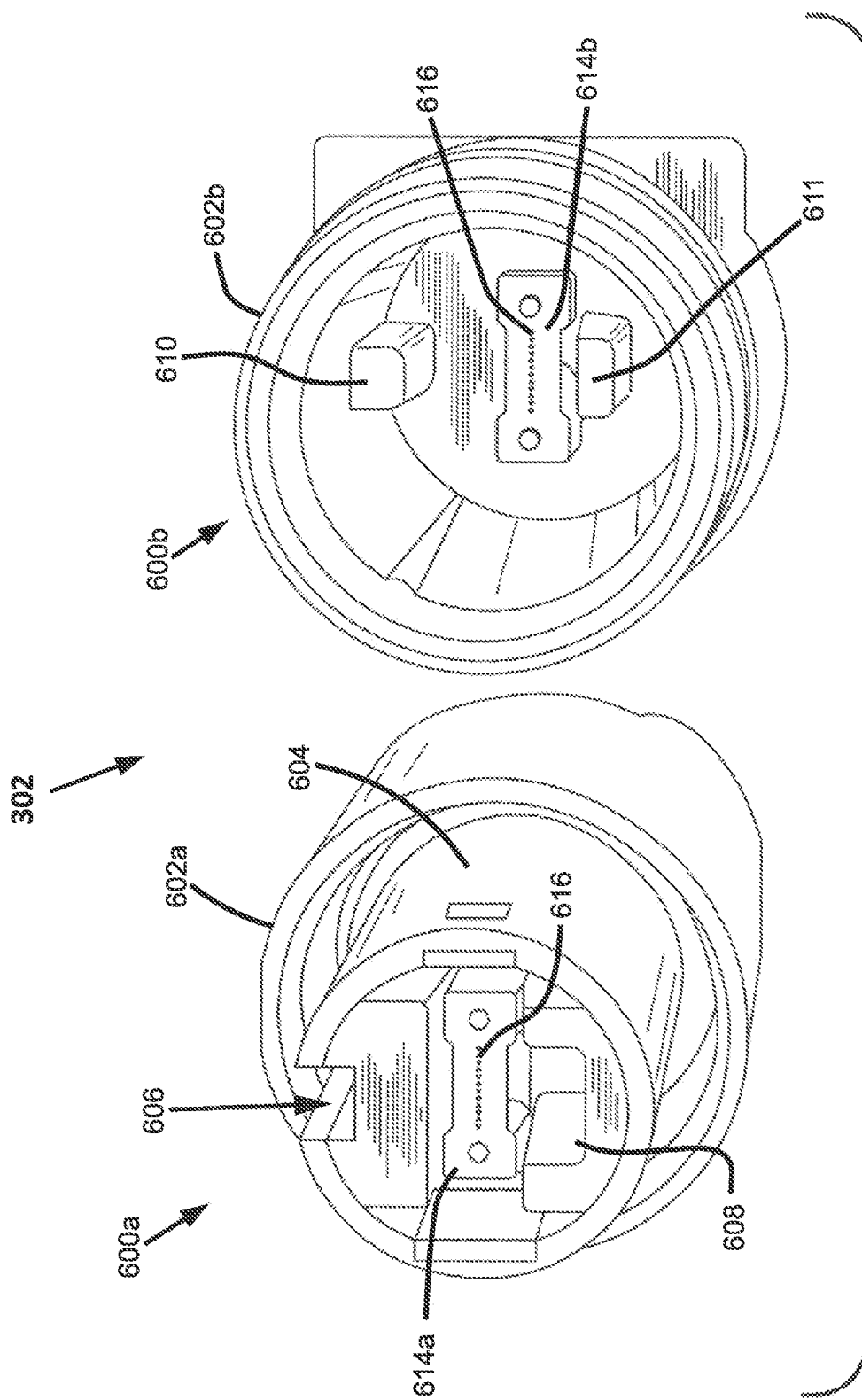
FIG. 30 depicts example hardened connectors that can be incorporated as part of the hardened cable extender of FIG. 29.

FIG. 30 shows example mating male and female hardened, multi-fiber connectors 600a, 600b either of which can be used to terminate the external end of the cable 102. The male and female connectors 600a, 600b include intermatable mechanical coupling interfaces. For example, the male connector 600a includes an internally threaded nut 602a that threads on a threaded portion 602b of the female connector 600b. Also, the male connector 600a includes a plug portion 604 with openings 606, 608 that mate with projections 610, 611 of the female connector 600b to provide alignment during coupling. The connectors 600a, 600b include ferrules 614a, 614b having fiber receiving arrangements that include sequential fiber positions 616 (e.g., a row of twelve fiber receiving positions) that align when the connectors 600a, 600b are mated to provide optical connections between the optical fiber supported by the ferrules 614a, 614b. Further details of example hardened connectors are disclosed at U.S. Pat. No. 7,264,402, which is hereby incorporated by reference in its entirety.

Referring back to FIG. 29, the cable extender 300 can be installed at the end of a variety of cables. In some implementations, the cable extender 300 enables a user to lengthen an existing hardened cable 112. For example, the hardened connector at one end of the existing hardened cable 112 can be cut off to form an unterminated end. The unterminated end can be routed into the closure 200 and spliced to the hardened stub 102. The existing cable 112 is thereby lengthened by the combined length of the closure 200 and stub sable 102. In other implementations, the cable extender 300 enables a user to shorten an existing hardened cable 112. For example, the existing hardened cable 112 can be cut to a shorter length. The cut end can be routed into the closure 200 and spliced to the cable 102. Accordingly, the hardened end 302 of the cable extender 300 forms the new end of the now shortened cable 112.

In still other implementations, the cable extender 300 enables a user to terminate an existing cable 112 with a hardened connector. One end of the existing cable 112 is routed into the closure 200. If the end of the existing cable 112 is unterminated, the fiber(s) can be routed to the splice holder 228. If the end is terminated with a non-hardened connector, then the connector can be routed to the adapter 280. After attaching the cables 102, 112, at the closure 200, the hardened connector 302 terminates the second end of the existing cable 112.

Figure 33:
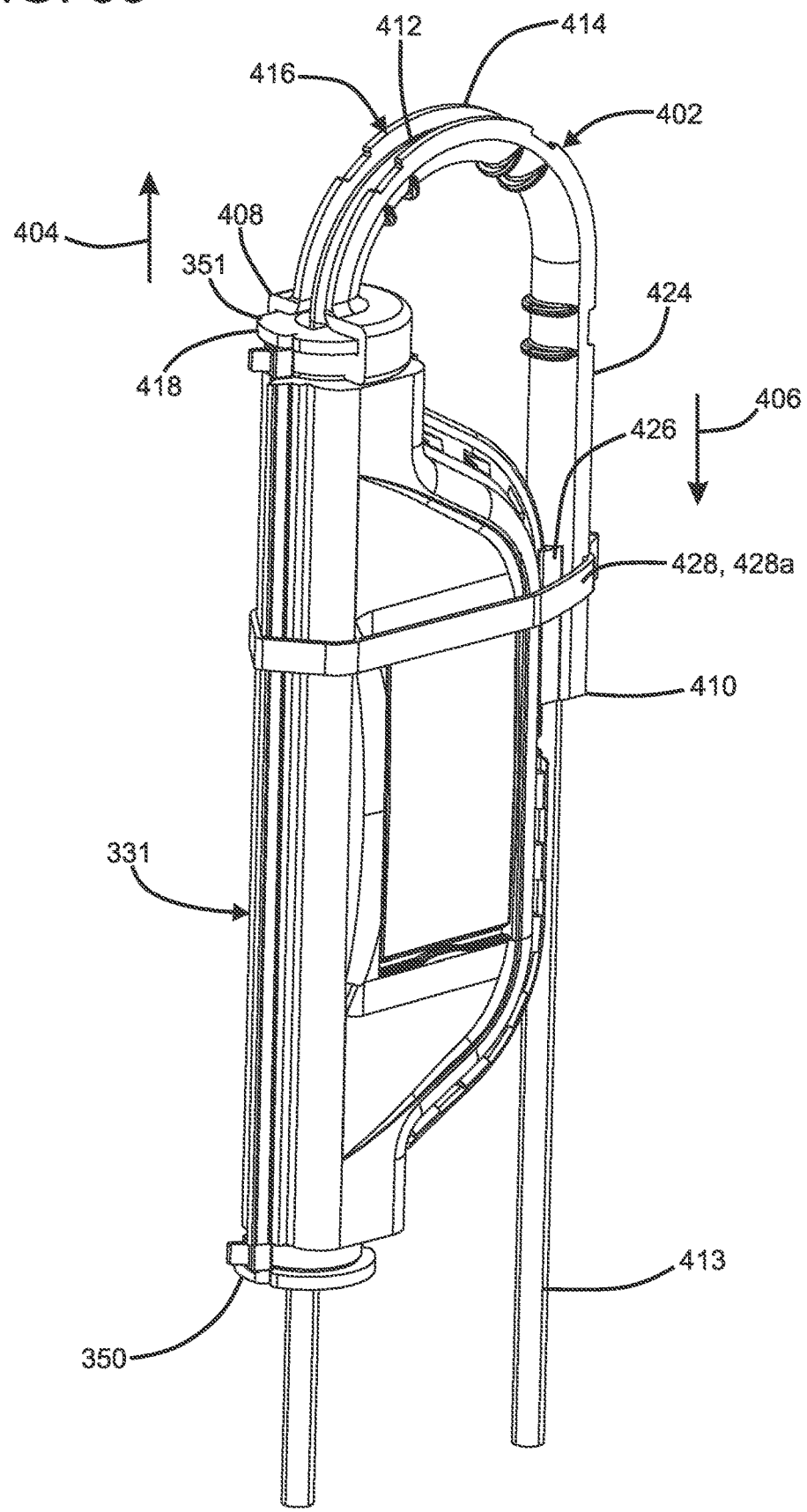
FIG. 33 depicts a fiber optic assembly in accordance with the principles of the present disclosure including a closure and a cable guide for reversing a direction of a cable extending outwardly from a cable port of the closure.
Figure 34:
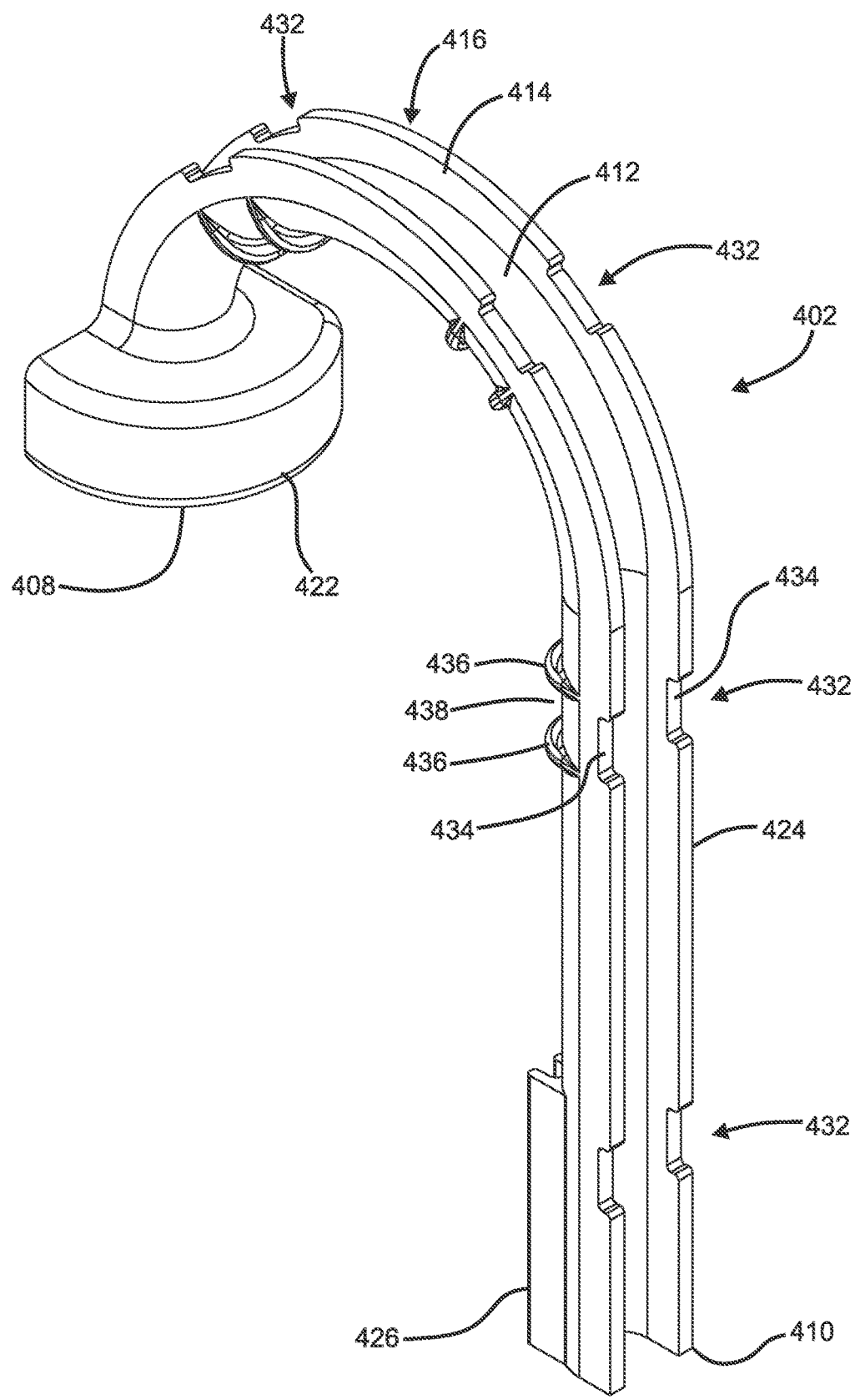
FIG. 34 is a perspective view of the cable guide of FIG. 33.
Figure 35:
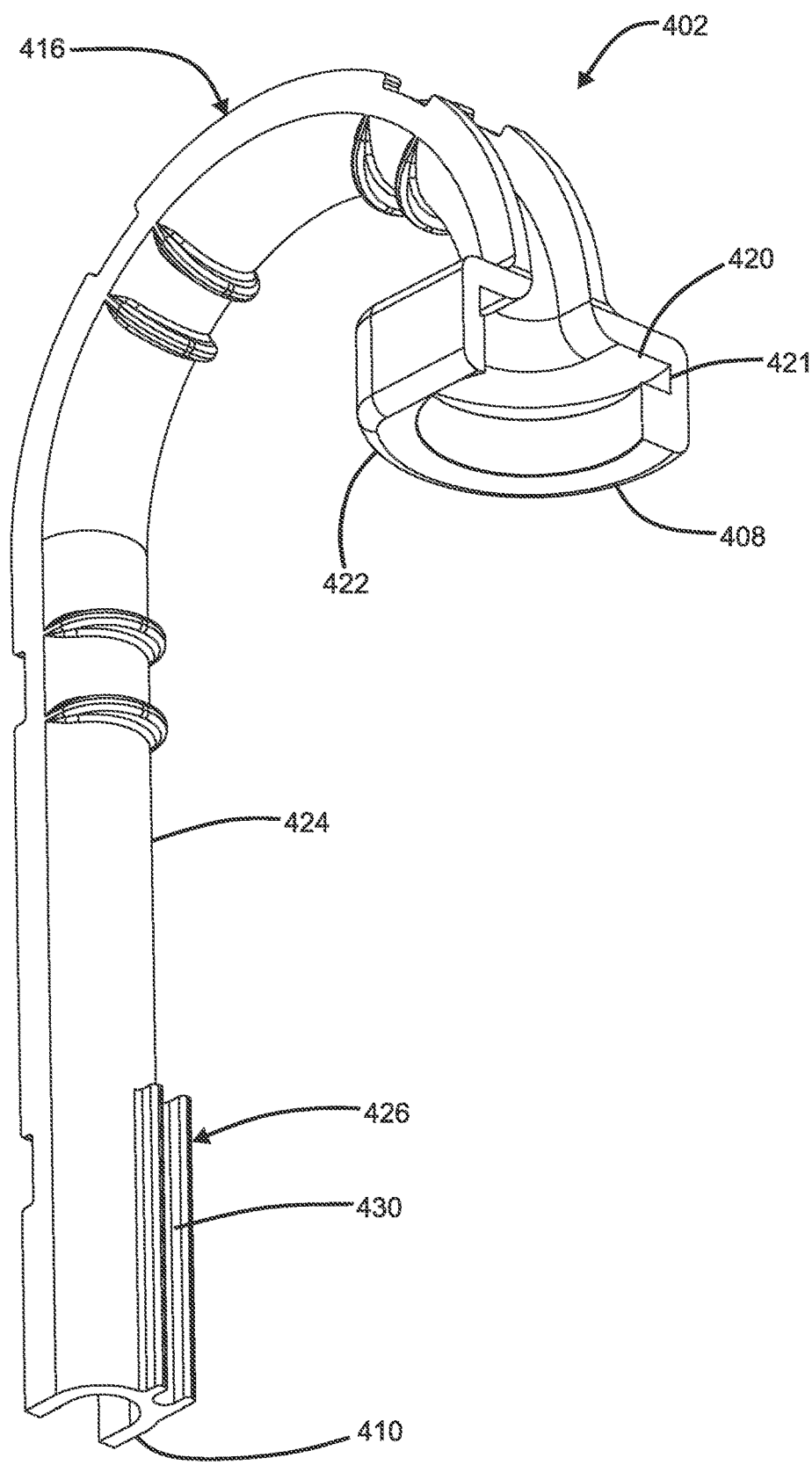
FIG. 35 is another perspective view of the cable guide of FIG. 33.
Figure 36:
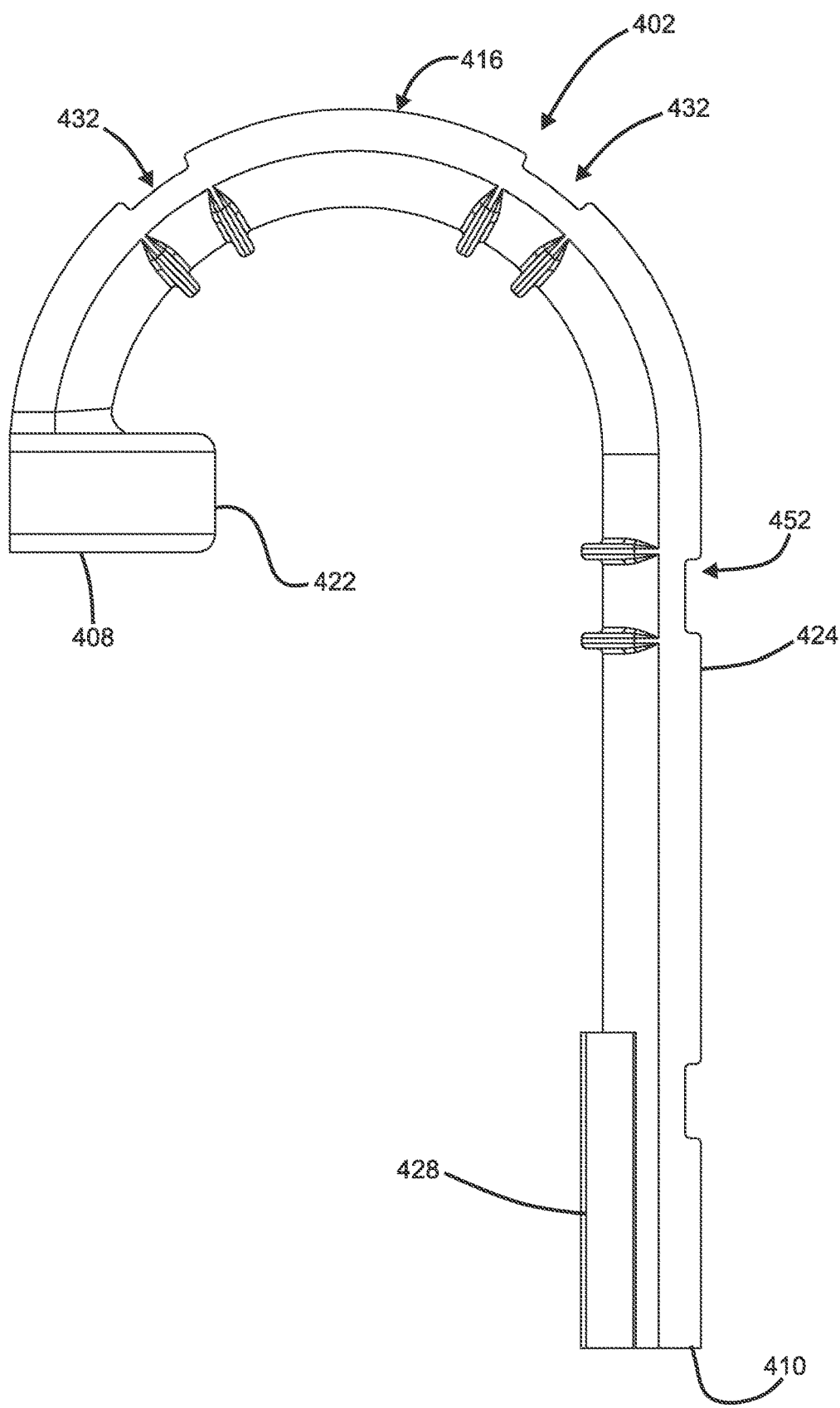
FIG. 36 is a front view of the cable guide of FIG. 33.
Figure 37:
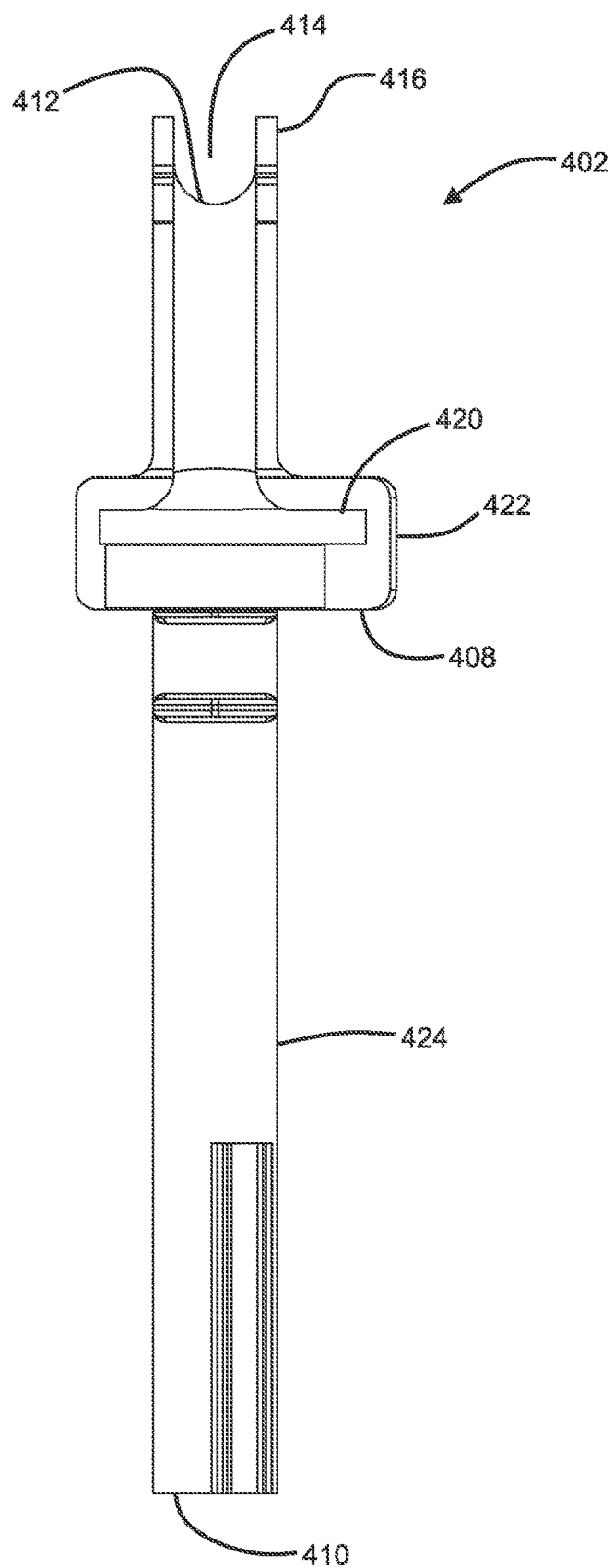
FIG. 37 is a first side view of the cable guide of FIG. 33.
Figure 38:
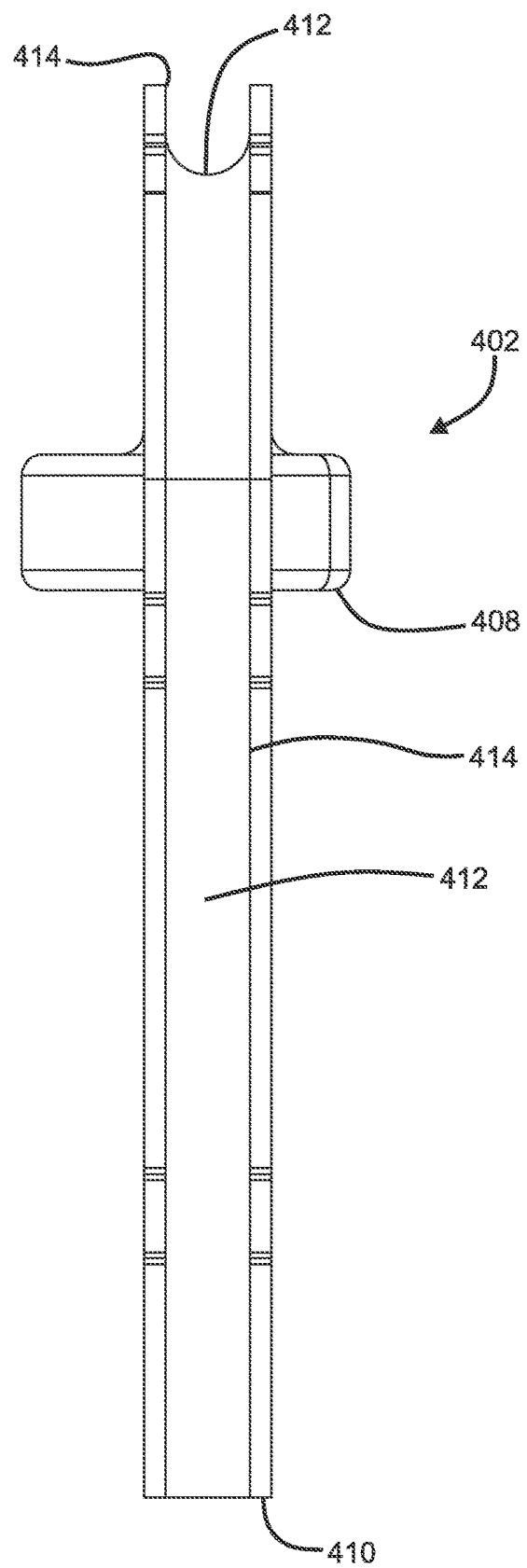
FIG. 38 is a second side view of the cable guide of FIG. 33.
Figure 39:
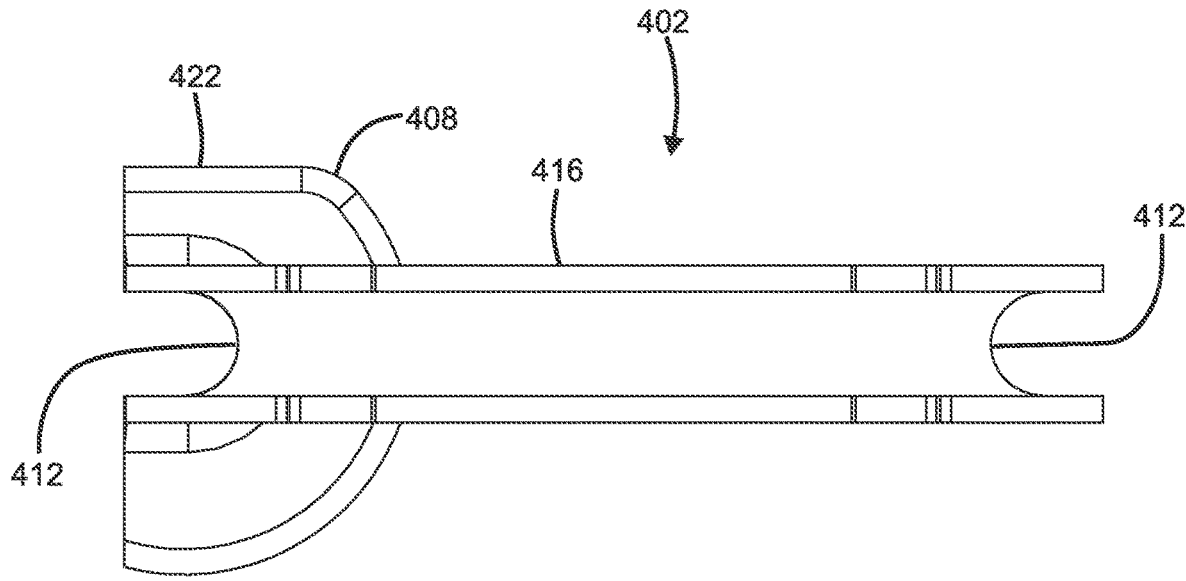
FIG. 39 is atop view of the cable guide of FIG. 33.
Figure 40:
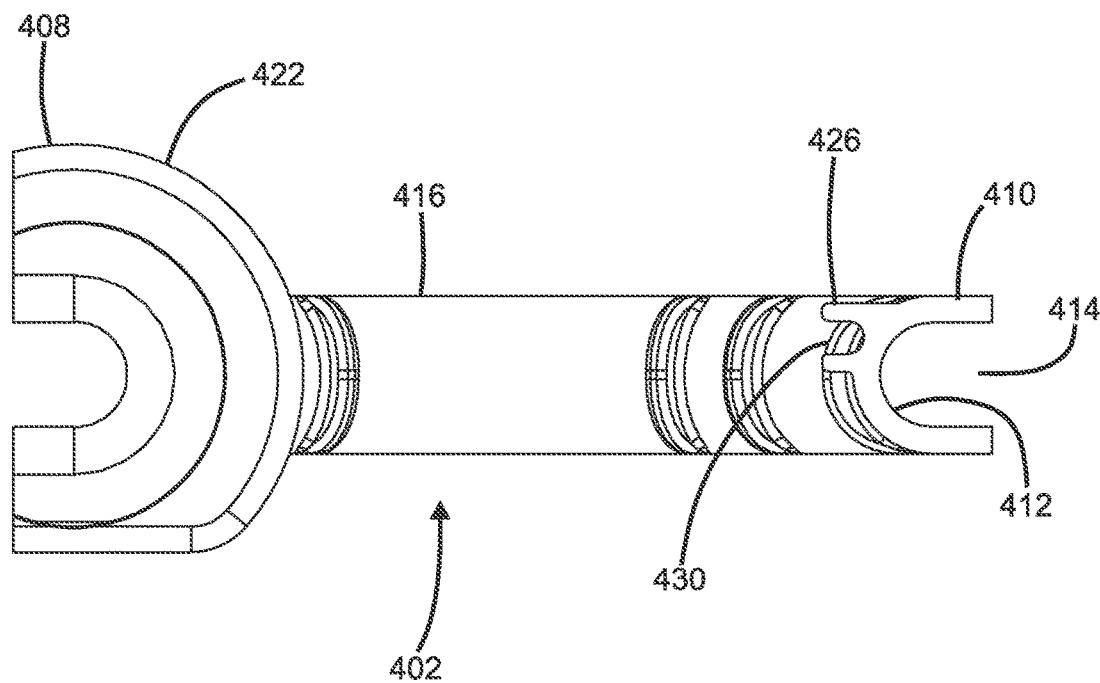
FIG. 40 is a bottom view of the cable guide of FIG. 33.
Figure 41:
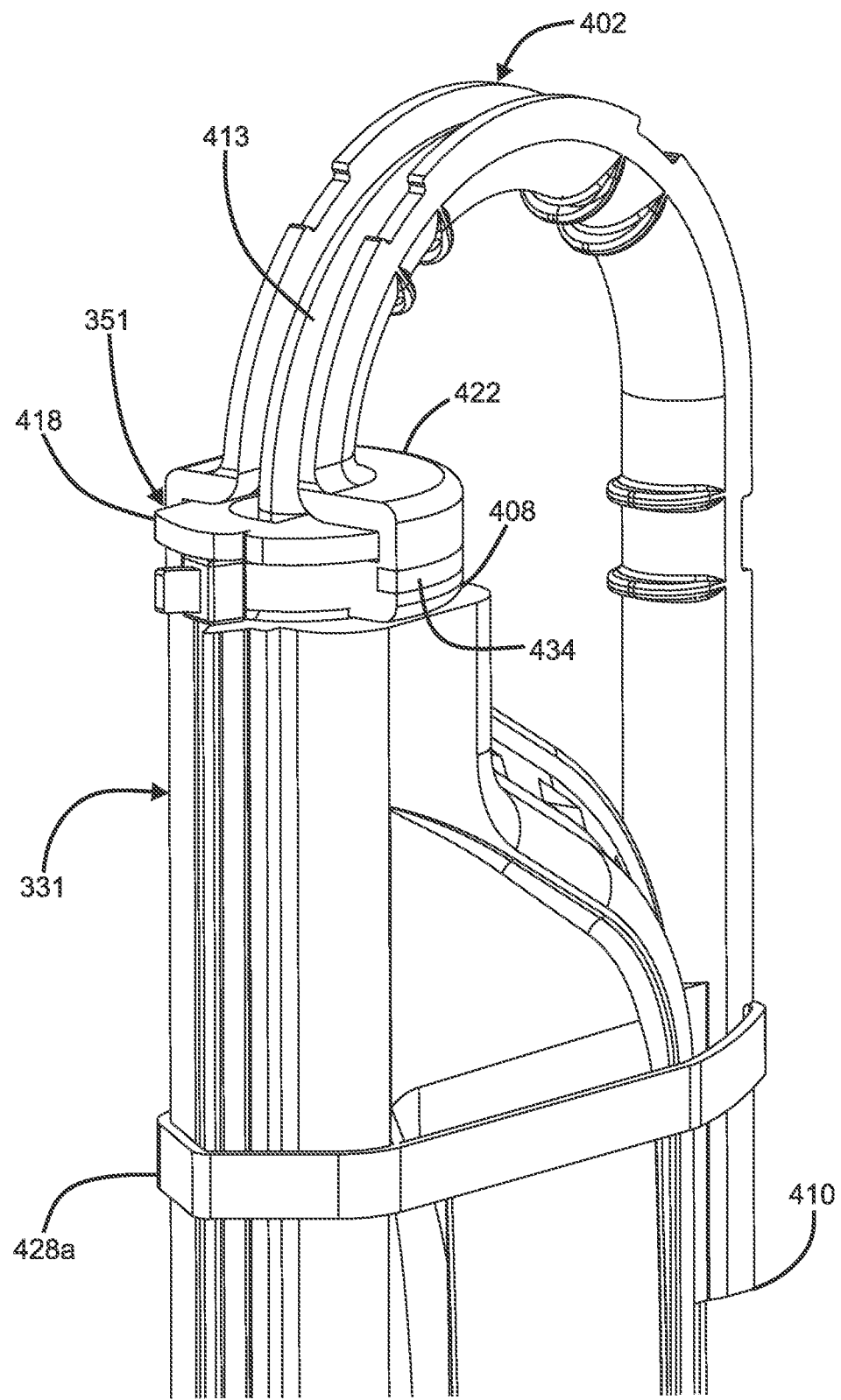
FIG. 41 shows the cable guide of FIG. 33 with a cable routed within the channel of the cable guide.

FIG. 33 depicts a fiber optic assembly 400 in accordance with the principles of the present disclosure. The fiber-optic assembly 400 includes a cable guide 402 that couples to one end of a closure (e.g., a spice closure) for changing a direction of a cable routed out of the end of the closure. In one example, the cable guide 402 is configured to reverse a direction of a cable routed out of the closure such that the closure can be converted from an in-line configuration to a butt-style configuration. It will be appreciated that the cable guide 402 can be used in combination with any of the closures disclosed herein, or with other types of closures. In the depicted example, the cable guide 402 is shown externally mounted to the second end 351 of the sheath 331 so as to reverse a cable direction of a cable exiting the second cable port 353 from a first direction 404 to a second direction 406. The second direction 406 extends from the second end 351 toward the first end 350 of the sheath 331.

Referring to FIGS. 34-41, the cable guide 402 includes a first guide end 408 and a second guide end 410. The first guide end 408 is configured to couple with the second end 351 of the sheath 331. The cable guide 402 defines a guide channel 412 that extends from the first guide end 408 to the second guide end 410. The guide channel 412 has an open side 414 that extends from the first guide end 408 to the second guide end 410. The open side 414 allows a cable to be laterally loaded into the guide channel 412 thereby enabling the cable guide 402 to be installed on the sheath 331 after the cable has been spliced within the sheath and has been routed out of the sheath 331.

The cable guide 402 as a curved portion 416 between the first and second guide ends 408, 410 that curves at least 160°. The guide channel 412 is configured such that a direction in which the open side 414 of the guide channel 412 faces changes as the guide channel 412 extends along the curved portion 416. In a preferred example, the curved portion 416 curves 175-185°.

The second end 351 of the sheath 331 and the first guide end 408 have mating connection shapes that slide together to interlock and prevent the first guide end 408 from moving axially relative to the second end 351 of the sheath 331. In the depicted example, the second end 351 of the sheath 331 includes a connection shape including enlarged flange 418 and the first guide end 408 of the cable guide 402 includes a connection shape including a slot 420 size to receive the flange 418. In one example, the slot 420 has an open side 421 for allowing the flange 418 to be laterally received within the slot 420. The open side 421 faces in the same direction as the open side 414 of the guide channel 412 at the first end 408 of the cable guide 402. In the depicted example, the first guide end 408 includes an enlarged head 422 in which the slot 420 is defined. The slot 420 has an internal shape that complements the exterior shape of the flange 418.

The cable guide 402 includes a straight portion 424 that extends in the second direction 406 from the curved portion 416 to the second guide end 410. The cable guide 402 includes a stabilizer 426 positioned at the exterior of the cable guide 402 along the straight portion 424. In one example, the stabilizer 426 can project outwardly from a main body of the cable guide 402 and can include a receptacle such as a channel 430 for receiving a portion of the sheath 331 such that contact between the stabilizer 426 and the exterior portion of the sheet 331 stabilizes the straight portion 424 relative to the sheath 331. In certain examples, one or more tie-wraps 428 (i.e. cable ties) or other fastening elements can be used to further couple the cable guide 402 to the sheath 331. In an alternative example, an exterior of the enlarged head 422 can include a circumferential slot at location 434 for receiving a cable tie. At FIG. 33, a tie-wrap 428a is shown securing the straight portion 424 of the cable guide 402 to the main body of the sheath 331. The tie-wrap 428a also prevents the flange 418 of the sheath 331 from laterally disengaging from the slot 420 defined by the enlarged head 422 of the first end 408 of the cable guide 402.

In one example, the stabilizer 426 includes an elongate stabilizing channel 430 that receives an elongate portion (e.g., a peripheral edge) of the sheath 331. The elongate channel 430 runs parallel to the guide channel 412 and has an open side that faces in an opposite direction from the open side 414 of the guide channel 412.

The guide channel 412 is adapted to guide a cable 413 (see FIG. 41) around the curved portion 416 from the first and 408 to the second and 410. Preferably, the curved portion 406 has a bend radius that is compliant with a minimum bend radius of the cable 413.

In the depicted example, the cable guide 402 defines a plurality of individual cable-tie retention locations 432 that are spaced-apart along a length of the cable guide 402. Each of the cable-tie retention locations 432 includes notches 434 located at opposite sides of the guide channel 412 and ribs 436 that extend circumferentially around a back of the guide channel 414 from one of the notches 434 to the other of the notches 434. The ribs 436 are arranged in pairs with each pair of ribs 436 defining a cable tie receptacle 438. By securing cable ties at the cable tie retention locations 432, the cable 413 can be securely strapped within the guide channel 412. Additionally, by securing the cable guide 402 to the cable 413 with the cable ties 428, the cable ties 428 further prevent the cable guide 402 from disengaging from the sheath 331.

In one example, sheath 331 is relatively small and has an internal volume less than 200 cubic centimeters ($cm^3$). In one example, the sheath 331 has a length less than 200 millimeters (mm), a width less than 75 mm and a thickness less than 30 mm. Due to the relatively small size of the sheath 331, size limitations make it difficult to provide more than one cable port at any given end of the sheath. Therefore, the cable guide 402 provides an external structure for allowing the sheath 331 to be installed in a butt-style configuration even though the sheath 331 has an in-line configuration with a single cable port at each opposite end.

Figure 43:
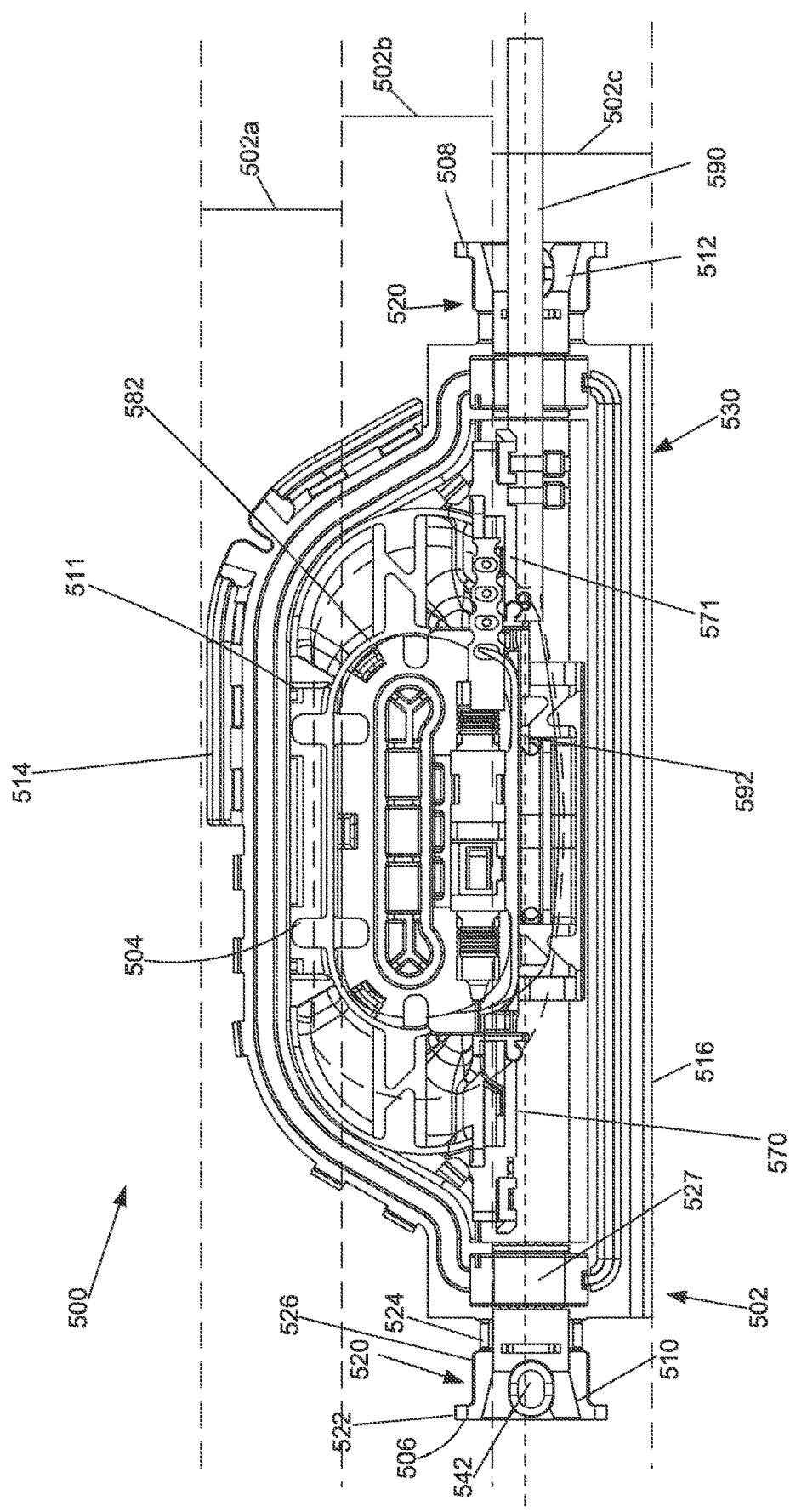
FIG. 43 depicts the inside of a rear housing piece of another splice closure in accordance with the principles of the present disclosure.
Figure 44:
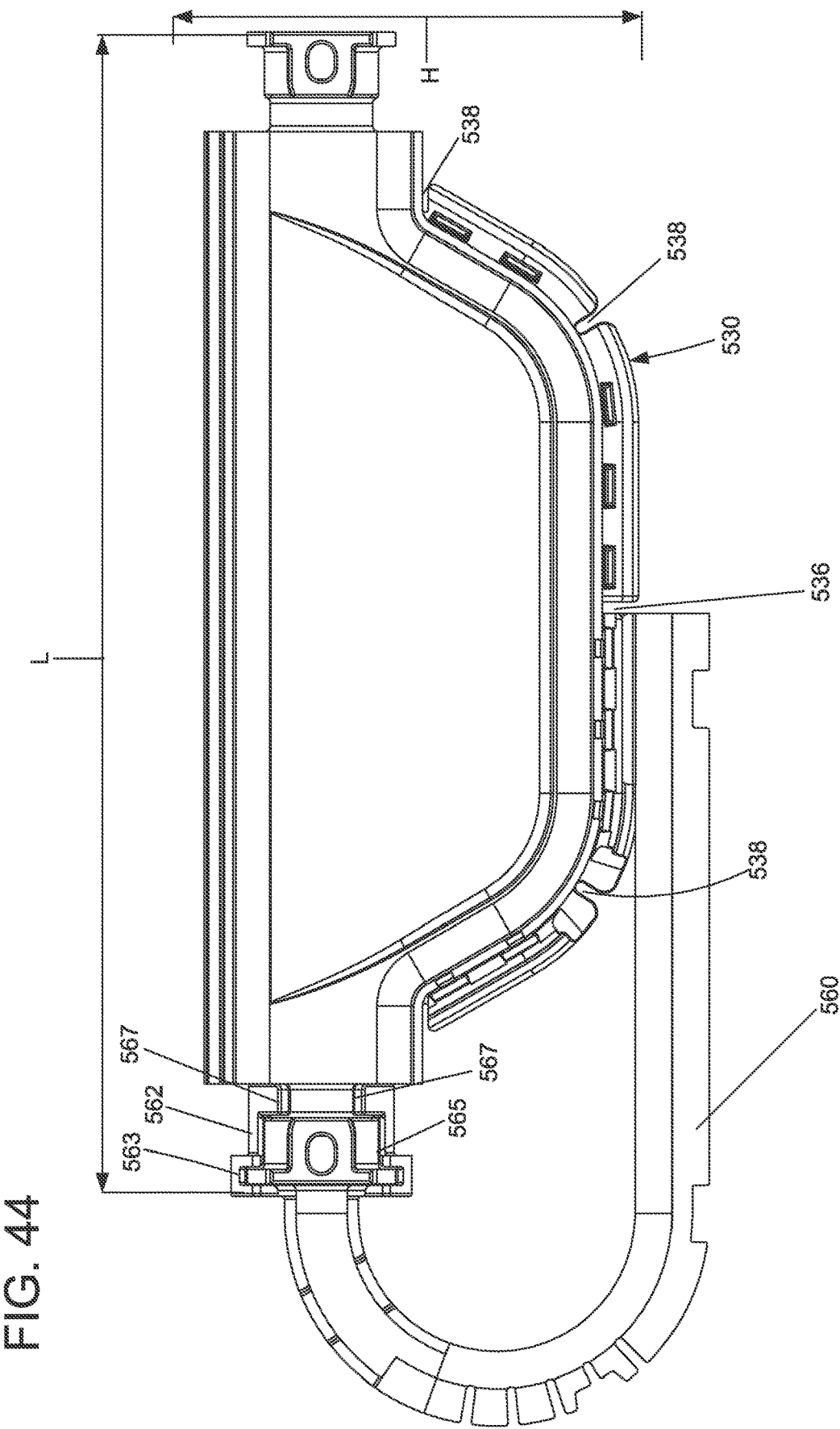
FIG. 44 depicts the outside of the rear housing piece of FIG. 43.

FIG. 43 depicts another enclosure 500 (e.g., a splice enclosure) in accordance with the principles of the present disclosure. The enclosure 500 includes a housing 502 containing a fiber management tray 504. The housing 502 includes a length L, a height H and a thickness T that are all perpendicular relative to one another. The length L is longer than the height H, and the height H is longer than the thickness T. The housing includes first and second ends 506, 508 separated by the length L. First and second cable ports 510, 512 are located at the first and second ends 506, 508. The first and second cable ports 510, 512 are aligned along an axis A parallel to the length L. The height extends between a top 514 and a bottom 516 of the housing 502. The axis A is located at a bottom third 502c of the housing 502. A splice location 511 (e.g. a splice holder for holding optical splices between optical fibers of cables routed into opposite ends of the housing 502) is located at a top third 502a of the housing 502. A middle third 502b of the housing is located between the top third 502a and the bottom third 502c of the housing 502. The first and second cable ports 510, 512 each have a cross-dimension CD measured in the orientation of the thickness T that traverses at least one third of the thickness T. The first and second cable ports 510, 512 are defined at least in part by end sleeves 520 that project outwardly from a main body of the housing 502 at opposite ends 506, 508 of the housing 502. The end sleeves 520 include end flanges 522 and circumferential grooves 524. The end sleeves 520 also include cylindrical portions 526 positioned axially between the end flanges 522 and the circumferential grooves 524. In one example, cable sealing gel can be provided at pockets 527 located immediately inward from the end sleeves 520 and the end sleeves 520 can be free of gel or other cable sealant. Similar to previously described examples, perimeter sealing (e.g., a perimeter gasket) can be provided about the perimeter of the housing 502 to provide sealing between housing pieces of the housing 502. The perimeter sealing preferably contact the cable sealing gel to prevent leak points adjacent the sleeves 520.

Figure 45:
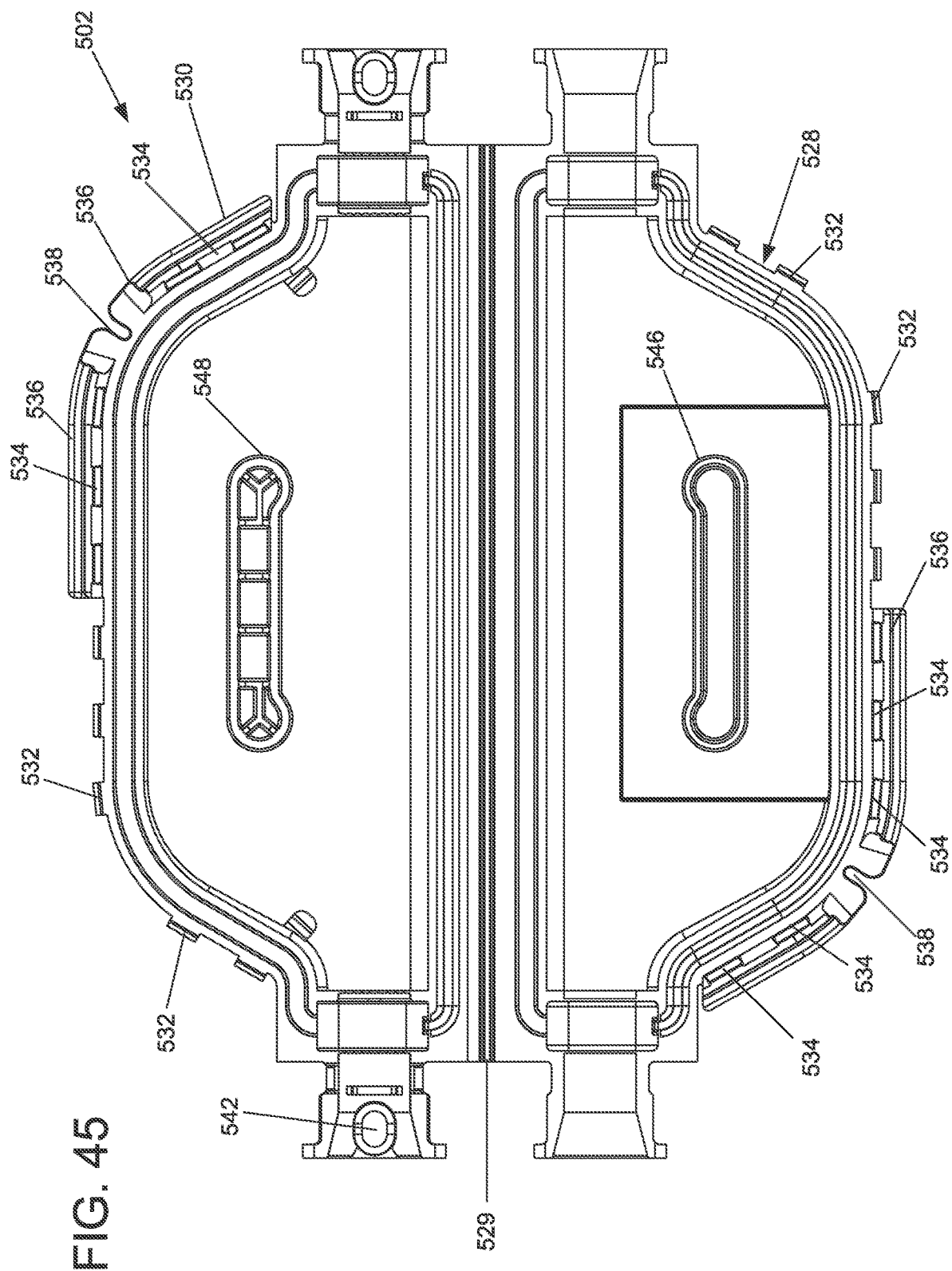
FIG. 45 depicts the housing of the enclosure of FIG. 43 in an open position.
Figure 46:
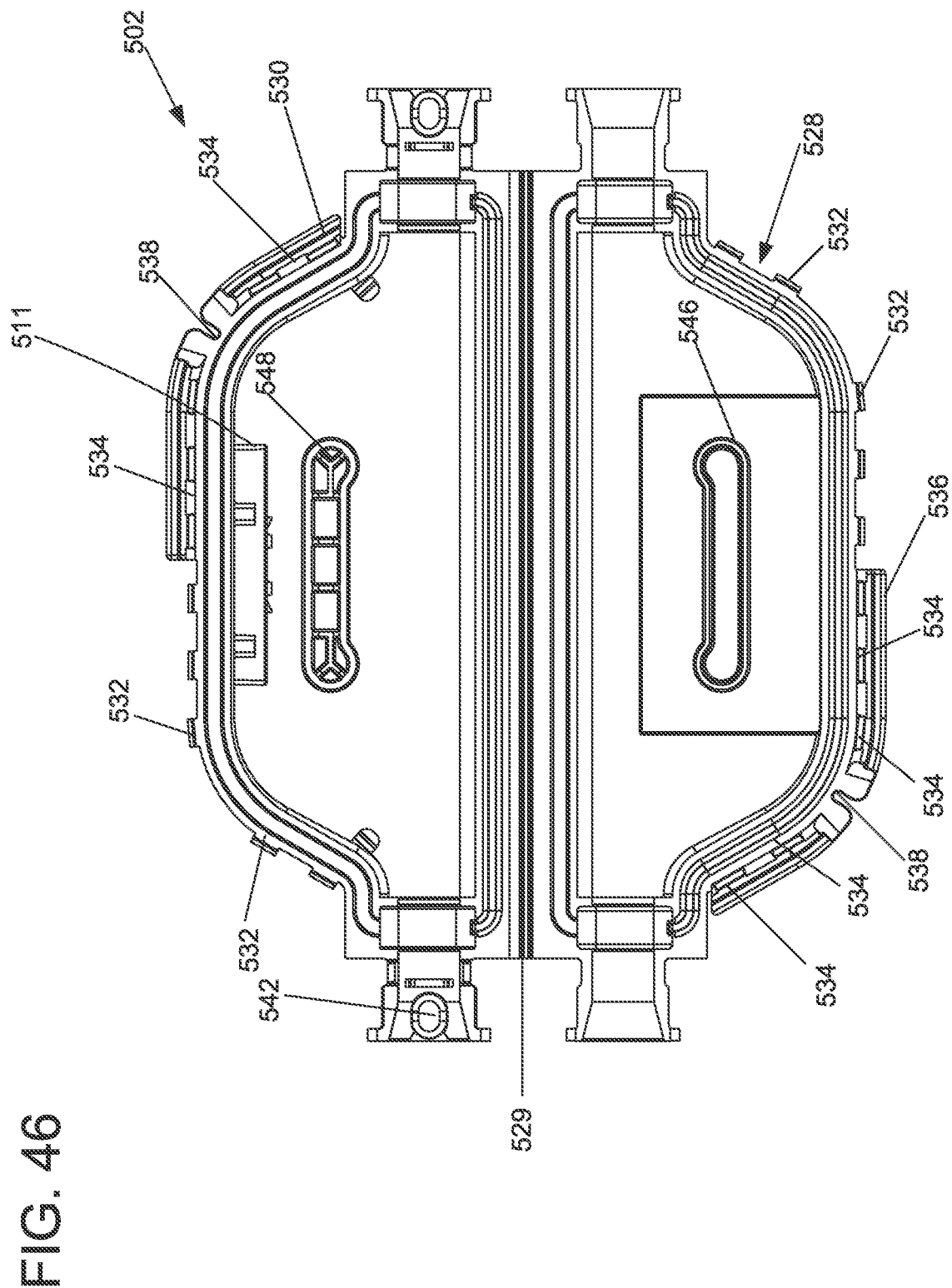
FIG. 46 depicts the housing of the enclosure of FIG. 45 with a splice location.
Figure 47:
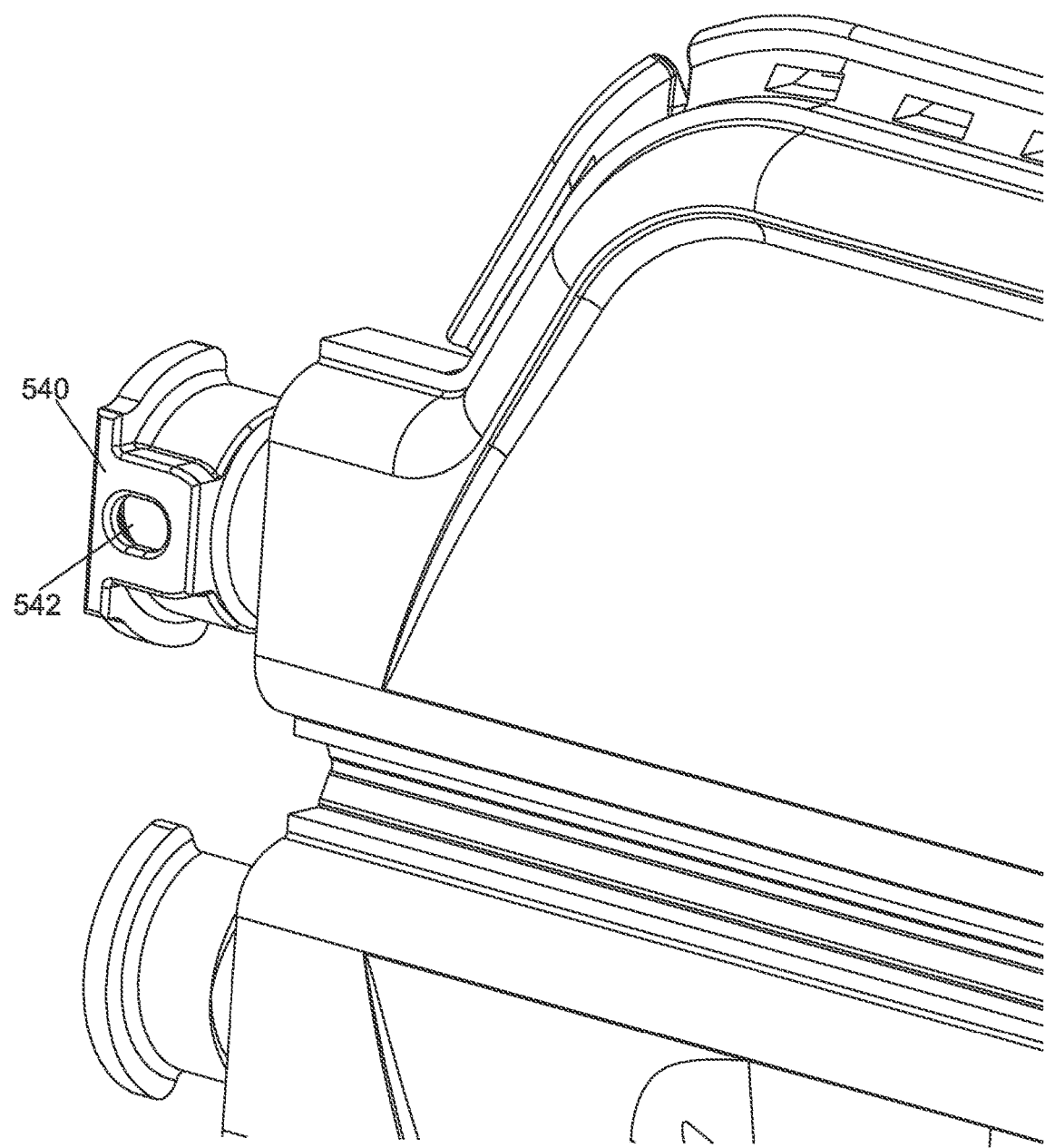
FIG. 47 is a perspective view of an end portion of the housing of FIG. 45 shoving a mounting boss of the housing.
Figure 48:
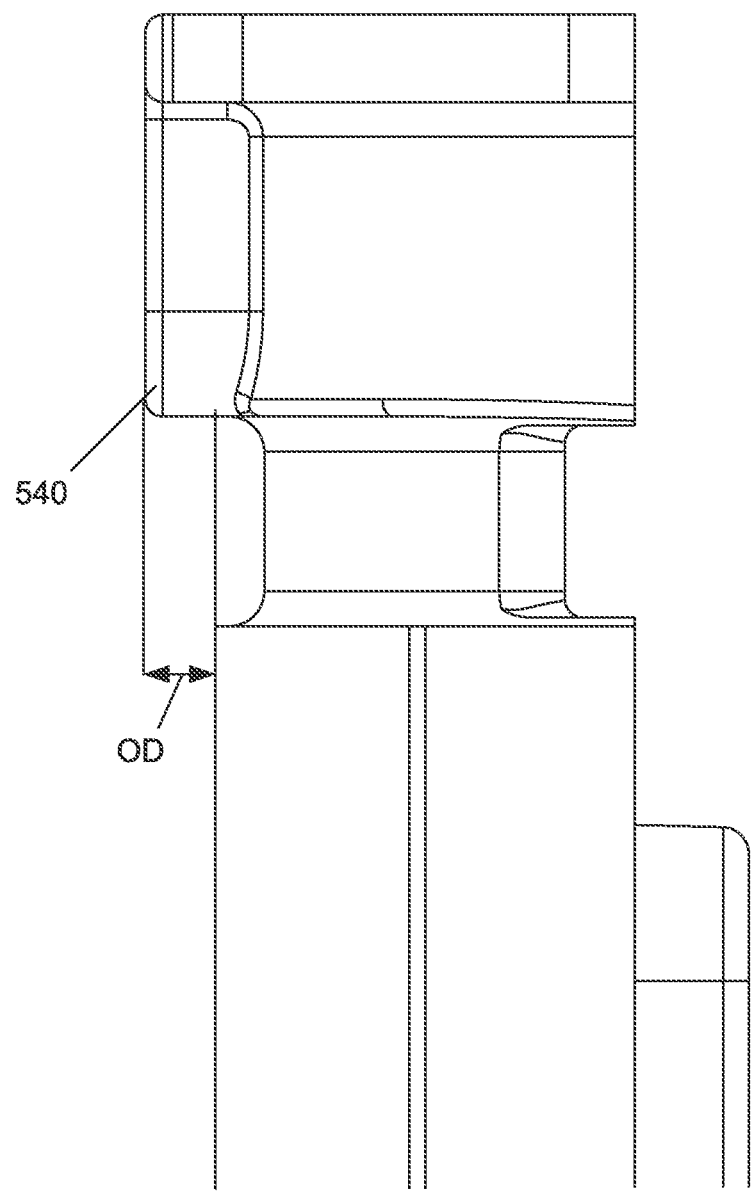
FIG. 48 is a top view of the housing end portion of FIG. 45.
Figure 49:
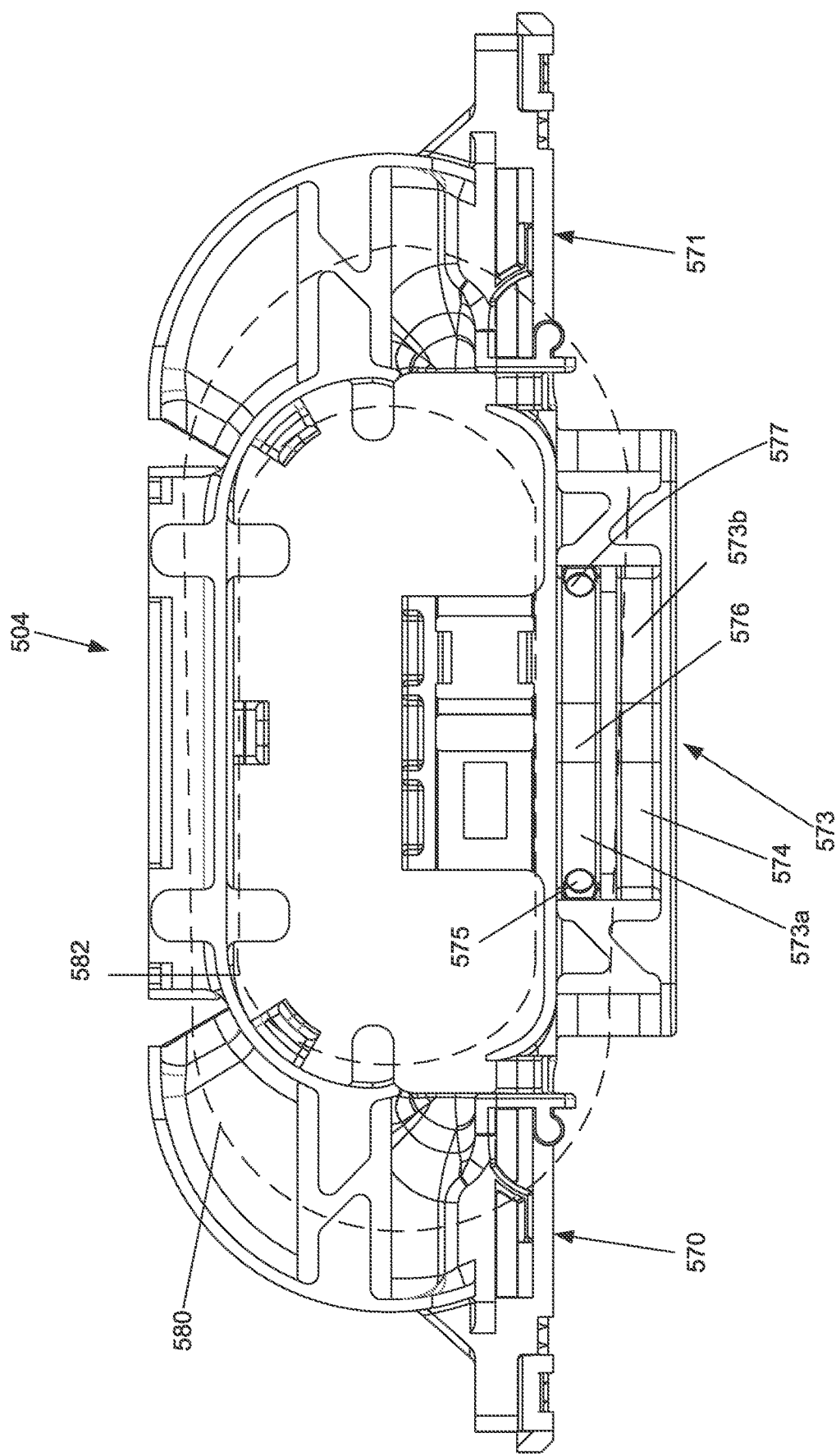
FIG. 49 is a front view of a fiber management tray of the enclosure of FIG. 42.
Figure 50:
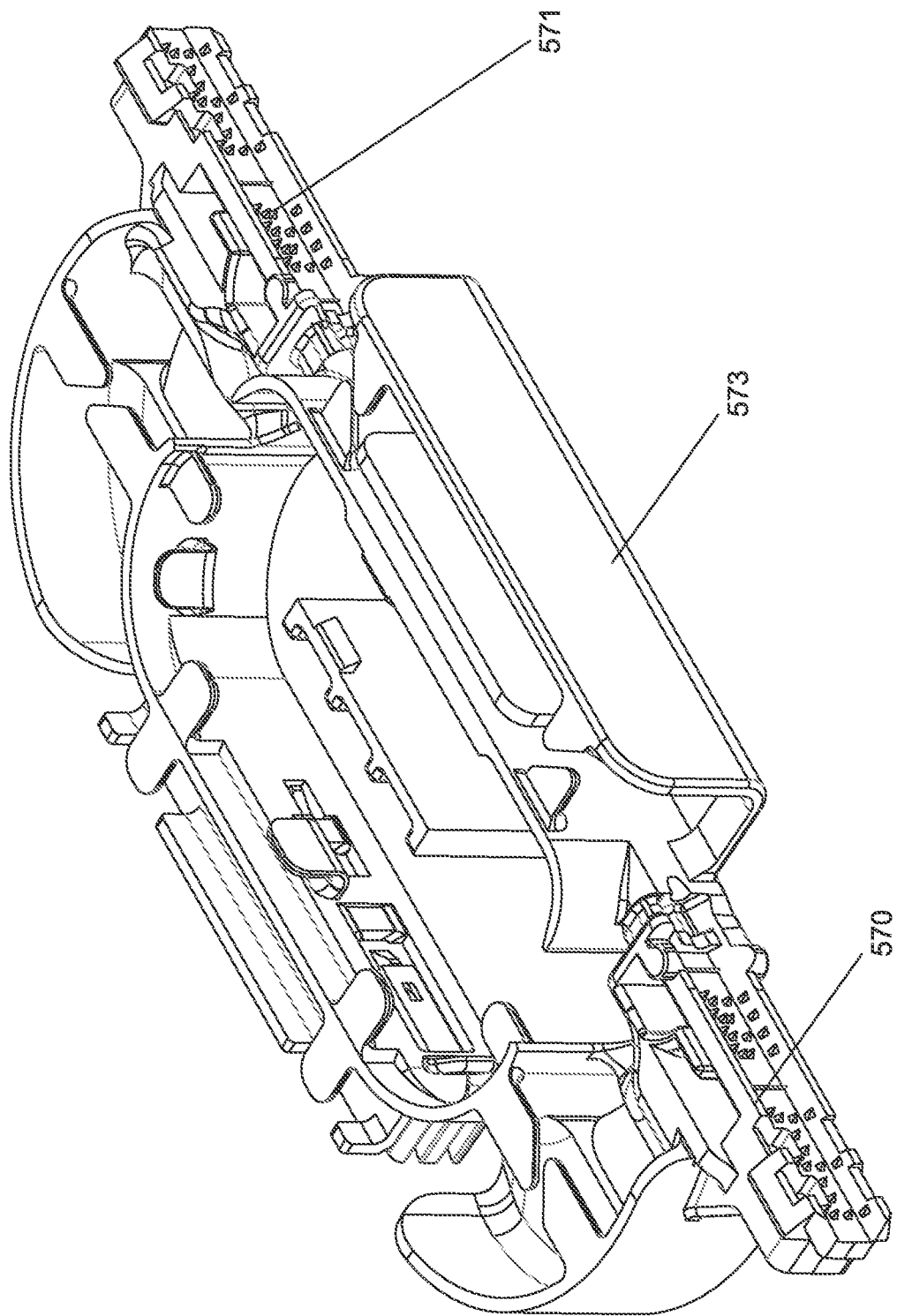
FIG. 50 is a perspective view of the fiber management tray of FIG. 49.

A cable guide 560 for reversing a direction of a cable routed through one of the end sleeves 520 can be mounted to the housing 502. The cable guide 560 includes a coupler 562 for coupling the cable guide 560 to one of the sleeves 520. The end coupler 562 has an open sided configuration and includes a slot 563 for receiving the end flange 522, a middle portion 565 for receiving the cylindrical portion 526, and latching arms 567 that are received in the circumferential groove 524 for latching about the end sleeve 520. Slots 569 are provided at a bend of the guide 560 for increasing flexibility Referring to FIG. 45, the housing 502 includes front and back housing pieces 528, 530 (e.g., a cover and a base) movable relative to one another between an open position and a closed position. In one example, the housing pieces can each define a portion (e.g., a half portion) of the housing 502. When the front and back housing pieces 528, 530 are in the closed position, the front and back housing pieces 528, 530 cooperate to define and enclose an interior of the housing 502. When the front and back housing pieces 528, 530 are in the open position, the interior of the housing 502 can be accessed. In one example, the front and back housing pieces 528, 530 are coupled together by a structure such as a hinge 529 (e.g., a living hinge) that allows the front and back housing pieces 528, 530 to be pivoted between the open and closed positions. In the depicted example, a snap-fit latching arrangement is provided about the perimeter of the housing 502 for securing the front and back housing pieces 528, 530 in the closed position. The snap-Fit latching arrangement can include a plurality of latching tabs 532 that snap within a plurality of receptacles 534. The receptacles 534 can be defined by latching members 536. Each of the latching members 536 preferably defines a plurality of the receptacles 534. Slots 538 are provided for separating the latching members 536 from one another to enhance the flexibility of the latching members 536. In certain examples, the slots 538 are provided at transitions in the shape of the perimeter of the housing such as at curved locations. In one example, each of the housing pieces 528, 530 can define a portion (e.g., a half portion) of each of the end sleeves 520.

In one example, the back housing piece 530 includes bosses 540 at the back side of the back housing piece 530 for facilitating mounting the housing 502 to another structure such as a wall. In one example, the bosses 540 include mounting surfaces (e.g., co-planar mounting surfaces) that are rearwardly offset an offset distance OD from the back side of the main body of the back housing piece 530. In one example, the bosses 540 are located at the portions of the end sleeves 520 defined by the back housing piece 530. In one example, fastener openings 542 are defined through the bosses 540 and through the walls defining the sleeves 520. The fastener openings are configured to receive fasteners such as bolts, screws, nails or the like for mounting the back housing piece 530 to a structure such as a wall. The portions of the end sleeves 520 defined by the back housing piece 530 also define notches 544 at the circumferential grooves 524 for receiving a fastening element such as a tie-wrap for securing cables routed through the sleeves 520 to the back housing piece 530. For example, cables can be secured by tie wraps that wrap around the back sides of the sleeves 520 through the notches 544 and around the cables routed through the sleeves 520 such that the cables are secured to portions of the sleeves 520 defined by the back housing piece 530.

Figure 53:
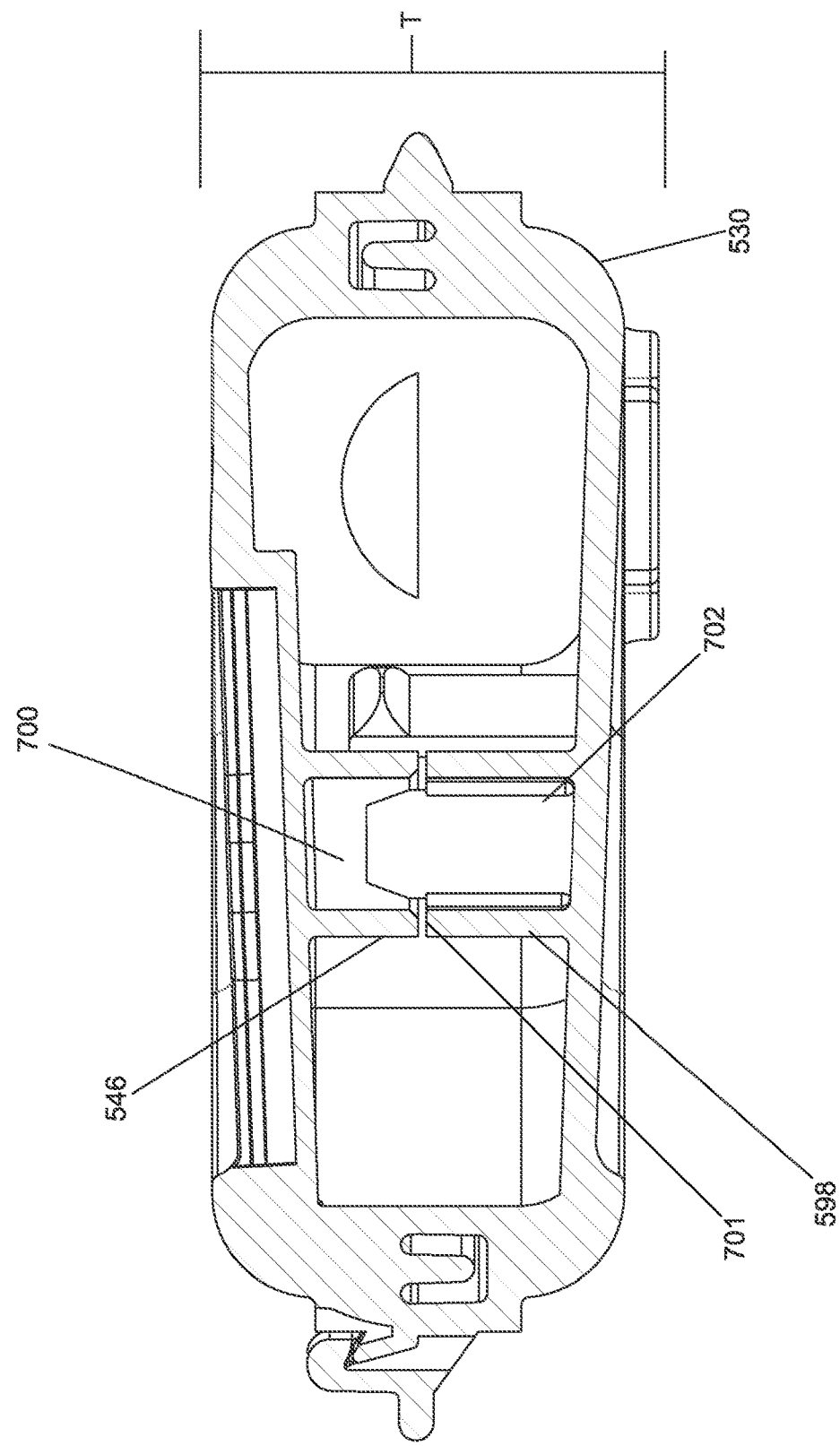
FIG. 53 is a cross-sectional view showing re-enforcing portions of the housing of FIG. 45.
Figure 54:
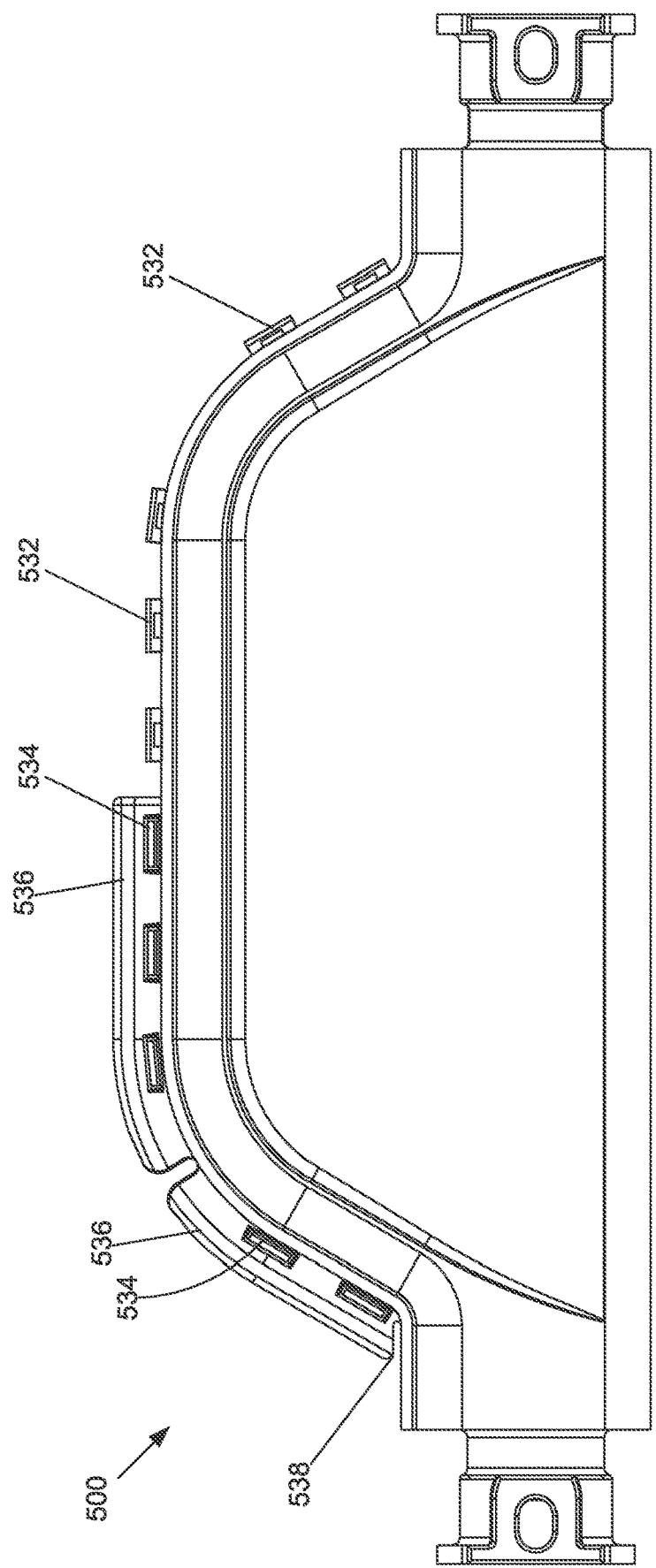
FIG. 54 is a rear view of the rear housing piece of FIG. 43.
Figure 55:
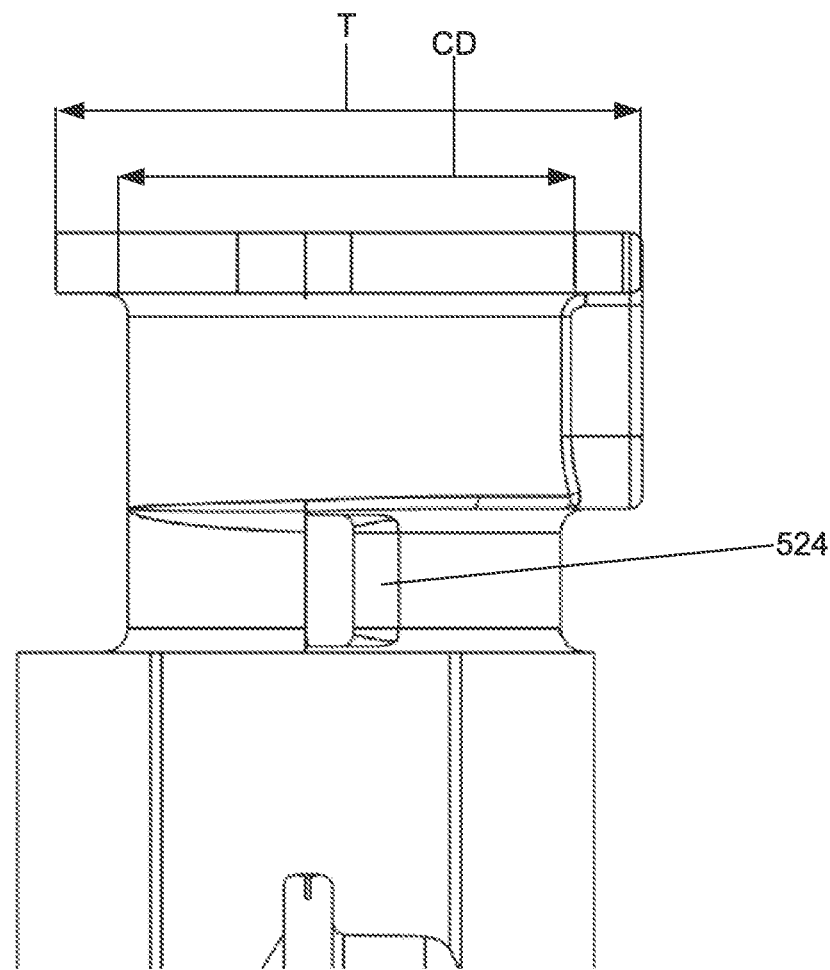
FIG. 55 is a top view of the housing end portion of FIG. 46 in a closed position.

In one example, the front and back housing pieces 528, 530 include internal features for providing crush resistance in the orientation of the thickness T. In one example, the features can be centrally located within the interior of the housing 502 and can extend across the thickness T. In one example, the features can include first and second projections 546, 548 respectively formed with the front and back housing pieces 528, 230. In one example, the first projection 546 extends rearwardly from the front housing piece 528 and the second projection 546 extends forwardly from the back housing piece 530. In one example, surfaces 701 of the projections 546, 548 contact each other to transfer loading across the thickness T from the front to the back of the housing (see FIG. 53). In one example, the first and second projections 546, 548 can include alignment features 700, 702 having profiles that mate to ensure proper engagement between the projections 546, 548 when the housing 502 is closed.

Figure 51:
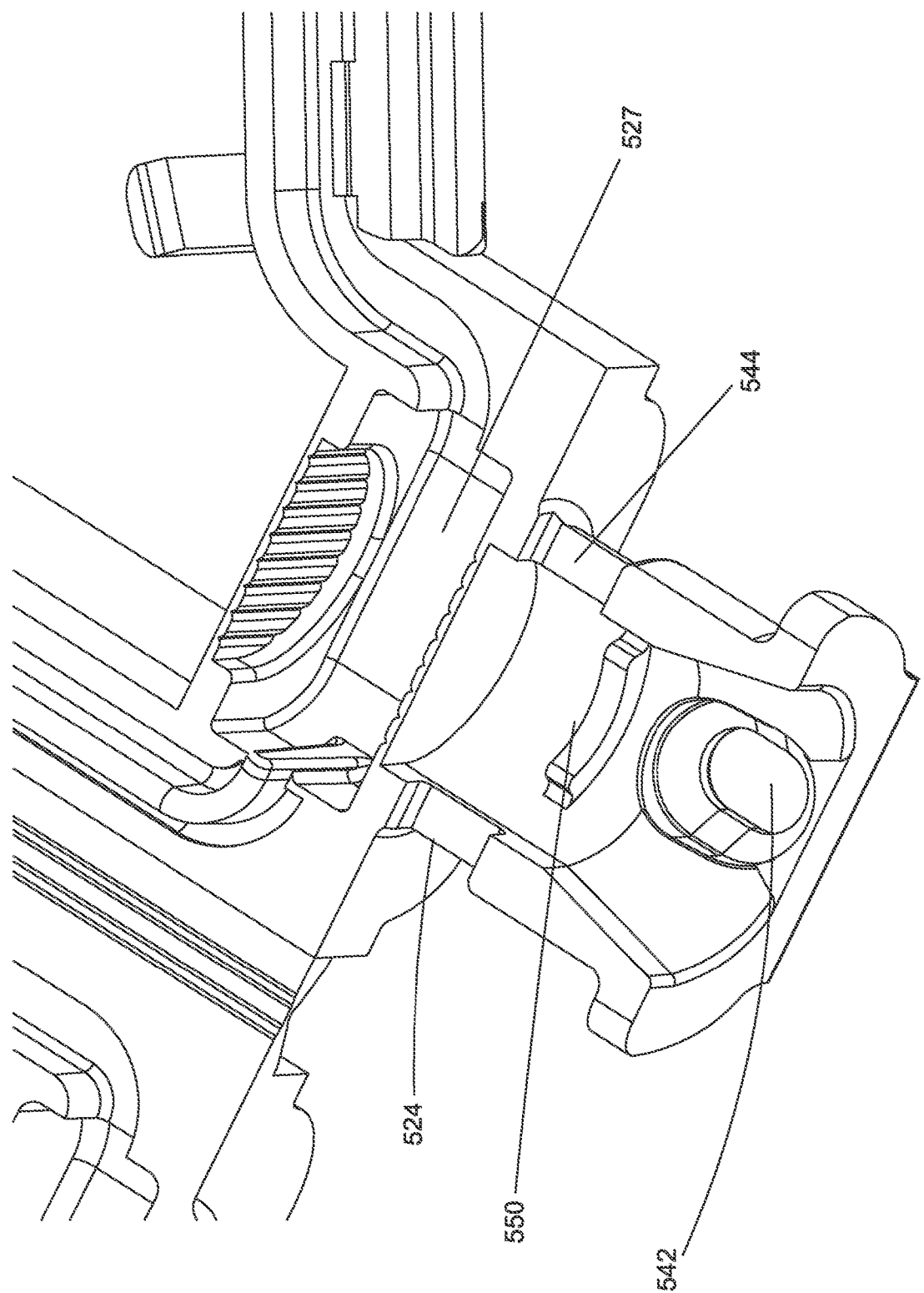
FIG. 51 is a front perspective view of an end portion of the rear housing piece.
Figure 52:
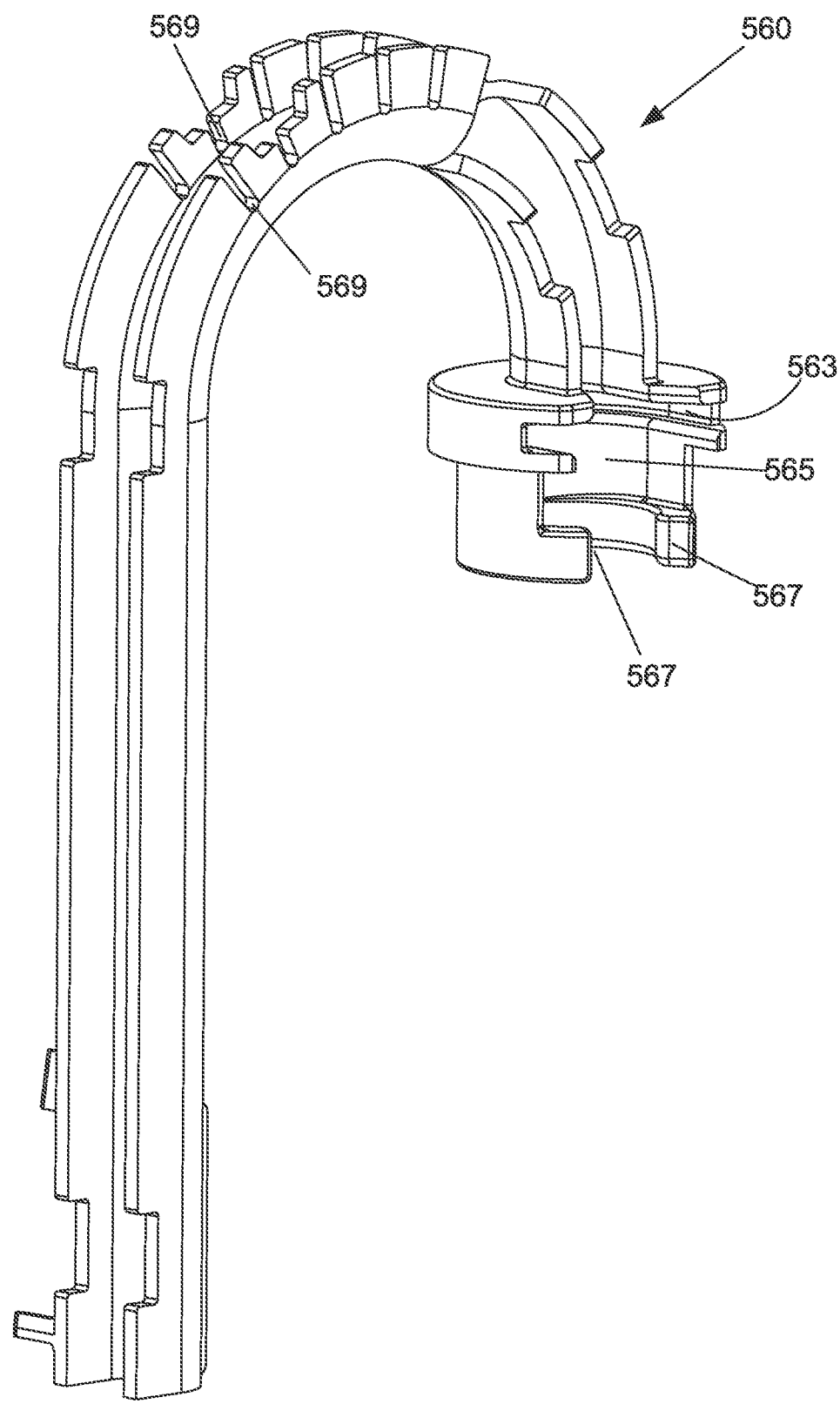
FIG. 52 depicts a cable guide adapted to couple to one end of the enclosure of FIG. 43 for reversing a direction of a cable.

In one example, a rib 550 (see FIG. 51) can be provided within each of the sleeves 520. The rib 550 can be configured to fit within the corrugations of a corrugated cable guide such as a corrugated tube installed within the sleeve 530 to attach the corrugated cable guide to the sleeve 520. The corrugated cable guide can be configured for protecting and providing strain relief to a cable routed into the housing through the sleeve 520.

The fiber management tray 504 mounts within the housing 504 and includes cable fixation locations 570, 571 for securing cables routed through the cable ports 510, 512 to the tray 504 (e.g., by cables ties, clamps or other structures). With the tray 504 mounted in the housing 502, the cable fixation locations 570, 571 are spaced-apart along the axis A and are each located adjacent a corresponding one of the cable ports 510, 512. The tray 504 includes a linear fiber guide channel structure 573 that extends along the axis A between the cable fixation locations 570, 571. The linear fiber guide channel structure 573 includes two parallel fiber channels 573*a*, 573*b*. A base 574 of the channels 573*a*, 573*b* includes a surface curved along a convex curvature that curves in a direction along the axis. Openings 575, 577 are defined through the base 574 on opposite sides of an apex 576 of the convex curvature. The tray 504 includes an outer fiber routing loop path 580 that includes the linear fiber guide channel structure 573. The tray 504 also includes an inner fiber routing loop path 582 surrounded by the outer fiber routing loop path 580.

In use of the enclosure 500, first and second cables 590 can be routed into the enclosure respectively through the first and second opposite ports 510, 512. Each of the cables can include a strength member 592 (e.g., a glass reinforced epoxy rod) at least one active optical fiber and optionally at least one inactive (i.e. dark) optical fiber. The active optical fibers of the first and second cables can be optically spliced together at the splice location 511 and excess fiber length of the active fibers can be stored at the outer fiber routing loop path 580. The inactive fibers can be stored at the inner fiber routing loop path 580. To maintain separation between the active and inactive fibers, the active fibers can be routed through one of the channels 573a, 573b and the inactive fibers can be routed through the other of the channels 573a, 573b. Preferably the active fibers are routed first and the inactive fibers routed second to minimize the effect of crossovers impacting access to the inactive fibers at a later date. The strength members of the cables can be directed through the openings 575, 577 of the base of the channel structure to isolate the strength members from the fiber routing.

Figure 56:
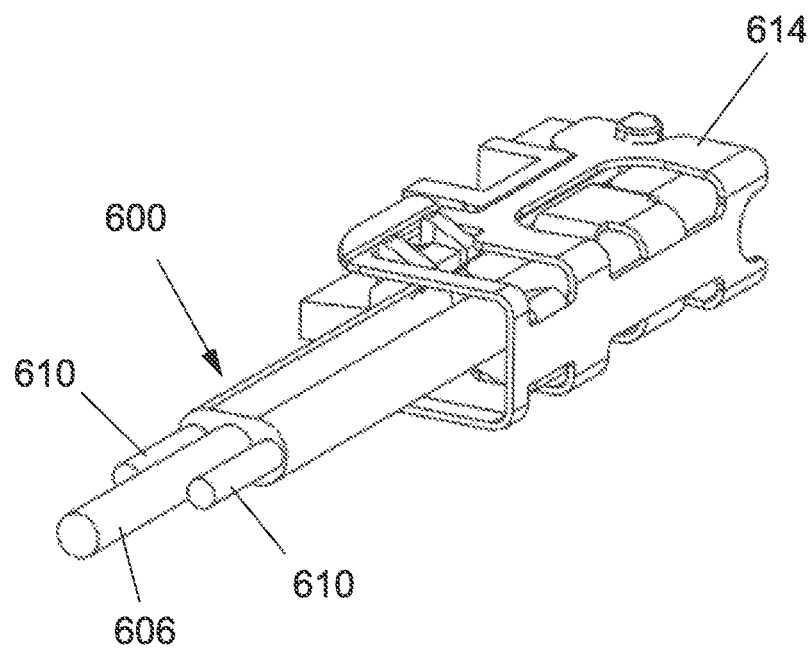
FIG. 56 is a perspective view of a flat cable secured within a fixation device depicted as a cable clamp.
Figure 57:
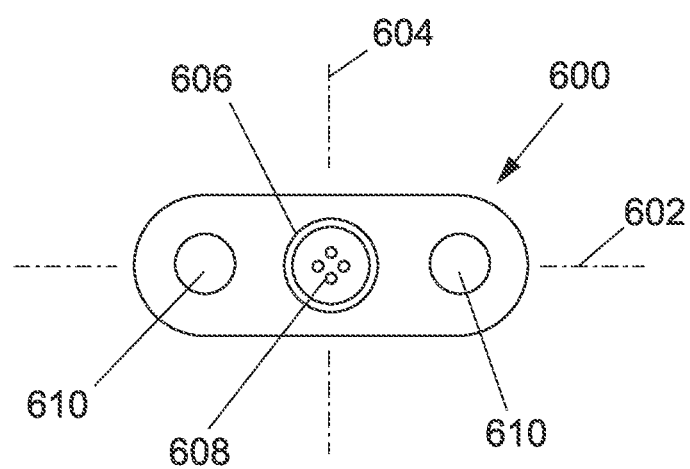
FIG. 57 is a cross-sectional view of the flat cable of FIG. 56 depicting minor and major dimensions of the cable cross-section.
Figure 58:
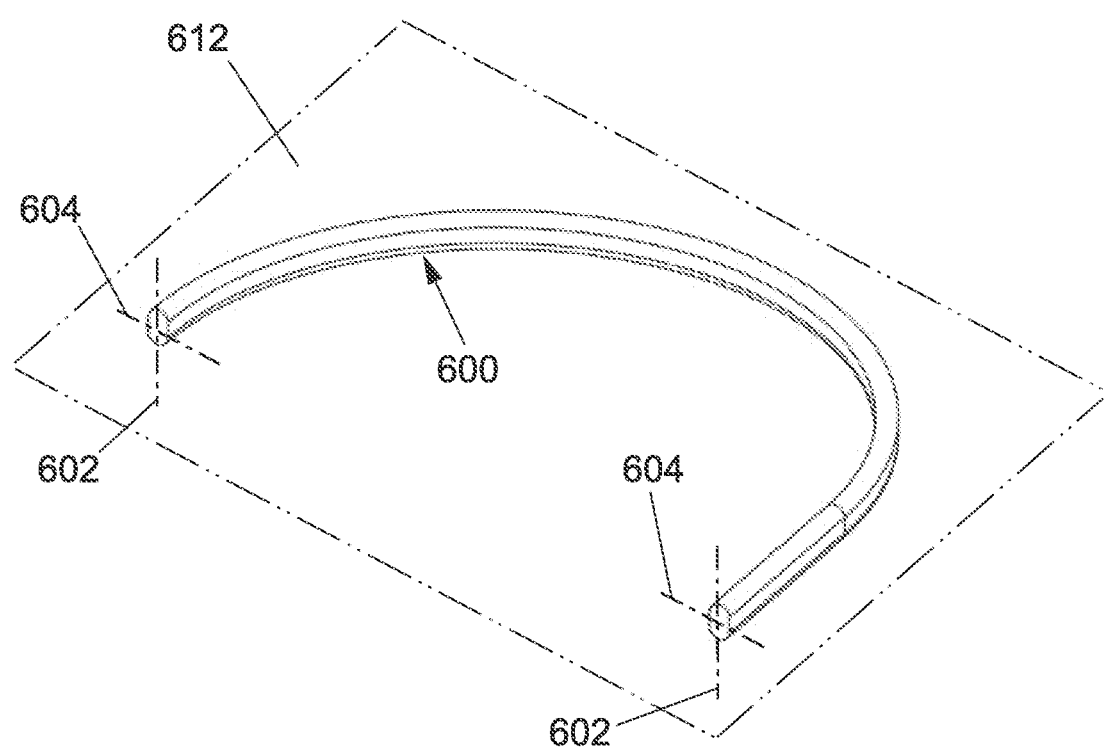
FIG. 58 depicts the flat cable of FIG. 56 bent along a preferred bend orientation along a reference plane that includes a minor dimension of the cross-section of the flat cable.

It will be appreciated that enclosures in accordance with the principles of the present disclosure can be used with cables having any type of cross-sectional shape. Example types of cross-sectional shapes for cables include round cross-sectional shapes and non-round cross-sectional shapes (e.g., elongate cross-sectional shapes such as flat cross-sectional shapes). It will be appreciated that cables having non-round cross-sectional shapes raise further considerations in the area of cable management and cable routing because such cables can have a preferred bend orientation. FIGS. 56 and 57 depict an example fiber optic cable 600 having an elongate transverse cross-sectional shape. It will be appreciated that the fiber optic cable 600 is of the type often referred to as a flat drop cable. The cable 600 has a cross-sectional shape defining a major axis 602 and a minor axis 604 that are perpendicular relative to one another. The cross-sectional shape is elongate along the major axis 602. The cable 600 includes a centrally located buffer tube 606 containing one or more optical fibers 608. Strength members 610 (e.g., rods made of a material that includes a glass fiber reinforced polymer such as epoxy) are positioned on opposite sides of the buffer tube 606. The buffer tube 606 as well as the strength member 610 are positioned along the major axis 602. The cable 600 has a preferred bending orientation along a bending plane 612 (see FIG. 58) that includes and extends along the minor axis 604 and that is perpendicular to the major axis 602. In certain examples, when the cable 600 is affixed to an enclosure in accordance with the principles of the present disclosure by a fixation device such as a cable clamp 614 (see FIG. 56), it is desirable for the cable 600 to be oriented such that the major axis 602 is perpendicular relative to an enclosure main reference plane that extends through and includes a major form factor (e.g., a major cross-sectional shape, footprint, major perimeter shape, major outer boundary shape) of the enclosure. By orienting the cable 600 with its major axis perpendicular relative to the enclosure main reference plane, the cable 600 can be bent along the enclosure main reference plane to coil the cable to provide over length slack management and storage. Such cable over length stored in coil form can be used to facilitate transitioning the enclosure from a splice work location (e.g., a work table) to its final mounting position. Additionally, for aesthetics and compactness, the cable cart be coiled around the enclosure such that the enclosure is at least partially within or in overlapping relationship with respect to the coil.

Figure 59:
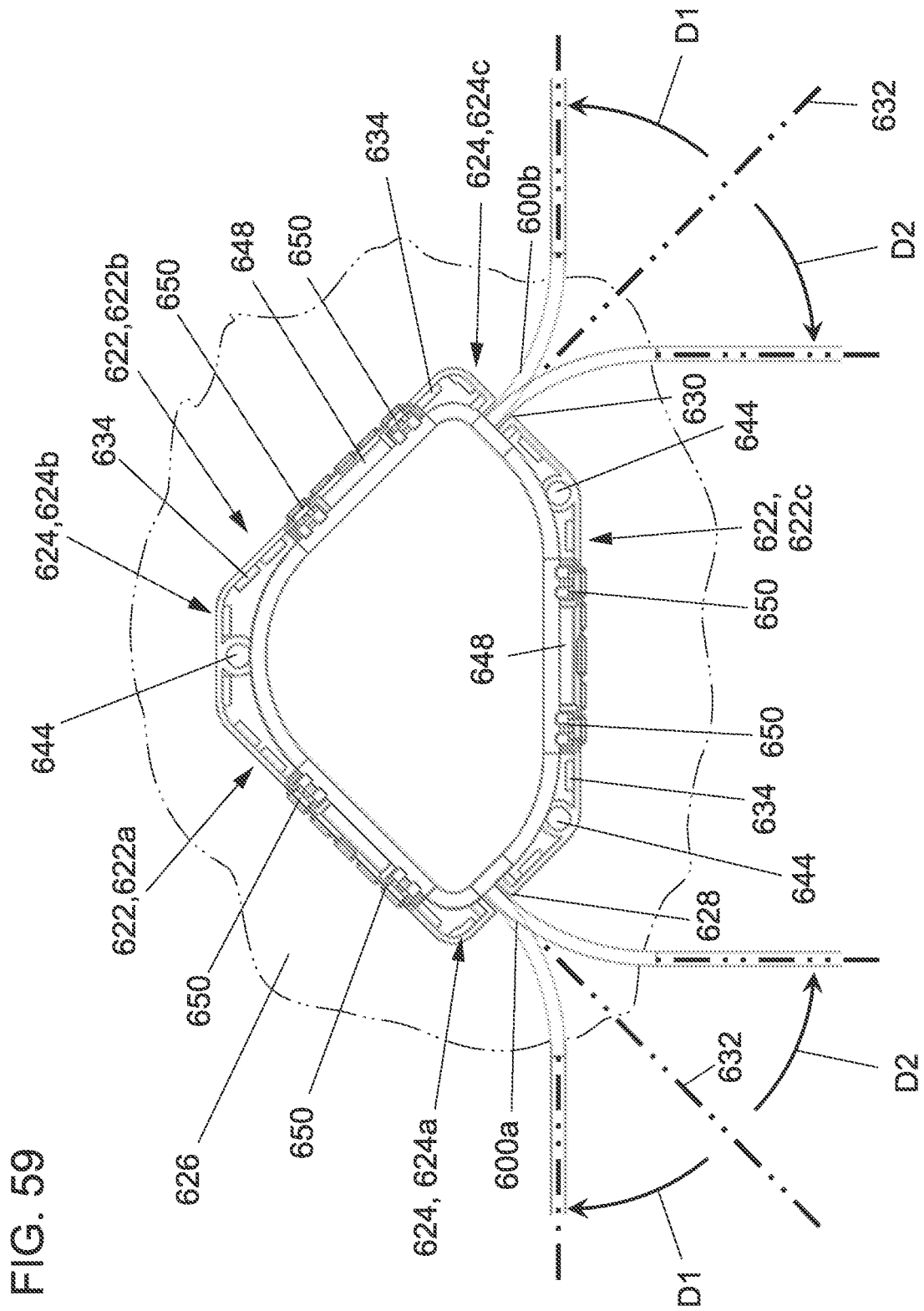
FIG. 59 is a front view of a telecommunications enclosure in accordance with the principles of the present disclosure configured to accommodate a variety of cable routing schemes.
Figure 60:
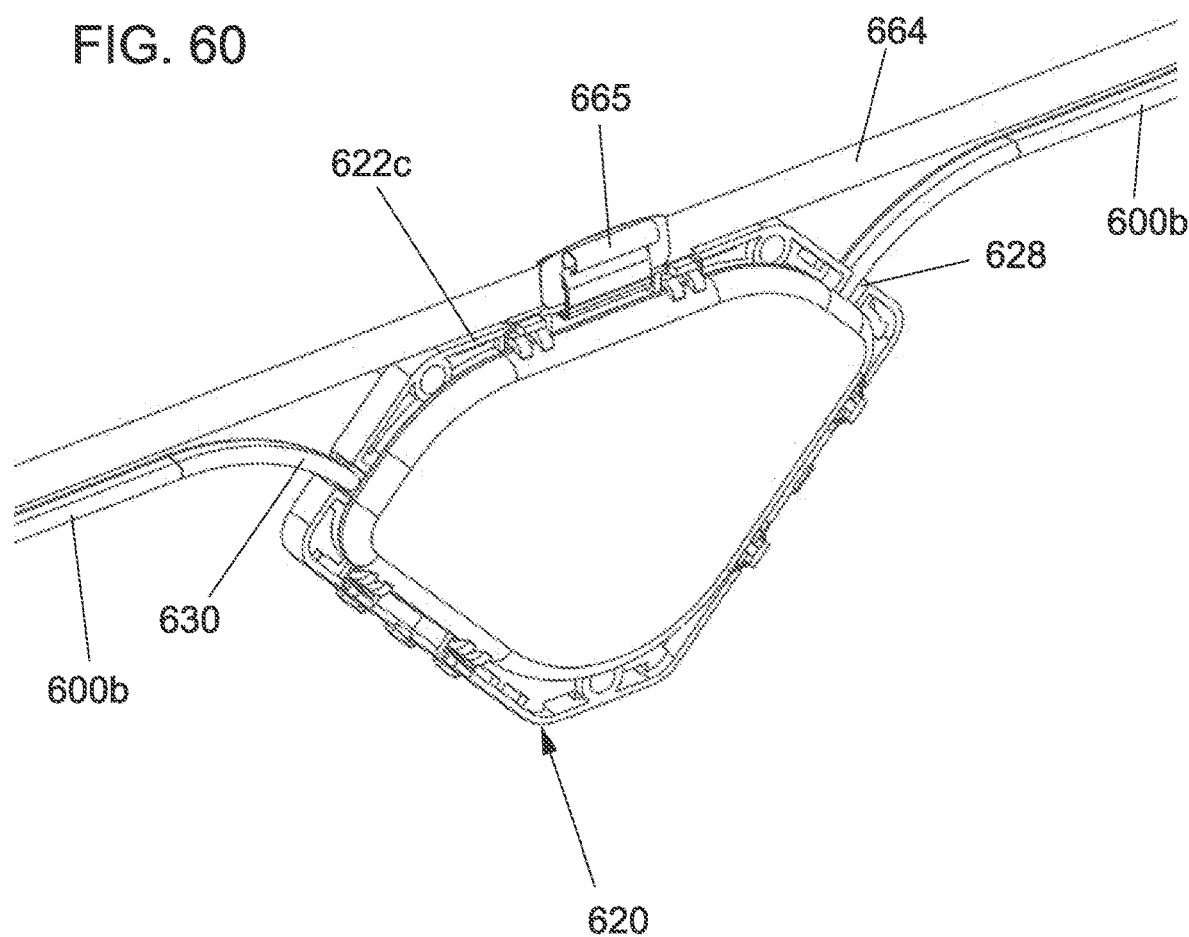
FIG. 60 is a perspective view the telecommunications enclosure of FIG. 59 in a strand mounted configuration (e.g., hung beneath a strand) accommodating a taught sheath inline cable routing scheme.
Figure 61:
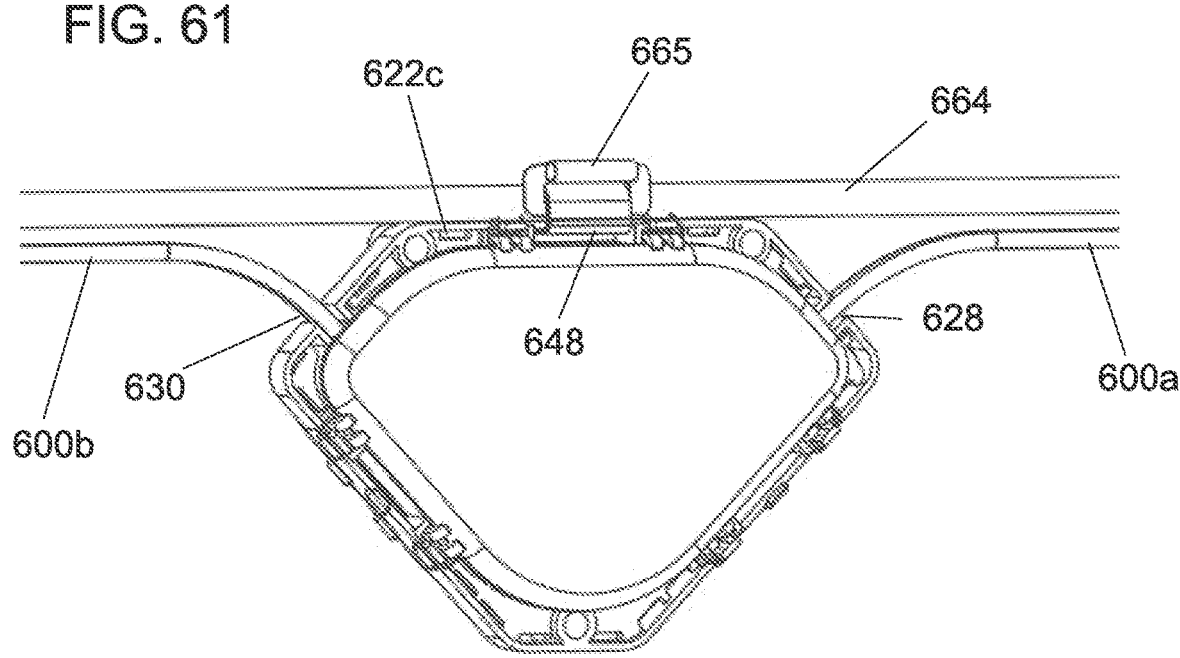
FIG. 61 is a front view of the taught sheath inline cable routing scheme FIG. 60.
Figure 62:
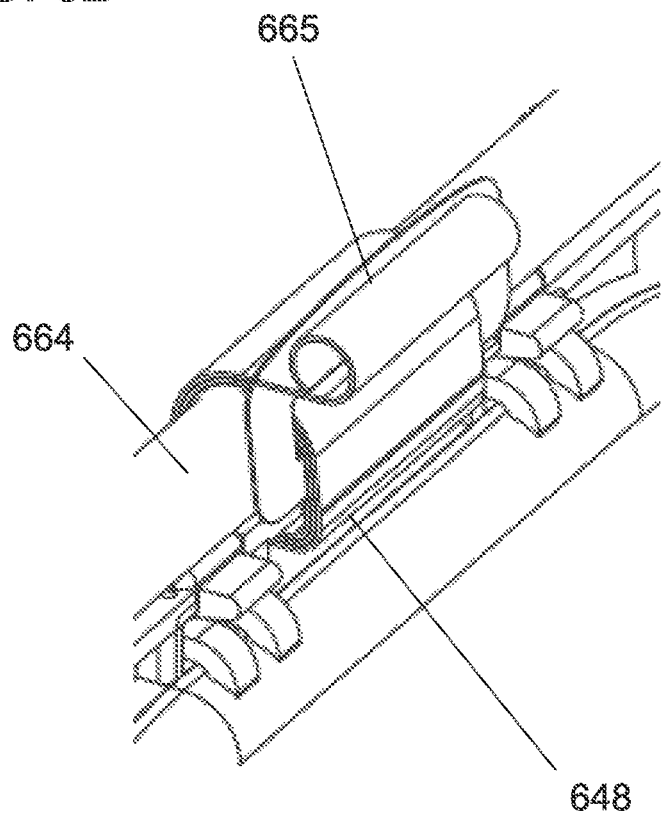
FIG. 62 depicts is an enlarged view of a strand attachment location of the telecommunications enclosure of FIG. 60 showing a strand coupling strap securing the enclosure to the strand.
Figure 63:
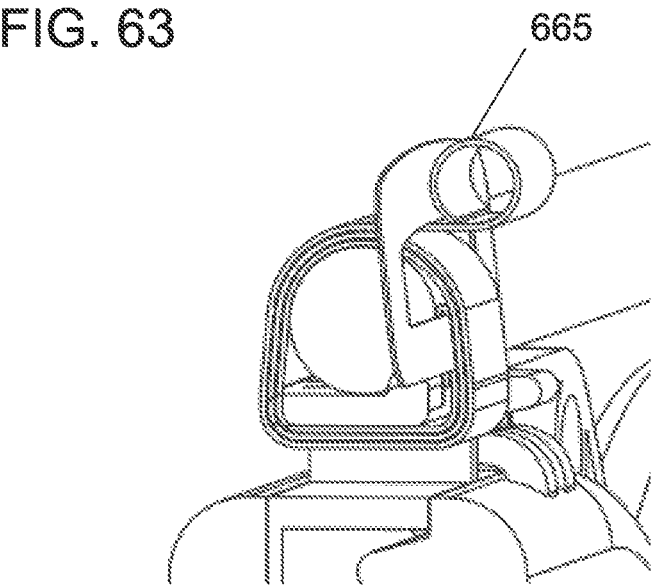
FIG. 63 is a cross-sectional view through the strand coupling strap of FIG. 62.

FIG. 59 depicts an enclosure 620 in accordance with the principles of the present disclosure. The enclosure 620 includes a plurality of major sides 622 that are angled relative to one another at oblique angles. In the depicted example, the major sides 622 include three major perimeter sides (e.g., first, second and third major perimeter sides 622a, 622b, 622c) arranged in a triangular configuration. The major perimeter sides 622 are interconnected by intermediate minor transitional perimeter sides 624 (e.g., first, second and third transitional perimeter sides 624a, 624b and 624c) of the enclosure 620. The major perimeter sides 622 and the minor transitional perimeter sides 624 cooperate to define a major form factor of the enclosure 620 (e.g., the outer boundary of the major perimeter shape of the enclosure as depicted at FIG. 59) through which an enclosure main reference plane 626 extends. The enclosure 620 includes a first sealed cable pass-through region 628 and a second sealed cable pass-through region 630 located respectively at separate ones of the minor transitional sides 624 (e.g., the first and third transitional perimeter sides 624a, 624c) separated by one of the major perimeter sides 622 (e.g., the third major perimeter side 622c). The cable pass-through regions 628, 630 define cable pass-through axes 632 that are aligned an angle A relative to one another. In one example, the angle A is in the range of 60°-120°. In another example, the angle A is in the range of 70°-110°. In still another example, the angle A is in the range of 80°-100°. In a further example, the angle A is in the range of 85°-95° or is about 90°. The axes 632 intersect at a location within the major form factor of the enclosure 620. The relative angling of the axes 632 allows cables routed from the cable pass-through regions 628, 630 to be bent in either a first direction D1 or a second direction D2 relative to their respective cable pass-through axis 632 within the enclosure main reference plane 626. The ability to accommodate different cable bend directions within the major form factor plane of the enclosure allows one enclosure to be used to accommodate the different cable routing configurations required in the field. Often, the type of cable routing required in the field is not known until the field craftsperson reaches the installation site. Thus, the provision of an enclosure that can be used for multiple types of cable routing configurations reduces the number of enclosures that need to be transported to the field installation site.

In the depicted example of FIG. 59, cable attachment location 634 (e.g., openings such as slots for receiving cable ties or other fastening elements) can be provided about the major form factor (i.e., major perimeter) of the enclosure 620. For example, the cable attachment location 634 can be provided along the major perimeter sides 622 and or along the minor transitional perimeter sides 624.

The enclosure 620 can also include features for facilitating attaching the enclosure to a structure in the field (e.g., a pole, a wall, a strand, etc.). The enclosure 620 includes a major front side 640 (see FIG. 59) and an opposite major backside 642 (see FIG. 70). In the depicted example, the features for facilitating attaching enclosure to structures in the field extend through the enclosure 620 in a front-to-rear orientation. Example features include fastener openings 644 for receiving fasteners (e.g. screws, bolts, nails, etc.) for securing the enclosure 622 a wall or pole or other structure. The fastener openings 644 can extend through bosses 646 which protrude rearwardly from the back side 642 of the enclosure 620. Other example features include strand mount openings 648 for receiving fasteners such as clips, straps or ties for securing the enclosure 622 to a cable strand. The strand mount openings 644 are defined as slots located adjacent latching locations 650 adapted for latching a front cover 652 of the enclosure 622 a rear main body 654 (e.g., a base) of the enclosure 620.

In the enclosure 620, flat cables 600a, 600b routed respectively through the first and second cable pass-through regions 628, 630 can be secured (anchored, affixed) within the enclosure with their corresponding minor axes 604 oriented perpendicular relative to the enclosure major reference plane 626. In one example, the cables 600a, 600b can be affixed within the enclosure 620 by cable clamps having a configuration such as the cable clamp 614. In one example, the cables 600a, 600b can be affixed to a management tray 660 supporting at least one splice holder 662 and including structure for providing fiber management, fiber bend radius control and storage of excess fiber length. The cables 600a, 600b can be secured to the tray 660 with their respective major axes 602 oriented perpendicular relative to a main reference plane defined by the tray 660.

FIGS. 60-63 depict the enclosure 620 in a strand mounted configuration (e.g., hung beneath a strand 664) accommodating a taught sheath inline cable routing scheme. It will be appreciated that in a taught sheath inline cable routing scheme, cable coiling for providing cable over length storage is not provided. This type of configuration can be used for direct buried applications as well as façade applications as well as strand mount applications. In the depicted example, the major perimeter side 622c of the enclosure 620 located between the cable pass-through locations 628, 630 is attached to the strand 664 by a faster such as a strap and buckle fastener 665. The strap and buckle fastener 665 extends through the strand mount opening 648 at the major perimeter side 622c and around the strand 662. The cable pass-through locations 628, 630 face toward the strand 664 and the cables 600a, 600b are each bent along the enclosure main reference plane 626 in the direction D1 away from their respective cable pass-through axis 632 toward the strand 664 without being coiled.

Figure 64:
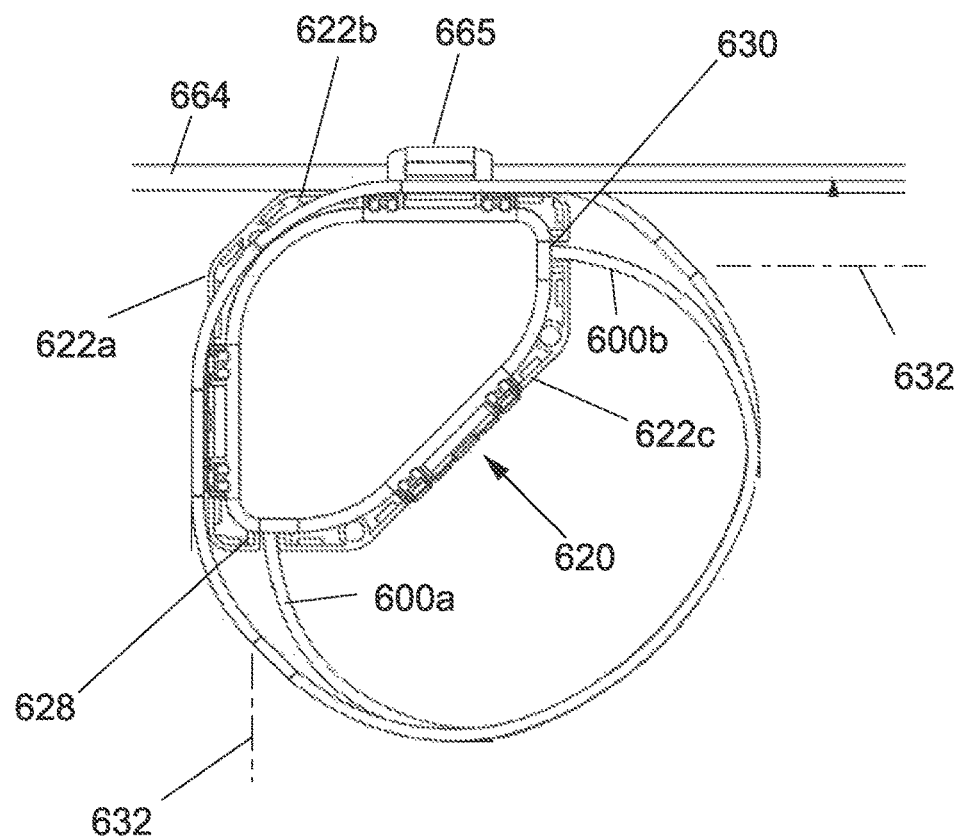
FIG. 64 is a perspective view the telecommunications enclosure of FIG. 59 in a strand mounted configuration accommodating an inline cable routing scheme with coil management.
Figure 65:
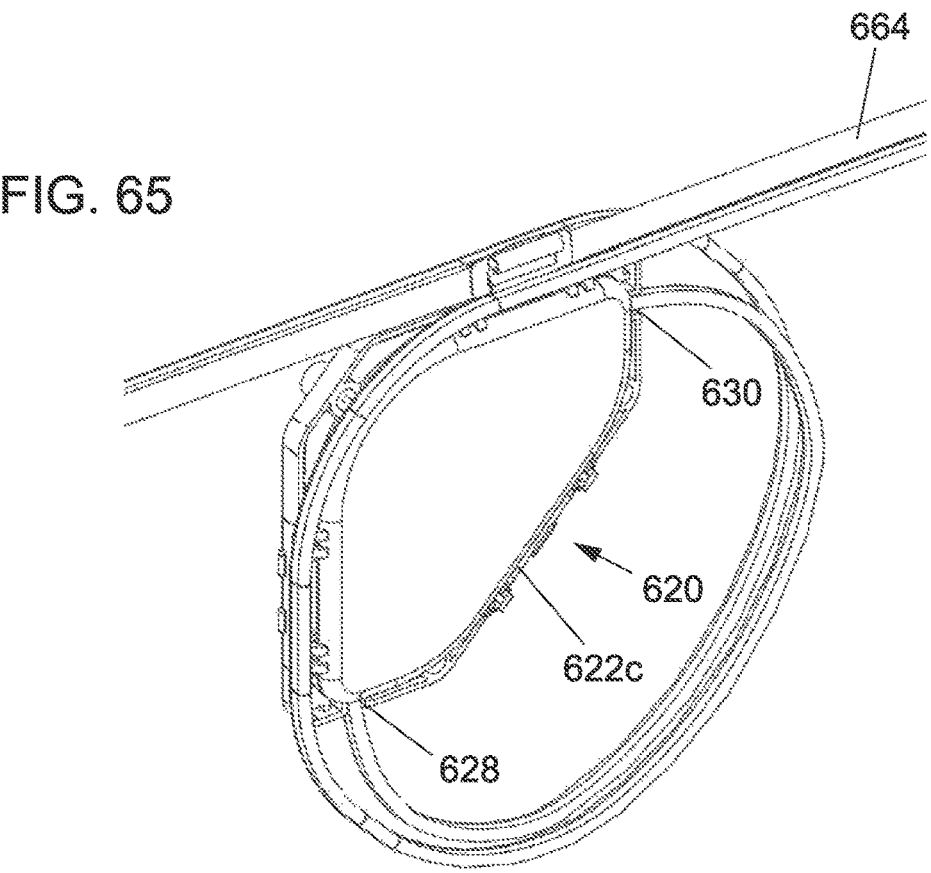
FIG. 65 is a front view of the coil management inline cable routing scheme of FIG. 64.

FIGS. 64 and 65 depict the enclosure 620 in a strand mounted configuration accommodating an inline cable routing scheme with coil management. In this configuration, one of the major perimeter sides 622a, 622b of the enclosure 620 that is not between the first and second cable pass-through regions 628, 630 is attached to the strand 664. In the depicted configuration, the cable pass-through axis 632 of the second cable pass-through region 630 extends along (e.g., is parallel to) the strand 664 and the cable pass-through axis 632 of the first cable pass-through region 628 extends across (e.g., is perpendicular relative to) the strand 664 and the first cable pass-through location 628 faces away from the strand 664. In an alternative configuration, the enclosure 620 can be rotated 90° so that the second cable pass-through region 630 faces away from the strand 664 and the cable pass-through axis 632 of the first cable pass-through region 628 extends along the strand 664. The cables 600a, 600b are bent in a coiled configuration to effectively manage excess cable length. In the depicted example, the cables 600a, 600b are coiled in the enclosure main reference plane 626 and coil about the major form factor of the enclosure 620. In the depicted example, the major form factor of the enclosure 620 is located in one quadrant of the coiled configuration. The cables 600a, 600b curve in the direction D2 away from their respective cable pass-through axes 632 and in certain examples at least portions of the cables corresponding to the coils are attached to the enclosure 620 along the enclosure main form factor by fastening elements such as cable ties routed through the cable attachment locations 634. The coil configurations allow the cables 600a, 600b to loop around the enclosure 620 as the cables 600a, 600b transition from their respective cable pass-through region 626, 628 to the strand 664. The cable 600b reverses directions and loops about 180° as the cable 600b transitions from the second cable pass-through region 630 to the strand 664. The cable 600a loops about 90° as the cable 600a transitions from the first cable pass-through region 628 to the strand 664.

Figure 66:
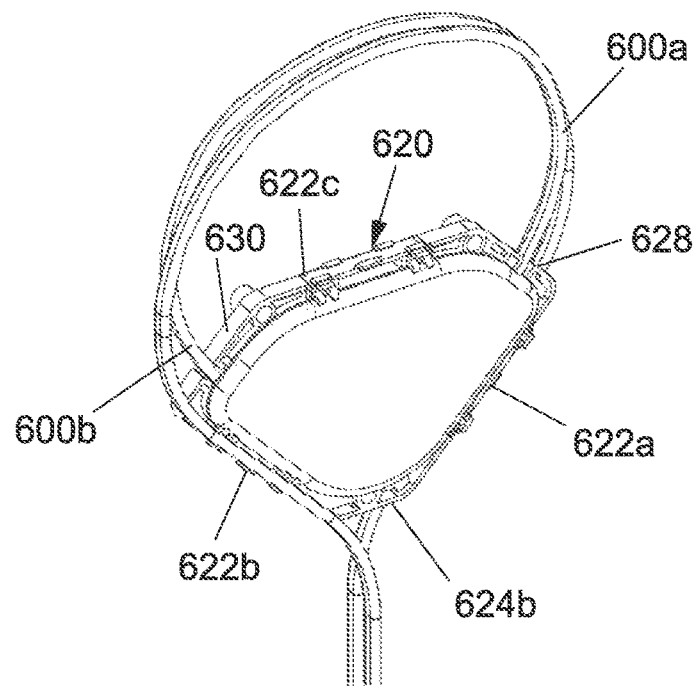
FIG. 66 is a perspective view the telecommunications enclosure of FIG. 59 accommodating a butt style cable routing scheme with coil management.
Figure 67:
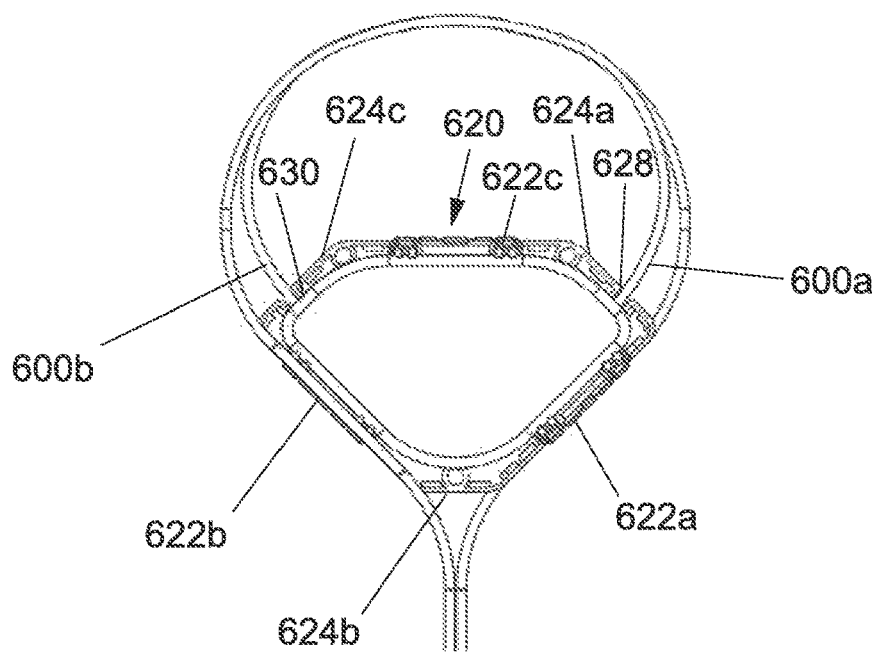
FIG. 67 is a front view of the butt style cable routing scheme of FIG. 66.
Figure 68:
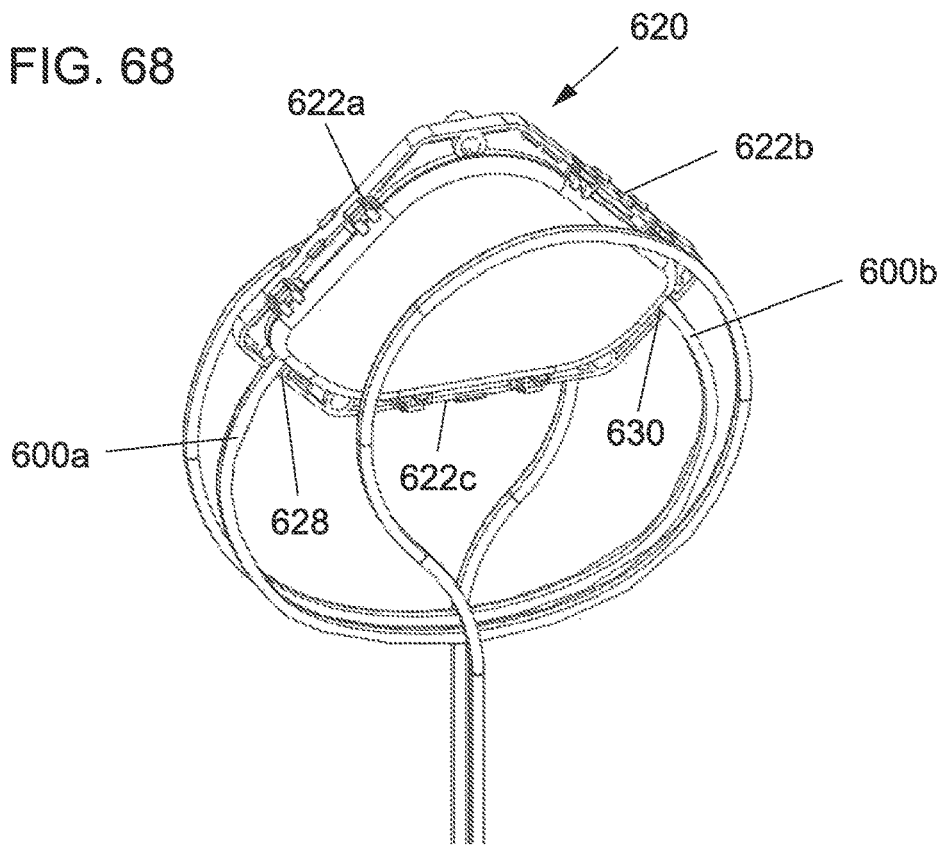
FIG. 68 is a perspective view the telecommunications enclosure of FIG. 59 accommodating another butt style cable routing scheme with coil management.
Figure 69:
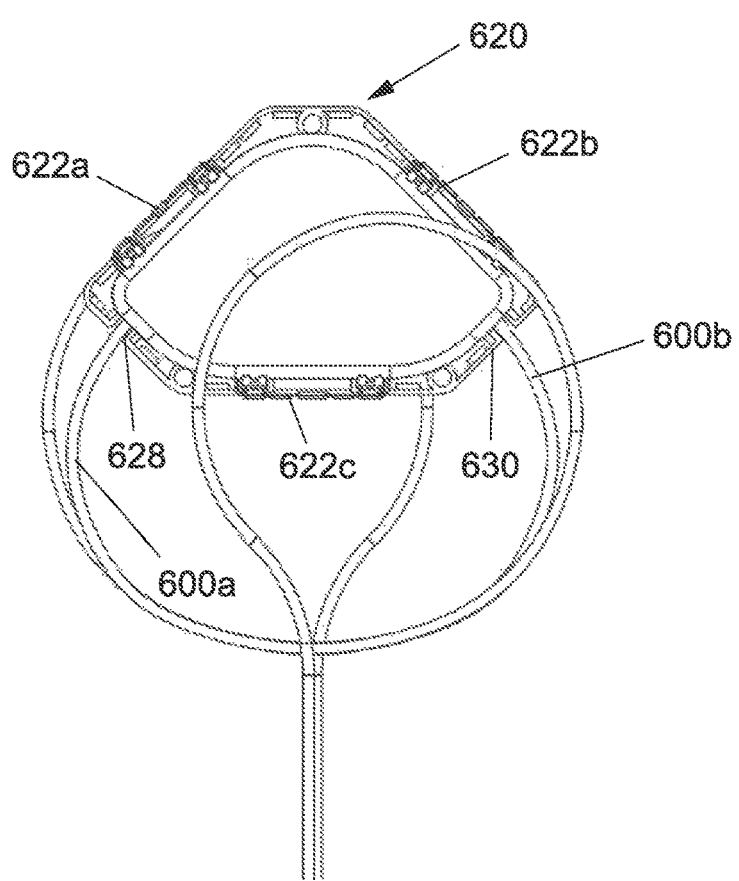
FIG. 69 is a front view of the butt style cable routing scheme of FIG. 68.

FIGS. 66 and 67 depict the telecommunications enclosure 620 accommodating a butt style cable routing scheme with coil management. This type of configuration can be used for pedestal and hand-hole applications. The cables 600a, 600b are coiled and a loop pattern that extends from their corresponding cable pass-through regions 626, 628, loop along the opposite major perimeter sides 622a, 622b of the enclosure 620 and then transition away from the enclosure 620 at the minor transition perimeter side 624b opposite from the first and second cable pass-through locations 628, 630. The cables 600a, 600b can be affixed to the opposite ones of the major sides 622a, 622b by fastening elements such as cable ties routed through the cable attachment locations 634. Thus, the cables 600a, 600b are attached to the enclosure 620 along at least a portion of the perimeter of the enclosure 620. FIGS. 68 and 69 depict the telecommunications enclosure 620 accommodating a butt style cable routing scheme with coil management in which the cables 600a, 600b are coiled and a loop pattern that extends from their corresponding cable pass-through regions 628, 630, and then loop back to transition away from the enclosure 620 at the major side 622c of the enclosure 620 located between the first and second cable pass-through locations 628, 630.

Figure 70:
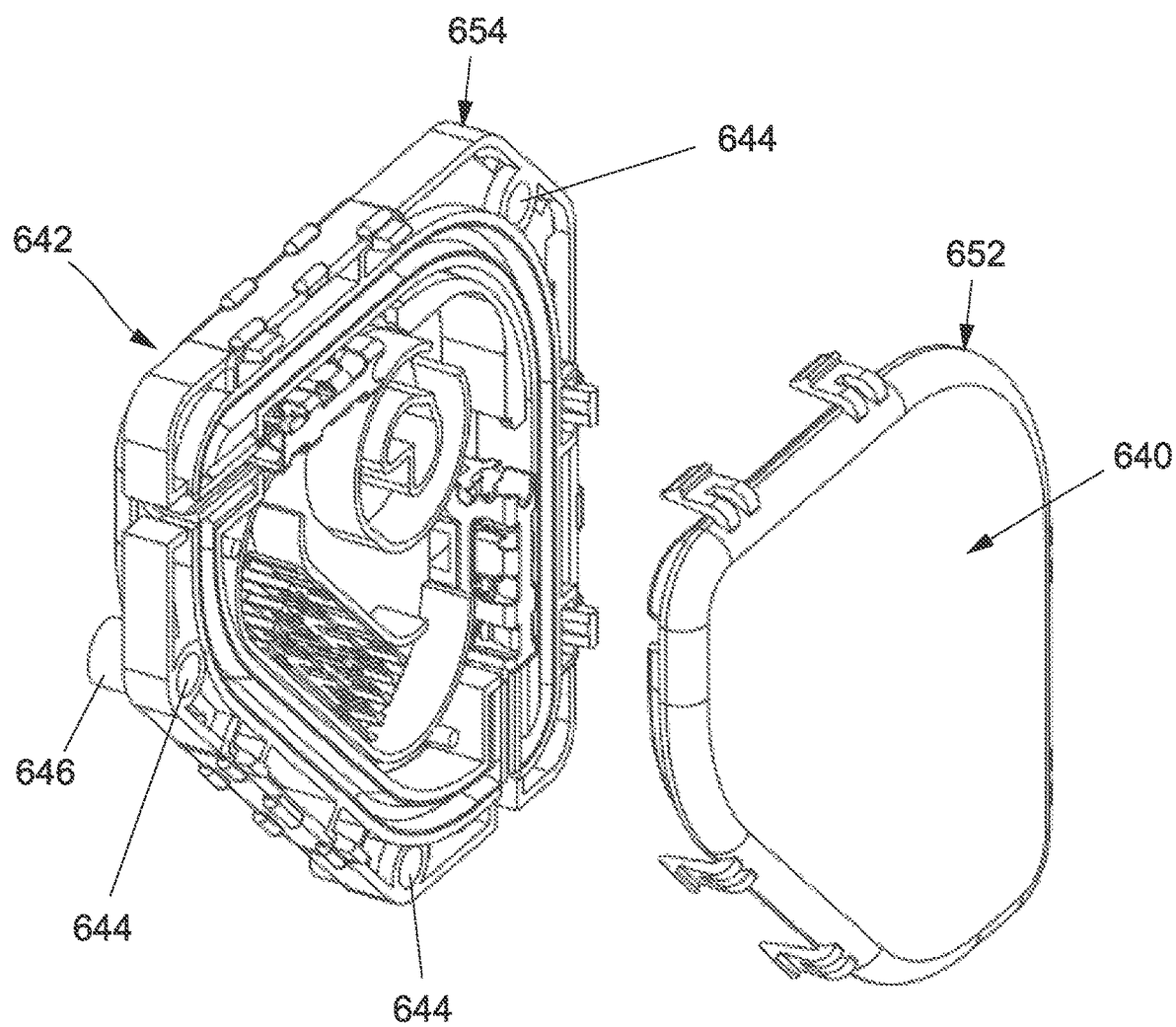
FIG. 70 depicts the enclosure of FIG. 59 with a front cover removed.
Figure 71:
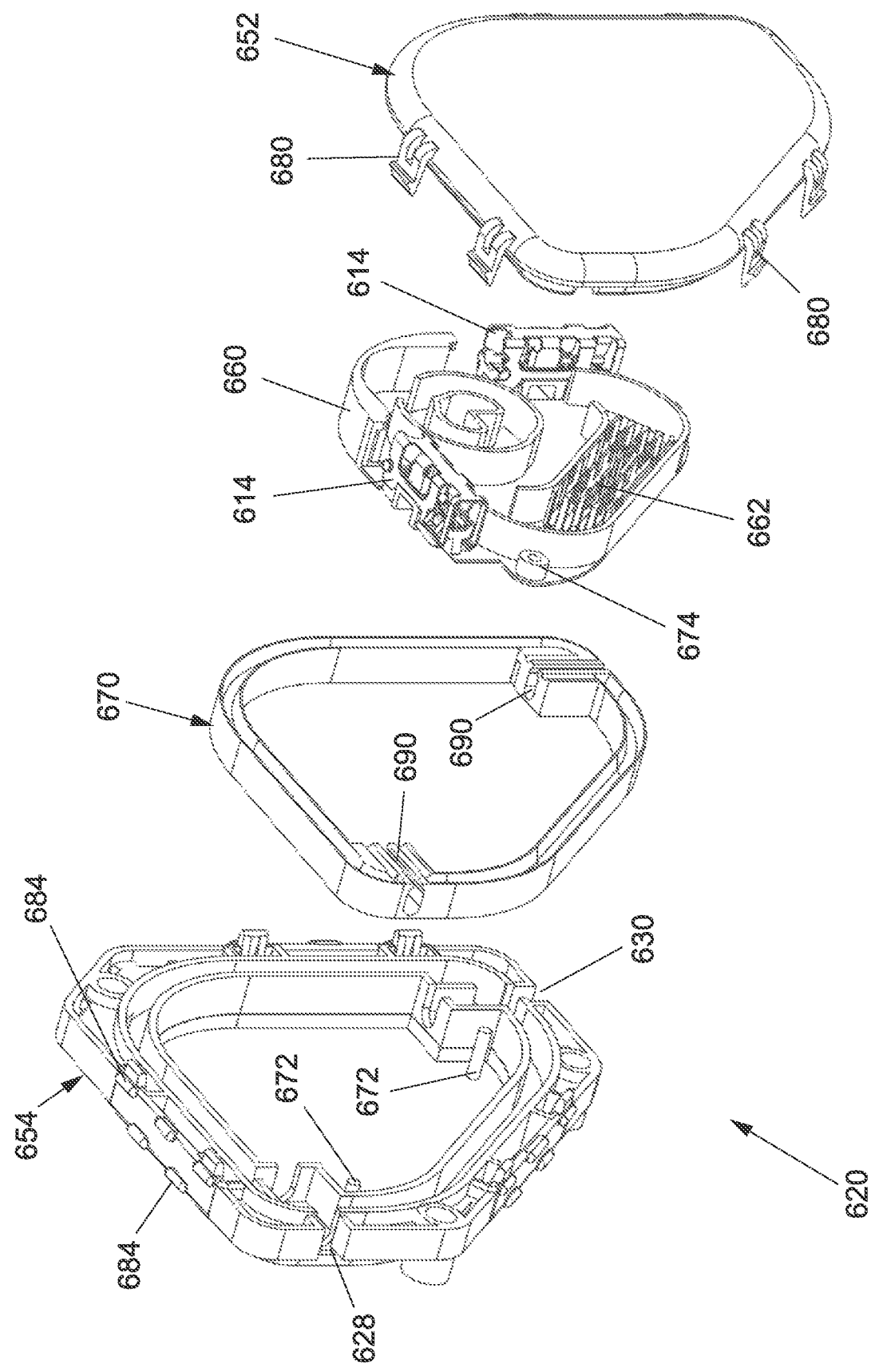
FIG. 71 is an exploded view of the enclosure of FIG. 59.
Figure 72:
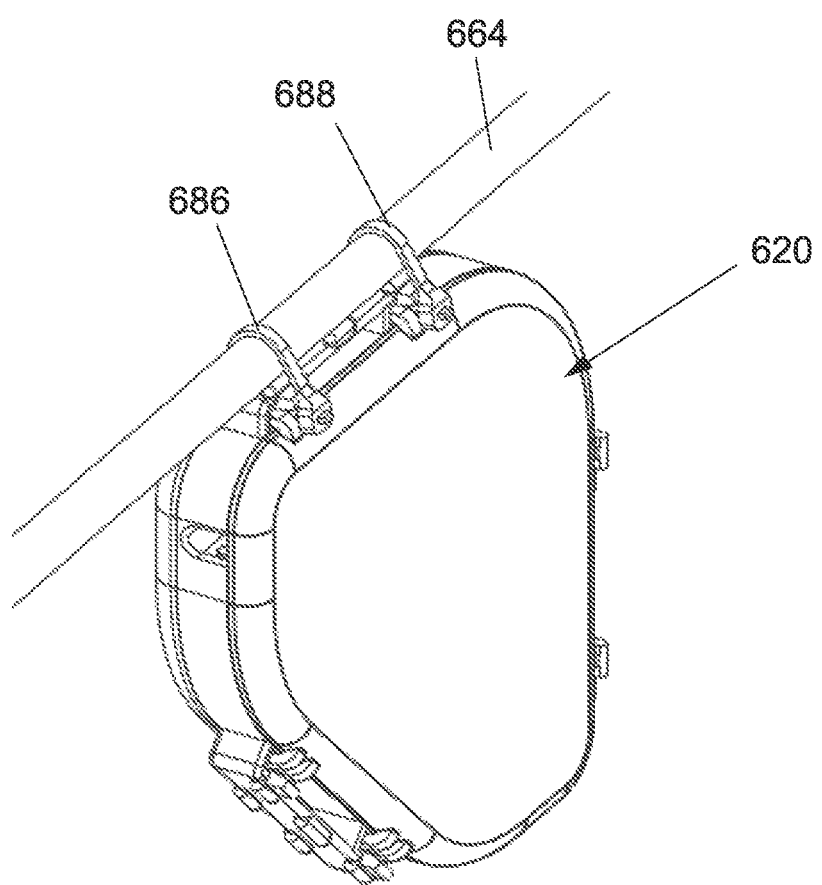
FIG. 72 depicts the enclosure of FIG. 59 secured to a strand via cable ties routed through latches of the enclosure.
Figure 73:
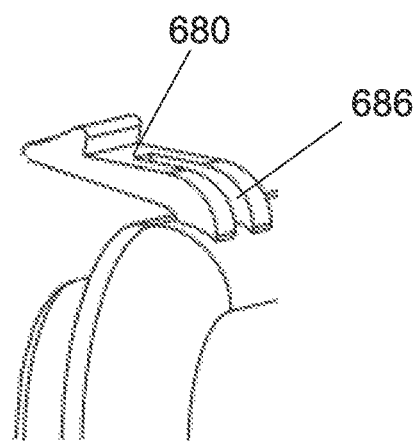
FIG. 73 depicts a latch of the enclosure of FIG. 59 in an at-rest state.
Figure 74:
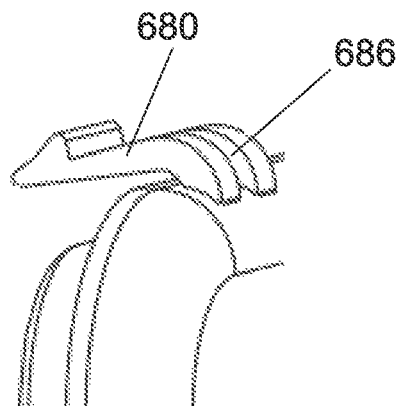
FIG. 74 depicts the latch of FIG. 73 in a flexed state which occurs as the latch is in the process of engaging a corresponding catch.
Figure 75:
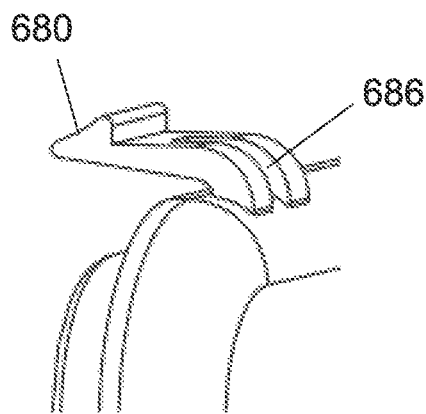
FIG. 75 depicts the latch of FIG. 73 in a latched state.
Figure 76:
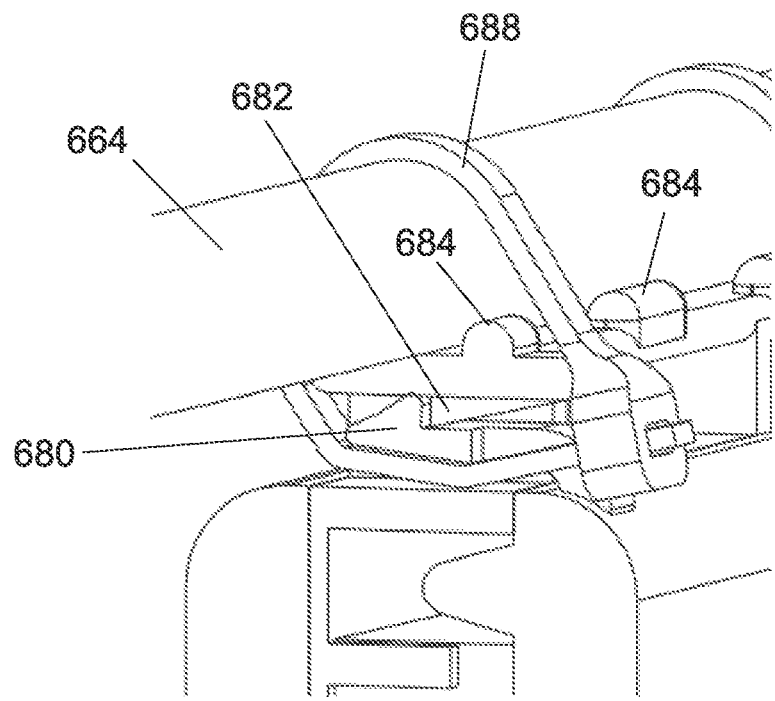
FIG. 76 is a cross-sectional view of the latch of FIG. 73 in the latched sate encaging the latch catch.

Referring to FIGS. 70 and 71, the enclosure 620 includes a seal arrangement 670 that provides perimeter sealing between the front cover 652 and the rear main body 654 and also provides cable sealing at the first and second cable pass-through region 628, 630. In one example, the sealing arrangement 670 can be molded within a perimeter channel and cable seal receiving receptacles defined by the rear main body 654. The tray 660 mounts within the rear main body 654 and can be positioned within the tray main body 654 by posts 672 that fit within corresponding receivers 674 defined by the tray 660. The latching locations 650 for latching the front cover 652 to the rear main body 654 can include resilient latching arms 680 integrated with the cover 652 adapted to engage latch catches 682 (see FIG. 76) integrated with the rear main body 654. The resilient latching arms 680 can be molded at an at-rest position (see FIG. 73). During installation of the front cover 652 on the rear main body 654, the resilient latching arms 680 are configured to flex to a maximum flexed position (see FIG. 74) as the resilient latching arms 680 move past the latch catches 682 and then resiliently snap back to an intermediate latched state (see FIGS. 75 and 76) in which tabs of the latching arms 680 interlock with their corresponding latch catches 682. Projections 684 (e.g., rounded bumps) at the latch locations 650 can be used to assist in centering the enclosure 620 relative to the strand 654. The latching arms 680 define through slots 686 adapted for receiving a fasting element such as a cable tie 688. The cable ties 688 can provide a dual function of assisting in securing the enclosure 622 the strand 654 while providing security for preventing the latches from being opened. Whether the cable ties 688 through the latching arms 680 have been disturbed can be used as an indication as to whether the enclosure 620 has been accessed. FIGS. 72-76 provide various views depicting features of the latching arrangement.

Figure 77:
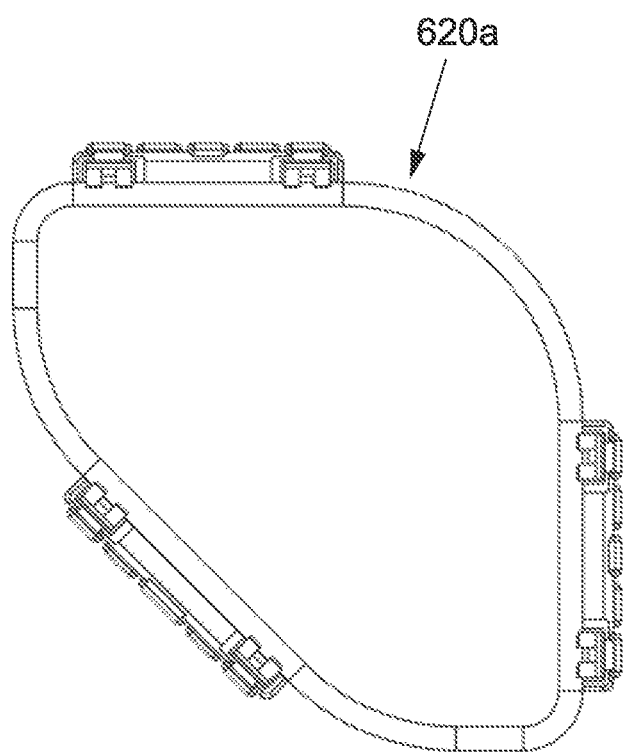
FIG. 77 is a front view of an alternative telecommunication enclosure with cable attachment locations around the perimeter eliminated.
Figure 79:
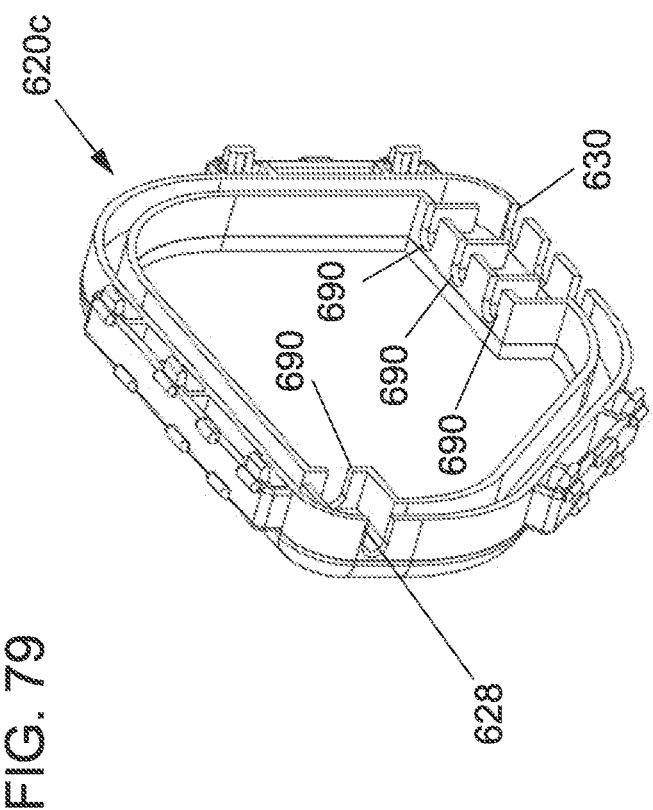
FIG. 79 illustrates a base of an alternative enclosure in accordance with the principles of the present disclosure having a first cable pass-through region with one cable input location and a second cable pass-through region with three cable output locations.
Figure 78:
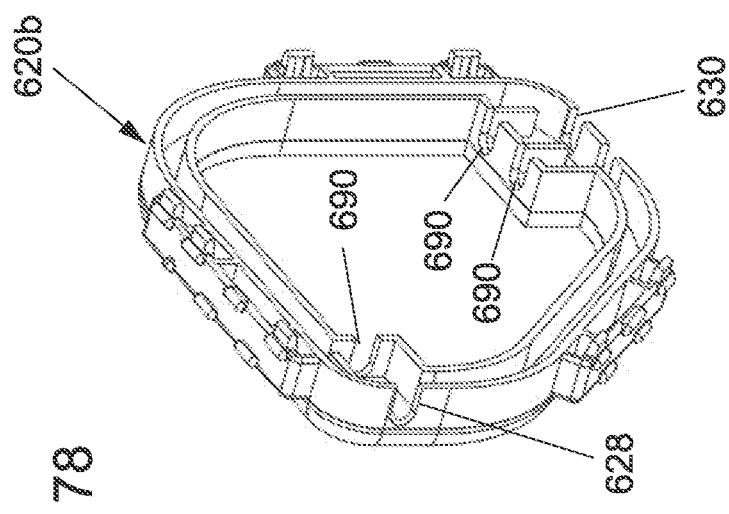
FIG. 78 illustrates a base of an alternative enclosure in accordance with the principles of the present disclosure having a first cable pass-through region with one cable input location and a second cable pass-through region with two cable output locations.

FIG. 77 shows an enclosure 620a that is an alternative version of the enclosure 620 in which the perimeter cable attachment features have been eliminated to provide the enclosure 620a with a simpler aesthetic appearance. In the embodiment of FIG. 71, the enclosure 620 has a configuration in which single cable pass-through locations 690 are provided at each of the first and second cable pass-through regions 628, 630. In alternative examples, two or more cable pass-through locations may be provided at either one or both of the first and second cable pass-through regions 628, 630. FIG. 78 shows a version of the enclosure 620b in which one cable pass-through location 690 is provided at the first cable pass-through region 628 and two cable pass-through locations 690 are provided at the second cable pass-through region 630. FIG. 79 shows a version of the enclosure 620c and which one cable pass-through location 690 is provided at the first cable pass-through region 628 and three cable pass-through locations 690 are provided at the second cable pass-through region 630.

It will be appreciated that a sheath can also be referred to as a casing or housing. Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An enclosure comprising:
a housing including a length, a height and a thickness that are all perpendicular relative to one another, the length is longer than the height and the height is longer than the thickness, the housing includes opposite first and second ends separated by the length, first and second cable ports are located at the first and second ends, the first and second cable ports are aligned along an axis parallel to the length, the first and second cable ports are the only cable ports of the enclosure, the height extends between a top and a bottom of the housing, the axis is located at a bottom third of the housing, the first and second cable ports each have a cross-dimension measured in the orientation of the thickness that traverses at least one third of the thickness, the first and second cable ports being defined at least in part by end sleeves that project outwardly from a main body of the housing at the opposite first and second ends of the housing, wherein pockets located immediately inward from the end sleeves contain cable sealing gel and the end sleeves are free of gel or other cable sealant, and
wherein the housing includes front and back housing pieces coupled together by a living hinge and movable relative to one another between an open position and a closed position and a snap-fit latching arrangement is provided about the perimeter of the housing for securing the front and back housing pieces in the closed position, wherein perimeter sealing is provided about the perimeter of the housing including a perimeter groove and a corresponding perimeter sealing rib.

2. The enclosure of claim 1, wherein the end sleeves include end flanges and circumferential grooves, and wherein the end sleeves also include cylindrical portions positioned axially between the end flanges and the circumferential grooves.

3. The enclosure of claim 2, further comprising a cable guide for reversing a direction of a cable routed through one of the end sleeves that is mountable to the housing, the cable guide including a coupler for coupling the cable guide to one of the sleeves, the coupler having an open sided configuration and including a slot for receiving the end flange, a middle portion for receiving the cylindrical portion, and latching arm that are received in the circumferential groove for latching about the end sleeve.

4. The enclosure of claim 1, further comprising a splice holder located at a top third of the housing for holding optical splices.

5. The enclosure of claim 1, wherein the back housing piece includes bosses at a back side of the back housing piece for facilitating mounting the housing to another structure such as a wall, the bosses including mounting surfaces that are rearwardly offset an offset distance from the back side of the main body of the back housing piece, the bosses being located at portions of the end sleeves defined by the back housing piece, and wherein fastener openings are defined through the bosses and through walls defining the sleeves.

6. The enclosure of claim 1, wherein the sleeves define outer circumferential grooves, and wherein portions of the end sleeves defined by the back housing piece also define notches at the circumferential grooves for receiving a fastening element such as a tie-wrap for securing cables routed through the sleeves to the back housing piece.

7. The enclosure of claim 1, wherein the front and back housing pieces include internal features for providing crush resistance in the orientation of the thickness, wherein the features are centrally located within an interior of the housing and extend across the thickness, wherein the features include first and second projections respectively formed with the front and back housing pieces, wherein surfaces of the first and second projections contact each other to transfer loading across the thickness from a front to a back of the housing, and wherein in one example, the first and second projections include alignment features having profiles that mate to ensure proper engagement between the surfaces of the first and second projections when the housing is closed.

8. The enclosure of claim 1, wherein a rib is provided within each of the sleeves, and wherein the ribs are configured to fit within the corrugations of corrugated cable guides adapted to be installed in the sleeves.

9. The enclosure of claim 1, wherein the fiber management tray mounts within the housing and includes first and second cable fixation locations for securing cables routed through the first and second cable ports to the tray, wherein with the tray mounted in the housing the first and second cable fixation locations are spaced-apart along the axis and are each located adjacent a corresponding one of the first and second cable ports, wherein the tray includes a linear fiber guide channel structure that extends along the axis between the cable fixation locations.

10. The enclosure of claim 9, wherein the linear fiber guide channel structure includes two parallel fiber channels.

11. The enclosure of claim 9, wherein a base linear fiber guide channel includes a surface curved along a convex curvature that curves in a direction along the axis, and wherein openings are defined through the base on opposite sides of an apex of the convex curvature for receiving strength members of cables routed through the first and second cable ports.

12. The enclosure of claim 9, wherein the tray includes an outer fiber routing loop path that includes the linear fiber guide channel structure, and wherein the tray also includes an inner fiber routing loop path surrounded by the outer fiber routing loop path.

13. The enclosure of claim 12, wherein inactive optical fibers of cables routed through the first and second cable ports are routed through one of the fiber channels and along the inner fiber routing loop, and wherein active fibers of the cables are routed through the other of the fiber channels and along the outer fiber routing loop.

14. The enclosure of claim 1, wherein the cable sealing pockets are defined between relatively thin, deformable walls configured to deform to accommodate a cable routed into or out of the closure.

* * * * *